(12) United States Patent
Uehara et al.

(10) Patent No.: US 8,395,731 B2
(45) Date of Patent: Mar. 12, 2013

(54) LIQUID CRYSTAL PANEL, LIQUID CRYSTAL DISPLAY DEVICE AND TERMINAL DEVICE

(75) Inventors: Shinichi Uehara, Tokyo (JP); Jin Matsushima, Tokyo (JP); Ken Sumiyoshi, Tokyo (JP)

(73) Assignee: NLT Technologies, Ltd., Kanagawa (JP)

( * ) Notice: Subject to any disclaimer, the term of this patent is extended or adjusted under 35 U.S.C. 154(b) by 0 days.

(21) Appl. No.: 13/243,562

(22) Filed: Sep. 23, 2011

(65) Prior Publication Data

US 2012/0075554 A1  Mar. 29, 2012

Related U.S. Application Data

(63) Continuation of application No. 11/690,057, filed on Mar. 22, 2007, now Pat. No. 8,134,663.

(30) Foreign Application Priority Data

Mar. 27, 2006  (JP) ................................ 2006-086629
Mar. 19, 2007  (JP) ................................ 2007-070279

(51) Int. Cl.
*G02F 1/1335* (2006.01)
(52) U.S. Cl. ........................... 349/117; 349/119; 349/62
(58) Field of Classification Search .................. 349/117, 349/119
See application file for complete search history.

(56) References Cited

U.S. PATENT DOCUMENTS

| | | | | |
|---|---|---|---|---|
| 5,361,151 | A * | 11/1994 | Sonehara et al. ................ 349/98 |
| 6,650,472 | B1 * | 11/2003 | Adachi et al. ................. 359/453 |
| 6,654,093 | B1 * | 11/2003 | Kim .............................. 349/179 |
| 6,822,711 | B1 * | 11/2004 | Yoshida et al. ................ 349/115 |
| 6,914,656 | B2 * | 7/2005 | Sakamoto et al. ............. 349/141 |
| 7,310,125 | B2 * | 12/2007 | Kim et al. ..................... 349/113 |
| 2003/0123000 | A1 * | 7/2003 | Sugiura et al. ................ 349/113 |
| 2004/0004681 | A1 * | 1/2004 | Ozawa et al. .................... 349/61 |
| 2004/0051945 | A1 * | 3/2004 | Adachi et al. ................. 359/453 |
| 2004/0057110 | A1 * | 3/2004 | Adachi et al. ................. 359/453 |
| 2004/0160537 | A1 * | 8/2004 | Okamoto et al. ............... 349/12 |
| 2004/0196422 | A1 * | 10/2004 | Arai et al. ..................... 349/114 |
| 2004/0257506 | A1 * | 12/2004 | Tashiro et al. ................ 349/123 |
| 2005/0128390 | A1 * | 6/2005 | Yang ............................. 349/114 |
| 2006/0061714 | A1 * | 3/2006 | Tashiro et al. ................ 349/113 |
| 2006/0152657 | A1 * | 7/2006 | Sugiura et al. ................ 349/113 |

(Continued)

FOREIGN PATENT DOCUMENTS

| | | |
|---|---|---|
| CN | 1474216 A | 2/2004 |
| JP | 2003-207795 A | 7/2003 |
| JP | 2003-344837 A | 12/2003 |

(Continued)

OTHER PUBLICATIONS

Japanese Office Action issued Jul. 24, 2012 in corresponding Japanese Patent Application No. 2007-070279.

(Continued)

*Primary Examiner* — K. Cyrus Kianni
(74) *Attorney, Agent, or Firm* — Sughrue Mion, PLLC

(57) ABSTRACT

To provide a liquid crystal panel capable of realizing excellent display performance using a circular polarizing plate therein, and a liquid crystal display device and a terminal device using the same, with respect to a semi-transmission type liquid crystal display device in a horizontal electric field mode (In-Plane Switching: IPS).

A viewer-side circular polarizing plate and a backside circular polarizing plate are disposed outside of a viewer-side substrate and a backside substrate respectively, and a viewer-side compensation plate and a backside compensation plate are disposed between the respective polarizing plates and substrates to reduce a refractive index anisotropy of a liquid crystal layer.

6 Claims, 40 Drawing Sheets

U.S. PATENT DOCUMENTS

| | | | |
|---|---|---|---|
| 2006/0203162 A1* | 9/2006 | Ito et al. | 349/117 |
| 2007/0202273 A1* | 8/2007 | Hirai et al. | 428/1.31 |
| 2008/0212001 A1* | 9/2008 | Ozawa et al. | 349/106 |

FOREIGN PATENT DOCUMENTS

| | | | |
|---|---|---|---|
| JP | 2004-341207 A | 12/2004 | |
| JP | 2005-106967 A | 4/2005 | |
| JP | 2005-265953 A | 9/2005 | |
| JP | 2005-292709 A | 10/2005 | |

OTHER PUBLICATIONS

Japanese Office Action, dated Dec. 6, 2011, issued in counterpart Japanese Application No. 2007-070279.

T.B. Jung et al., "A Novel Transflective Display Associated with Fringe-Field Switching", Boe-Hydis Technology Co., Ltd., SID Digest, 2003, pp. 592-595.

Makoto Jisaki et al., "Development of Transflective LCD for High Contrast and Wide Viewing Angle by Using Homeotropic alignment", Sony Corporation Core Technology & Network Company, Asia Display, IDW, 2001, pp. 133-136.

Takashi Sato et al., Ekisho, Japanese Liquid Crystal Society, vol. 9, No. 4, pp. 245-251.

Chinese Office Action issued in Chinese Application No. 200710089721.4 dated Sep. 11, 2009.

* cited by examiner

LIQUID CRYSTAL PANEL, LIQUID CRYSTAL DISPLAY DEVICE AND TERMINAL DEVICE

CROSS-REFERENCE TO RELATED APPLICATION

This application is a continuation of U.S. application Ser. No. 11/690,057, filed Mar. 22, 2007, which claims priority to Japanese Application No. 2006-086629 filed Mar. 27, 2006, and Japanese Application No. 2007-070279 filed Mar. 19, 2007; the above-noted applications incorporated herein by reference in their entirety.

1. FIELD OF THE INVENTION

The present invention relates to a liquid crystal panel, a liquid crystal display device and terminal device, in particular, a liquid crystal panel, a liquid crystal display device and terminal device having a reflective display area which reflects incident external light to display and a transmissive display area which transmits light from the backside to display, wherein at least the display area of a transmitting-type is driven by a horizontal electric field.

2. DESCRIPTION OF THE RELATED ART

Recently, the liquid crystal display device, having the advantage of thin, light-weight, small and low power consumption, is widely installed in and used for large size terminal devices such as monitors and televisions, middle size terminal devices such as laptop computers, cash dispensers, and vending machines, and small size terminal devices such as PDAs (Personal Digital Assistance), mobile telephones, and portable game devices.

A liquid crystal panel, which is a main component part of the liquid crystal display device, displays information by controlling the orientation of the liquid crystal molecules using an electric field, and a number of modes depending on combinations of liquid crystal molecules types, primary orientation states, and electric field directions, are proposed. An STN (Super Twisted Nematic) mode with a simple matrix structure and a TN (Twisted Nematic) mode with an active matrix structure are the most-used modes among those modes for conventional terminal devices. However, liquid crystal panels in these two modes have a narrow viewing angle for viewing in proper grayscale, and grayscale inversion occurs outside of the optimal viewing angle.

The grayscale inversion has not been a major problem in the terminal devices principally for displaying characters, for example, in the mobile telephones displaying such as telephone numbers. However, the terminal devices come to display a lot of image information other than the characters under the recent technical development, and it becomes a problem that the grayscale inversion leads to very poor image visibility.

Therefore, liquid crystal panels in modes which have wide viewing angle for viewing in proper grayscale without the grayscale inversion, have been gradually installed in terminal devices. The liquid crystal panels in such modes are named generically as the wide viewing angle liquid crystal panel, and a horizontal electric field mode such as an IPS (In-plane-switching) mode, a multi-domain vertical alignment mode, and a film compensated TN mode are in practical use.

Among the wide viewing angle modes applied to the wide viewing angle liquid crystal panel, the film compensated TN mode is adding a viewing angle compensation film to a liquid crystal panel in a TN mode so as to improve a viewing angle characteristic. In the liquid crystal panel in a TN mode, liquid crystal molecules are originally oriented parallel to a substrate when no voltage is applied. The liquid crystal having positive uniaxial refractive index anisotropy is used in the TN mode, so that the higher-refractive-index-directions of the liquid crystal molecules are oriented in parallel to the substrate. If the voltage is applied in this condition, the liquid crystal molecules are oriented to rise in vertical direction to the substrate, however, these molecules cannot rise completely in the vicinity of the substrate interface even when a high voltage is applied due to orientation regulation of an orientation film which determines a primary orientation. Then, the molecules at the substrate interface are oriented in the tilt angle with respect to the substrate.

That is, the high-refractive-index-directions of the liquid crystal molecules are oriented in the tilt direction to the substrate. Here, when the liquid crystal molecules are viewed from the high-refractive-index-direction, and if the direction is varied even slightly, the apparent refractive index of liquid crystal molecules varies drastically, the viewing angle becomes narrow due to the variation of the apparent refractive index.

So, as for the film compensated TN mode, a viewing angle compensation film regulates variations of the apparent refractive index of the liquid crystal molecules which are oriented in the tilt angle. As an example, there is a compensation film in which a discotic compound is arranged so as to be corresponding to the liquid crystal molecules oriented in the tilt angle. The compensation film can reduce the effect of the liquid crystal molecules near the substrate interface when the voltage is applied, so that the grayscale inversion can be restricted and the viewing angle characteristic can be improved.

Further, among the wide viewing angle modes, the multi-domain vertical alignment mode has a condition in which molecules are vertically aligned when no voltage is applied. The multi-domain vertical alignment mode is one of the vertical alignment modes where liquid crystal molecules are tilted in parallel to a substrate interface when a voltage is applied, and in this mode, the display area has domains with which tilt directions of molecules are compensated by domains with each other in the liquid crystal panel. When liquid crystal molecules tilt in only one direction under voltage application, in the case of a vertical alignment mode without multi-domain, viewing angle becomes narrower due to an effect of the liquid crystal molecules oriented in the tilt angle, which is same as the case of the TN mode under voltage application. So, a substrate in the multi-domain vertical alignment mode has an uneven surface so as to generate a plurality of different domains therein, and the tilted directions of molecules are different by each domain. That is, liquid crystal molecules tilt in some direction are optically compensated by liquid crystal molecules in another domain which tilt in a different direction, and then a viewing angle characteristic is improved.

It is common to the liquid crystal panels in the film compensated TN mode and multi-domain vertical alignment mode that liquid crystal molecules are tilted when a voltage is applied and that effects of the tilted liquid crystal molecules are compensated optically so as to improve the viewing angle characteristic.

On the other hand, in the horizontal electric field mode such as the IPS mode, liquid crystal molecules are uniaxially oriented in parallel to the substrate, and by applying a voltage in parallel to a substrate, the liquid crystal molecules rotate with keeping a condition to be parallel to the substrate. That is, the liquid crystal molecules do not rise with respect to the substrate even when the voltage is applied, so that the viewing angle is wide in principle.

Meanwhile, the liquid crystal display devices need to use some light source for viewing displays because liquid crystal molecules themselves do not emit light. In general, the liquid crystal display devices can be classified broadly depending on light source types such as a transmission type, a refection type, and a semi-transmission type in which the both of transmitted light and reflected light are used. The reflection type can achieve low power consumption because it can use external light, however, this type is inferior to the transmission type in display quality such as a contrast level. Therefore, the transmission type and the semi-transmission type is the mainstream nowadays.

Liquid crystal devices in the transmission type and the semi-transmission type have light source units in the back sides of their liquid crystal panels, and achieve displays utilizing light emitted by the light source units. In particular, as for medium or small sized liquid crystal display devices, users carry them in various situations. So the semi-transmission type of liquid crystal display devices are used for the medium or small sized liquid crystal display devices because of their high level visibility under any circumstances. In a bright place, users view a reflective display, and in a dark place, users view a transmissive display.

Conventionally, the liquid crystal panels used in the semi-transmission type liquid crystal display devices have been in the film compensated TN mode or the multi-domain vertical alignment mode. However, it is proposed to apply the horizontal electric field mode, which provides a wide viewing angle in principle, to the semi-transmission type.

FIG. 36 is a view showing an optical arrangement (a), arranged angles (b), and operates (c) in the conventional horizontal electric field mode liquid crystal display device described in the Japanese Patent Application Laid-open No. 2003-344837 (Patent Document 1). As shown in FIG. 36A, a semi-transmission type liquid crystal display device 1053 according to Patent Document 1 comprises a lower substrate 1011, an opposed side substrate 1012, a liquid crystal layer 1013 sandwiched in between the lower substrate 1011 and the opposed side substrate 1012, and a backlight 1028 placed below the lower substrate 1011, wherein the lower substrate 1011 and the opposed side substrate 1012 includes polarizing plates 1021a and 1021b outside of them respectively. The lower substrate 1011 and the opposed side substrate 1012 sandwiching the liquid crystal layer 1013 also includes horizontal alignment films respectively formed on their surfaces which are contacting the liquid crystal layer 1013, which are not shown in order to simplify the drawing. Further, there is a half wavelength plate 1029 is placed between the transparent insulating substrate 1022a and the polarizing plate 1021a in the lower substrate. In addition, the lower substrate also includes a first insulating film 1008a formed on the liquid crystal layer 1013 side.

In a reflective area 1005, a second insulating film 1008b is formed and placed on the first insulating film 1008a, a reflection plate 1009 is on the second insulating film 1008b, a third insulating film 1008c is on the reflection plate 1009, and a horizontal electric field driving electrode 1007 is on the third insulating film 1008c. The horizontal electric field driving electrode 1007 is formed with a pixel electrode 1027 and a common electrode 1026 which are parallel to each other, and the liquid crystal layer 1013 is driven using an electric field formed between the pixel electrode 1027 and the common electrode 1026.

In the transmissive area 1006, the pixel electrode 1027 and the common electrode 1026 are placed on the first insulating film 1008a in parallel to each other, and an electric field formed between the pixel electrode 1027 and the common electrode 1026 drives the liquid crystal layer 1013. The second insulating film 1008b and the third insulating film 1008c are provided to adjust thickness differences of the liquid crystal layer 1013 in the transmissive area 1006 and the reflective area 1005.

As shown in FIG. 36B, when a voltage is not applied between the common electrode 1026 and the pixel electrode 1027, the polarizing plate 1021b is arranged at an angle of 90 degree and the liquid crystal layer 1013 is arranged at an angle of 45 degree in the opposed side substrate with the case where the polarizing plate 1021a of the lower substrate both in the reflective area 1005 and the transmissive area 1006 is arranged at an angle of 0 degree. Here, a twist angle of the liquid crystal layer 1013 is 0 degree. Further, the half wavelength plate 1029 is arranged at an angle of 135 degree.

The semi-transmission type liquid crystal display device in the horizontal electric field mode in Patent Document 1 having the above configuration operates as shown in FIG. 36C. That is, when a voltage is not applied between the pixel electrode 1027 and the common electrode 1026, linear polarized light arranged at an angle of 90 degree which has passed through the polarizing plate 1021b becomes circular polarized light rotating clockwise after passing through the liquid crystal layer 1013, and becomes circular polarized light rotating counterclockwise after reflected by the reflection plate 1009, then becomes linear polarized light arranged at an angle of 0 degree after passing through the liquid crystal layer 1013. Accordingly, the linear polarized light cannot emerge, which results in a black display.

On the other hand, when a voltage is applied between the pixel electrode 1027 and the common electrode 1026, the arranged angle of the liquid crystal layer 1013 varies to 0 degree, so that the linear polarized light arranged at an angle of 90 degree which has passed through the polarizing plate 1021b is reflected by the reflection plate 1009 as it is even after passing through the liquid crystal layer 1013, and it passes through the liquid crystal layer 1013 again, then emerges as it is, the linear polarized light at an angle of 90 degree, which results in a white display.

Further, when a voltage is not applied to the liquid crystal layer 1013 in the transmissive area 1006, linear polarized light arranged at an angle of 0 degree which has passed through the polarizing plate 1021a varies into linear polarized light arranged at an angle of 90 degree after passing through the half wavelength plate 1029, again varies into linear polarized light arranged at an angle of 0 degree after passing through the liquid crystal layer 1013 because of another rotation of the arranged angle. The linear polarized light arranged at an angle of 0 degree cannot emerge from the polarizing plate 1021b arranged at an angle of 90 degree, which results in a black display. When a voltage is applied to the liquid crystal layer 1013, the arranged angle of the liquid crystal layer 1013 varies into 0 degree. In this state, a linear polarized light arranged at an angle of 0 degree which has passed through the polarizing plate 1021a varies to a linear polarized light arranged at an angle of 90 degree after passing through the half wavelength plate 1029. The arranged angle of the linear polarization does not turn even after passing though the liquid crystal layer 1013. So the linear polarized light arranged at an angle of 90 degree emerges as it is from the polarizing plate 1021b arranged at an angle of 90 degree, which results in a white display. That is, the reflective display, according to Patent Document 1, is a normally black type both in the reflective area and the transmissive area.

As in the above, Patent Document 1 proposes the semi-transmission type liquid crystal display device with the reflective area 1005 and the transmissive display area 1006 both of which are driven by the horizontal electric field.

FIG. 37 is a cross-sectional view showing a semi-transmission type liquid crystal panel in a horizontal electric field mode used for a conventional liquid crystal display device which is described in the patent application Laid-open 2005-106967A (Patent Document 2). As shown in FIG. 37, the conventional semi-transmission type liquid crystal display device comprises a first substrate 2011 and a second substrate 2012, and a liquid crystal layer 2010 disposed in between the two substrates. A color filter 2018, a planarizing film 2019, and a first orientation film 2013 are disposed in order on the liquid crystal layer 2010 side of the first substrate 2011. A light diffusion layer 2056, a first retardation plate 2053, and a first polarizing plate 2051 are laid in this order from the first substrate 2011 side on the opposite side from the liquid crystal layer 2010 of the first substrate 2011.

On the other hand, a first insulating film 2015 is formed on the liquid crystal layer 2010 side of the second substrate 2012, on which signal wirings 2025 and source wirings 2023 are disposed, and a second insulating film 2016 is laid on the whole of them, then third insulating films 2017 are formed only above the signal wirings 2025 and the source wirings 2023. Further, the pixel electrode 2021 is formed on the third insulating film 2017 above the source wiring 2023, and the common electrode 2022 is formed on the third insulating film 2017 above the signal wiring 2025.

The pixel electrode 2021 and the common electrode 2022 are formed in comb-shaped state which is like tines put in parallel into one pixel, on which a second orientation film 2014 are formed. Further, a second retardation plate 2054, a third retardation plate 2055, and a second polarizing plate 2052 are laid in this order on the second substrate 2012 of the opposite side from the liquid crystal layer 2010.

The signal wiring 2025 is made from chromium, the first insulating film 2015 and the second insulating film 2016 is a silicon nitride film, and the third insulating film 2017 is an organic film. The pixel electrode 2021 and the common electrode 2022 are made from aluminum. Because the pixel electrode 2012 and the common electrode 2022 are aluminum with high reflectance, portions where the pixel electrode 2021 and the common electrode 2022 exist become reflective display parts. Further, intervals between the pixel electrode 2012 and the common electrode 2022 are transparent and transmit backlight, so that the intervals become transmissive display parts. Since the pixel electrode 2021 and the common electrode 2022 are distributed on the third insulating film 2017, they protrude from the second substrate 2012. Accordingly, the liquid crystal layer of the reflective display parts is thinner than the liquid crystal layer of the transmissive display parts.

In order to adjust fully an optical path difference between the reflective display part and the transmissive display part, the liquid crystal layer of the transmissive display part needs to be twice as thick as the liquid crystal layer of the reflective display part. Further, the liquid crystal layer of the reflective display part has retardation of one-quarter wavelength in order to improve a contrast ratio, so that the liquid crystal layer of the transmissive display part must have retardation of one-half wavelength which is greater than the one of the liquid crystal layer of ++ the reflective display part by twice. However, if the liquid crystal layer of the transmissive display part has the one-half wavelength retardation, the display becomes the brightest, but the display is colored in yellow. In order to achieve near the brightest level avoiding coloring, the liquid crystal layer of the transmissive display part is slightly thinner than the twice size of the liquid crystal layer in the reflective display part, that is, from 1.7 to 1.9 times as thick as the liquid crystal layer of the reflective display part.

In the liquid crystal panel build up with the first substrate 2011 and the second substrate 2012 enclosing liquid crystal materials therein, the first orientation film 2013 and the second orientation film 2014 are set to have an orientation direction which is in parallel to the liquid crystal layer, and is at an angle of 75 degree to an electric field formed between the pixel electrode 2021 and the common electrode 2022 with a view from a direction of substrate normal.

The first retardation plate 2053 has retardation of one-half wavelength, and its optical axis is arranged at an angle of 60 degree to the primary orientation direction of the liquid crystal layer 2010 when no voltage is applied. Further, the first polarizing plate 2051 is disposed at an angle of 15 degrees to the optical axis of the first retardation plate 2053. Retardation of the liquid crystal layer in the reflective display part is a quarter wavelength.

The second retardation plate 2054, the third retardation 2055 and the second polarizing plate 2052 are considered to be corresponding to the liquid crystal layer in the transmissive display part, the first retardation plate 2053, and the first polarizing plate 2051 respectively. That is, the retardation of the second retardation plate 2054 is set to be the same as a retardation of the corresponding liquid crystal layer of the transmissive display part, and a retardation axis of it are set in vertical to an orientation direction of the liquid crystal layer in the transmissive display part. Thereby the retardations of the second retardation plate 2054 and the liquid crystal layer of the transmissive display part are compensated for each other.

Moreover, a retardation of the third retardation plate 2055 is set to be the same as a retardation of the corresponding first retardation plate 2053, and a retardation axis is set in vertical to the retardation axis of the first retardation plate 2053. Thereby the retardations of the third retardation plate 2055 and the first retardation plate 2053 are compensated for each other. A transmission axis of the second polarizing plate 2052 is set in vertical to a transmission axis of the first polarizing plate 2051.

The semi-transmission type liquid crystal display device in the horizontal electric field mode according to Patent Document 2 configured as above, a linear polarized light arranged at an angle of 0 degree which has passed through the first polarizing plate 2051 are converted into a linear polarized light arranged at an angle of 30 degrees after passing through the first retardation plate 2053 in the off-state where the pixel electrode 2021 and common electrode 2022 have same potentials. After that, the light entering into the liquid crystal layer of the reflective display part becomes an circular polarized light because an orientation direction of the liquid crystal layer is 75 degrees and its retardation is the one-quarter wavelength, then it is converted into an circular polarized light rotated in the opposite direction when it is reflected by the pixel electrode 2021 and the common electrode 2022, and it again enters into the liquid crystal layer of the reflective display part, and then it is converted into a linear polarized light arranged at an angle of 120 degree.

Next, the linear polarized light is converted into a linear polarized light arranged at an angle of 90 degree after passing through the first retardation plate 2053, which enters again into the first polarizing plate 2052. The first polarizing plate 2052 transmits a linear polarized light arranged at an angle of 0 degree, so that the linear polarized light arranged at an angle of 90 degree is not transmitted. That is, the reflective display part results in a black display under no voltage application. When a voltage is applied between the pixel electrode 2021 and the common electrode 2022, birefringence of the liquid crystal layer in the reflective display part varies and a light emerges, which leads to a white display. Namely, a normally black display is achieved in the reflective display.

On the other hand, as for the transmissive display part in the off-state where the pixel electrode 2021 and the common electrode 2022 have same potentials, an in-between space of the second polarizing plate 2052 and the first polarizing plate 2051 is equal to an isotropic phase because retardations of two sets of mediums for birefringence in between the second polarizing plate 2052 and the first polarizing plate 2051 are offset, so that an ideal black display is achieved by transmission axis of the second and first polarizing plates 2052, 2051 bisecting each other at right angle. When a voltage is applied between the pixel electrode 2021 and the common electrode 2022, light emerges because birefringence of the liquid crystal layer in the transmissive display part varies, which results in a white display. That is, the normally black is achieved in the transmissive display.

As described above, Patent Document 2 proposes the semi-transmission type liquid crystal display device having the reflective display part and the transmissive display part driven by the horizontal electric field.

FIG. 38 is a cross sectional view showing a semi-transmission type liquid crystal panel in the horizontal electric field mode used for the conventional liquid crystal display device disclosed in pp 133-136 of SID03 DIGEST (Non-Patent Document 1). As shown in FIG. 38, the semi-transmission type liquid crystal display device according to Non-Patent Document 1 uses a semi-transmission type liquid crystal panel in Fringe-Field Switching mode (FFS) which is one of the horizontal electric field modes. That is, a transparent electrode 3005 and a reflection electrode 3007 for applying a voltage to a liquid crystal layer 3004 are formed only in the liquid crystal layer side of a backside substrate 3008.

A common electrode is formed in a transmissive area using the transparent electrode 3005, and is formed in a reflective area using the reflection electrode 3007. Each of the electrodes is plane shape. A pixel electrode is formed using the transparent electrode 3005 both in the transmissive area and the reflective area, and it is plane shape having a slit. An insulating layer 3006 is formed between the common electrode and the pixel electrode to prevent the common electrode and the pixel electrode from electrical short-circuit. The liquid crystal layer 3004 has homogeneous alignment of liquid crystals in a primary state under no voltage application, and the liquid crystals rotate and transform on a plane surface when a voltage is applied.

The liquid crystal layer 3004 in the reflective area is set to be half as thick as that in the transmissive area. A viewer side substrate 3003 is disposed above the liquid crystal layer 3004, on which an upper side one-half wavelength plate 3002, an upper side polarizing plate 3001 are disposed further. A lower one-half wavelength plate 3009 and a lower polarizing plate 3010 are disposed under the backside substrate 3008.

The liquid crystal layer 3004 has liquid crystal molecules processed to be oriented at an angle of 12 degree in its primary orientation. On the other hand, a retardation axis of the upper side one-half wavelength plate 3002 is set at an angle of 72 degrees, and a transmission axis of the upper side polarizing plate 3001 is set at an angle of 87 degrees. There is no recitation about specific values of the optimal angles for the lower one-half wavelength plate 3009 and the lower polarizing plate 3010 while some combinations of them are indicated in the document as parameter spaces, however, the angles are set in order that the transmissive area is to have a normally black display in combination with a characteristic of the reflection area. An example value according to the parameter space is that a retardation axis of the lower half wavelength plate 3009 has a −63 degree direction, and a transmission axis of the lower polarizing plate 3010 has a −3 degree direction.

The semi-transmission type liquid crystal panel in the horizontal electric field mode according to Non-Patent Document 1 configured as above, a linear polarized light arranged at an angle of 87 degrees which has passed through the upper side polarizing plate 3001 is converted into a linear polarized light arranged at an angle of 57 degree after passing through the upper side one-half wavelength plate 3002 in the off-state where electric potentials of the pixel electrode and the common electrode are same. After that, the incident light into the liquid crystal layer of the reflective display part becomes a circular polarized light because the liquid crystal layer has a 12 degree orientation direction and its retardation is a quarter wavelength, and the circular polarized light is converted into a circular polarized light rotated in opposite direction when it is reflected by the reflection electrode 3007, then the circular polarized light is converted into a linear polarized light arranged at an angle of −33 degree on entering into the liquid crystal layer of the reflective display part again. Next, it is converted into a linear polarized light arranged at an angle of 177 degrees after passing through the upper side one-half wavelength plate 3002, and enters into the upper side polarizing plate 3001 again. The upper side polarizing plate 3001 transmits a linear polarized light having a 87 degree arranged angle, so that it does not transmit the linear polarized light arranged at an angle of 177 degrees. That is, the reflective display part displays black when no voltage is applied. Further, when a voltage is applied between the pixel electrode and the common electrode, a display becomes white because light emerges depend on variation of birefringence of the liquid crystal layer in the reflective display part. Namely, a normally black reflective display is accomplished.

On the other hand, as for the transmissive display part in off-state where electric potentials of the pixel electrode and the common electrode are same, a linear polarized light arranged at an angle of −3 degree which has passed the lower polarizing plate 3010 passes through the lower one-half wavelength plate 3009, and is converted into a linear polarized light arranged at an angle of −123 degrees. Next, it passes the liquid crystal layer 3004, however, the light emerging from the liquid crystal layer 3004 changes into a linear polarized light arranged at an angle of −33 degrees because the liquid crystal layer 3004 of the transmissive area is twice as thick as the one of the reflective area and works as one-half wavelength length plate. Then, the −33 degree linear polarized light is converted into a linear polarized light arranged at an angle of 177 degree after passing through the upper side one-half wavelength plate 3002, and enters the upper side polarizing plate 3001 again. Because the upper side polarizing plate 3001 transmits a linear polarized light arranged at an angle of 87 degree, it does not transmit the linear polarized light arranged at an angle of 177 degree, which results in a black display when no voltage is applied to the transmissive display part as well. Further, when a voltage is applied between the pixel electrode and the common electrode, birefringence of the liquid crystal layer in the transmissive display part varies, which causes a light to emerge, and a display becomes white. Namely, a normally black transmissive display is accomplished.

As described above, Non-Patent Document 1 proposes the semi-transmission type liquid crystal display device having the reflective display part and the transmissive display part driven by the horizontal electric field.

A semi-transmission type liquid crystal display device in a multi-domain vertical alignment mode is also proposed as well as the semi-transmission type liquid crystal display devices in the horizontal electric field mode. FIG. 39 is a cross-sectional view of a semi-transmission type liquid crystal panel in a vertical alignment mode used for a conventional liquid crystal display device described on pp. 133-136 of Asia Display/IDW01 (Non-Patent Document 2).

As for the conventional semi-transmission type liquid crystal display device in the vertical alignment mode shown in FIG. 39, a backlight 4007, a lower polarizing plate 4006, a lower quarter wavelength plate 4005, a liquid crystal layer 4003, an upper quarter wavelength plate 4002, and an upper polarizing plate 4001 are laminated from the back side in this order, and a reflection plate 4004 is formed under the liquid crystal layer 4003 in a reflective display area. The liquid crystal layer 4003 is a layer of homeotropically aligned liquid crystals having negative anisotropy of permittivity, so that it does not have anisotropy of refractive index, but has isotropy, with its display surface when no voltage is applied. Further, retardation axes of the upper quarter wavelength plate 4002 and the lower quarter wavelength plate 4005 are arranged to be perpendicular to each other. An optical sheet in which polarizing plate generating a linear polarization and the quarter wavelength plate are combined has an effect on generating a circular polarization. Such polarizing plate which generates a circular polarization is generally termed as a circular polarizing plate to be distinguished from a polarizing plate generating a linear polarization.

As for the semi-transmission type liquid crystal panel described in Non-Patent Document 2 configured as above, a light that passed the upper polarizing plate 4001 varies to a linear polarized light to enter the upper quarter wavelength plate 4002, and then varies to a circular polarized light in left circular to emerge in the reflective area in off-state when no voltage is applied. The light enters the liquid crystal layer 4003 next. As described above, because the liquid crystal layer does not have anisotropy of refractive index, the liquid crystal layer does not change the polarization state. Therefore, the light enters the reflection plate 4004 as it is, as the circular polarized light in left circular, and is converted into a circular polarized light in right circular when it is reflected by the reflection plate 4004, then enters again the liquid crystal layer 4003. The light which has been transmitted the liquid crystal layer 4003 as it is, as a circular polarized light in right circular, enters again the upper quarter wavelength plate 4002 to be converted into a linear polarized light. But the circular polarized light is rotated opposite to the polarized state of the circular polarized light firstly entered to the upper quarter wavelength plate, so that the emitted light here is a linear polarized light perpendicular to the one which has firstly entered the upper polarizing plate. Accordingly, the light entered the upper polarizing plate 4001 is absorbed thereby. That is, the reflective display part under no voltage application displays black. Contrary to this, when a voltage is applied, birefringence occurs in the display surface because liquid crystal in homeotropic alignment tilt, so the polarized state is varied, and the light is emitted, which results in a white display. Namely, a normally black transmissive display is accomplished.

On the other hand, the transmissive area in off-state with no voltage applied, a light that emerged from the backlight 4007 to enter the lower polarizing plate 4006 becomes a linear polarized light to enter the lower quarter wavelength plate 4005, and then becomes a right circular polarized light to enter the liquid crystal layer 4003. As described above, because the liquid crystal layer 4003 under no voltage application does not have anisotropy optically in the display surface, the incident right circular polarized light emerges from the liquid crystal layer 4003 as it is, and enters the upper quarter wavelength plate 4002. The incident light into the upper quarter wavelength plate 4002 is converted into a linear polarized light and absorbed by the upper polarizing plate. That is, the transmissive display part under no voltage application displays black. Contrary to this, when a voltage is applied, birefringence occurs in the display surface because of tilt liquid crystal which has been in vertical alignment and the light emerges because of variation of polarization state, which results in a white display. Namely, a normally black transmissive display is accomplished.

As described, the semi-transmission type liquid crystal display device in a vertical alignment mode is generally using a circular polarizing plate, so that a circular polarizing plate with higher performance is proposed.

FIG. 40 is a view showing a frame format of a structure of a broadband quarter wavelength plate, which is used for a conventional circular polarizing plate, described in "EKISHO" Vol. 9, No. 4, pp. 245-251, published by Japanese Liquid crystal Society (Non-Patent Document 3). As shown in FIG. 40, this broadband quarter wavelength plate comprises a half-wavelength film 5001 and a quarter-wavelength film 5002. The half-wavelength film 5001 is provided in the side of a linear polarizing plate which emits a linear polarized light, and a light enters therein at an azimuthal angle of 0 degree. A retardation axis of the half-wavelength plate 5001 is arranged at an angle of 15 degrees to the azimuthal angle of the incident linear polarized light. Further, a retardation axis of the quarter-wavelength film 5002 is arranged at an angle of 75 degrees.

An ideal circular polarizing plate is a polarizing plate which generates circular polarization at every wavelength. This requires that retardation with a range of one-quarter wavelength is generated at every wavelength. On the other hand, when a stretched film is used for a quarter-wavelength plate, a refractive index reduces with respect to a wavelength, so that retardation also tends to reduce. Accordingly, as for an example where a light having a wavelength of 550 nm is given retardation with a range of one-quarter wavelength, lights having shorter wavelengths than 550 nm are given much retardation than one-quarter wavelength, and lights having longer wavelengths than 550 nm are given less retardation than one-quarter wavelength.

Therefore, the broadband quarter-wavelength plate described in Non-patent Document 3 is designed where the half-wavelength film 5001 is combined with the quarter-wavelength film 5002 so as to accomplish retardation with a range of quarter-wavelength at every wavelength range.

However, a fine display cannot be accomplished by merely applying a circular polarizing plate to the above described conventional semi-transmission type liquid crystal display panels in horizontal electric field mode. For example, as for the semi-transmission type liquid crystal panel in horizontal electric field mode used for the liquid crystal display device, described in Patent Document 1, in which a linear polarizing plate is simply replaced by the circular polarizing plate recited in Non-Patent Document 2 or 3, the liquid crystal layer has anisotropy of refractive index in the reflective display area under no voltage application. Accordingly, a black display cannot be achieved due to variation of circular polarization state. The semi-transmission type liquid crystal panels in horizontal electric field mode used for the liquid crystal display devices recited in Patent Document 2 and Non-Patent Document 1 are same as above, the liquid crystal layers have anisotropy of refractive index in the reflective areas under no voltage application, and it cannot be changed into isotropy even when combined with half-wavelength plate. Accordingly, black displays cannot be achieved. As described above, it has turned out that the conventional semi-transmission type liquid crystal display panels in the horizontal electric field modes cannot accomplish fine displays by merely applying circular polarizing plates.

Therefore, though a circular polarizing plate improves significantly in its quality, as described in Non-Patent Document 3, there remains a problem where appropriate display cannot be achieved even if the circular polarizing plate adopted in the conventional semi-transmission type liquid crystal display device in the vertical alignment mode is applied to the conventional semi-transmission type liquid crystal display device in the horizontal electric field drive mode.

SUMMARY OF THE INVENTION

The present invention has been done in consideration of such a problem. Therefore, it is an object of the present invention to provide a liquid crystal panel capable of achieving an excellent display performance using a circular polarizing plate, and a liquid crystal display device and terminal device using the same, in particular, with respect to a semi-transmission type liquid crystal display device in a horizontal electric field mode (In-Plane Switching: IPS) mode.

In order to achieve the above object, a liquid crystal panel according to the present invention, comprises a backside substrate, a viewer-side substrate, and a liquid crystal layer disposed in between both of substrates, in which a pixel area includes a reflective display area where a light from a viewer side is reflected and a transmissive display area where a light from the backside is transmitted. The liquid crystal panel of which the liquid crystal layer at least in the transmissive display area is driven by a horizontal electric field when a voltage is applied in parallel to a surface of the substrate, in which the liquid crystal layer has anisotropy of a refractive index in a display surface, has a circular polarizing plate individually disposed outside of each the backside substrate and the viewer-side substrate, and a compensator having a function of reducing the refractive index anisotropy of the liquid crystal layer which is disposed in at least either one of intervals between the circular polarizing plates and respective substrates.

According to this liquid crystal panel, by disposing a compensator for counteracting anisotropy of refractive index in a display surface of a liquid crystal layer, it is possible to achieve a semi-transmission type liquid crystal panel in IPS mode which is capable of appropriate display even using a circular polarizing plate. That is, even if a circular polarizing plate is applied to a semi-transmission type liquid crystal panel in IPS mode, displays can be in a normally black mode both in a transmissive display area and a reflective display area. Further, an excellent viewing angle characteristic can be achieved because a liquid crystal layer is driven by the horizontal electric field. In addition, the viewing angle characteristic can be prevented from becoming worse due to the refractive index anisotropy because the compensation plate operates to counteract the refractive index anisotropy of the liquid crystal layer.

Further, the compensator is a compensation layer, and the compensation layer is preferable to be arranged at least in either one of areas between the liquid crystal layer and each of the substrates. With this, it is possible to improve the axial precision between the compensation layer and the liquid crystal layer. Therefore, a high-quality display can be achieved by improving the compensation precision of the compensation layer.

Furthermore, the compensator is a polymer network compensation layer, and the polymer network compensation layer is preferable to be arranged between the substrates. With this, it becomes possible to arrange the compensator and the liquid crystal layer in a coexisting manner. Thus, even if there is a change in the space between the substrates, the liquid crystal layer and the compensator can be automatically matched, which makes it possible to maintain a high display quality.

Moreover, electrodes for generating a horizontal electric field may be a parallel electrode pair; the width of the electrodes may be smaller than the thickness of the liquid crystal layer; orientation of liquid crystal molecules between the electrodes may be changed by the electric field generated by the parallel electrode pair; orientation of liquid crystal molecules on the electrodes may be changed like the liquid crystal molecules between the electrodes by conforming to the change in the orientation; and director direction of the liquid crystal molecules on the electrodes may be a direction different from a direction of the electric field on the electrodes.

With such liquid crystal display panel, not only the orientation of liquid crystal molecules between the electrodes but also that of the liquid crystal molecules on the electrodes can be changed. As a result, it is possible to increase the light use efficiency thereby to achieve a bright transmissive display and reflective display.

Further, the parallel electrode pair may be formed with metal. With this, the parallel electrode pair can be used as reflective plates, so that the brightness of the reflective display can be more improved. In addition, mal-orientation of the liquid crystal molecules generated at the boundary of the transmissive display and reflective display can be suppressed to improve the display quality.

Moreover, the total value of the width of the electrodes that constitute the pair of parallel electrodes and the space thereof is preferable to be equal to or less than the thickness of the liquid crystal layer. With this, a sense of high-definition in the display can be enhanced.

The liquid crystal panel according to the present invention may comprise a pixel magnifying device for optically magnifying the pixel. Further, the pixel magnifying device is a lens which magnifies the pixel at least in the electrode alignment direction of the parallel electrode pair, and it is preferable for the focal distance f of the lens to satisfy either one of the following equations, where the distance between the lens and the pixel is H, the electrode width of the parallel electrode pair is w, the inter-electrode distance is S, and the pitch of the pixel is P.

$$H \times L/(L+P) \leq f \leq H \times L/(L+w+S)$$

or $$H \times L/(L-w-S) \leq f \leq H \times L/(L-P)$$

With the present invention, it is possible to suppress a phenomenon that is observed when the transmissive display area and the reflective display area are separated, without deteriorating the image separation property of the image magnifying device. As a result, the present invention can provide a semi-transmissive display of high quality.

With the present invention, excellent display performance can be achieved with a circular polarizing plate applied to an IPS mode semi-transmission type liquid crystal display device.

DESCRIPTION OF PREFERRED EMBODIMENTS

Hereinafter, one embodiment of the present invention will be explained specifically with reference to the accompanying drawings.

Figure 1:
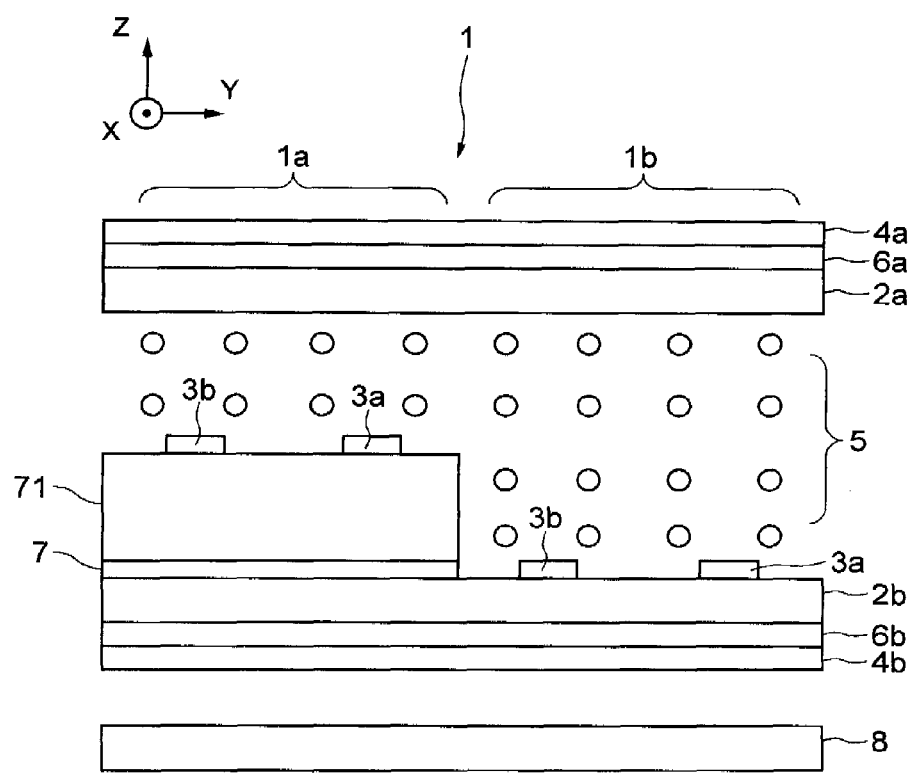
FIG. 1 is a cross-sectional view showing a structure of a liquid crystal display device according to a first embodiment of the present invention.
Figure 2:
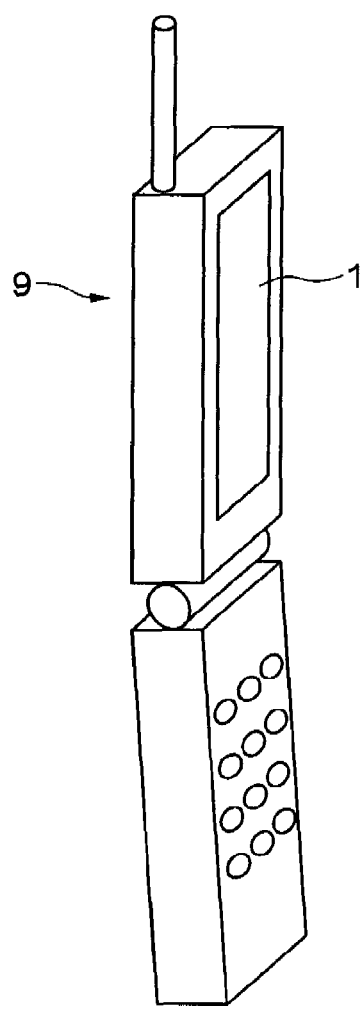
FIG. 2 is a perspective view showing a terminal device on which the liquid crystal display device according to embodiments of the present invention is mounted.

Firstly, a liquid crystal panel, a liquid crystal display device and a terminal device according to a first embodiment of the present invention will be described. FIG. 1 is a cross-sectional view showing a structure of the liquid crystal display device of the first embodiment in the present invention, and FIG. 2 is a perspective view showing the terminal device having the liquid crystal display device according to the present embodiment.

As shown in FIG. 1, the liquid crystal display device 1 according to the first embodiment comprises a viewer-side substrate 2a, a backside substrate 2b, and a liquid crystal layer 5 which is sandwiched in between both of substrates 2a and 2b, wherein a pixel area has a reflective display area 1a in which a light from a viewer-side is reflected and a transmissive display area 1b in which a light from a backside is transmitted, and the liquid crystal layer 5 in the reflective display area 1a and the transmissive display area 1b is driven by a horizontal electric field when a voltage is applied in parallel to the substrate surface.

The viewer-side substrate 2a and the backside substrate 2b has circular polarizing plates respectively outer sides thereof, a viewer-side circular polarizing plate 4a and a backside circular polarizing plate 4b, and a viewer-side compensation plate 6a and a backside compensation plate 6b, which are compensation plates reducing a refractive index anisotropy of the liquid crystal layer 5, are provided in between the circular polarizing plates and each substrate. Here, the circular polarizing plate is configured with a combination of a polarizing plate generating a linear polarization and a quarter-wavelength plate.

The liquid crystal display device 1 according to the present embodiment comprises two types of electrodes, a pixel electrode 3a and a common electrode 3b, formed on the liquid crystal layer 5 side surface of the backside substrate 2b. These two types of electrodes are formed in comb-shaped state, and the pixel electrodes 3a and the common electrodes 3b are arranged alternately in a direction perpendicular to a longitudinal direction of the comb-shaped state (in a transverse direction in FIG. 1). The electrodes are composed of a transparent conductor such as ITO (indium tin oxide).

A reflective plate 7 and an insulating layer 71 are provided between the electrodes and the backside substrate 2b in a part of the area where the pixel electrode 3a and the common electrode 3b are formed. When the liquid crystal display device 1 is viewed from the display surface side, a portion in which the reflective plate 7 exists operates as a reflective display area 1a, and other part than the above portion operates as a transmissive display area 1b. One pixel has the reflective display area 1a and the transmissive display area 1b, and the liquid crystal display device 1 is configured with a number of pixels arranged in a matrix form.

The liquid crystal layer 5 in the reflective display area 1a is half as thick as the liquid crystal layer in the transmissive display area 1b because of existence of the insulating layer 71. The viewer-side compensation plate 6a is provided on a surface of the viewer-side substrate 2a, which is opposite to the backside substrate 2b, and the viewer-side circular polarizing plate 4a is disposed thereon further. In the same manner as above, the backside compensation plate 6b is provided on a surface of the backside substrate 2b, which is opposite to the viewer-side substrate 2a, and the backside circular polarizing plate 4b is disposed thereunder. In addition, a backlight 8 is provided under the backside circular polarizing plate 4b which operates as a light source for transmissive display. According to the present embodiment, portions other than the backlight 8 in the liquid crystal display device 1 are defined as the liquid crystal panel.

Here, XYZ rectangular coordinate system is set as follows for convenience. A direction from the backside substrate 2b to the viewer-side substrate 2a is a +Z direction, and the opposite direction is a −z direction. The +Z and −Z directions are collectively termed as a Z-axis direction. A transverse direction in FIG. 1 is a Y-axis direction, in particular, the rightward direction is a +Y direction, and the opposite direction is a −Y direction. A +X direction is a direction with which a right handed coordinate system is formed. That is, when a thumb of a right hand is directed in the +X direction and an index finger in the +Y direction, a middle finger is directed to the +Z direction.

When the XYZ rectangular coordinate system is set as above, a direction in which the pixel electrodes 3a and the common electrodes 3b are arranged alternately become the Y-axis direction. A direction in which the pixel electrode 3a and the common electrode 3b extend, that is a comb-shaped longitudinal direction of the comb-shaped electrodes becomes the X-axis direction. The display surface of the liquid crystal display device 1 becomes a XY plane. When a structure in the Z-axis direction is taken particular note, the backlight 8, the backside circular polarizing plate 4b, the backside compensation plate 6b, the backside substrate 2b, the liquid crystal layer 5, the viewer-side substrate 2a, the viewer-side compensation plate 6a, and the viewer-side circular polarizing plate 4a are disposed in this order from the −Z direction to the +Z direction.

A pair of circular polarizing plates having opposite rotation directions of circular polarization each other is used for the viewer-side circular polarizing plate 4a and the backside circular polarizing plate 4b. For example, when the viewer-side circular polarizing plate 4a generates a circular polarized light rotating clockwise from an incident light from the −Z direction, the backside circular polarizing plate 4b is to be used for generating a circular polarized light rotating counterclockwise from an incident light from the +Z direction.

The liquid crystal layer 5 has positive-type liquid crystal molecules of which dielectric anisotropy is positive, and the liquid crystal layer 5 also has parallel alignment in such a manner that a longitudinal direction of the liquid crystal molecules become nearly the X-axis in a primary state when no voltage is applied between the pixel electrodes 3a and the common electrodes 3b with a general orientation processing. In the present embodiment, for convenience, a longitudinal direction of the liquid crystal molecules is set in a 15 degree direction from the +X direction, that is, a direction which is rotated by 15 degree from the +X direction to the +Y direction in the XY plane.

The viewer-side compensation plate 6a is provided for counteracting retardation in a display surface of the reflective display area 1a so that the liquid crystal layer has optical isotropy, for which a negative A plate of retardation film is used in the present embodiment. In general, retardation films are classified by shapes of three-dimensional index ellipsoid. Two of optical axes in the retardation film face are defined as A axis and B axis, and a direction of the thickness thereof is defined as C axis. When the film is a uniaxial medium and the surface thereof has an extraordinary refractive index, it is termed as an A plate putting the azimuth on the A axis. When the extraordinary refractive index is higher than an ordinary refractive index, the film is termed as a positive A plate, and when it is lower, the film is termed as a negative A plate.

The viewer-side compensation plate 6a according to the present embodiment uses a retardation plate in which a refractive index of the A axis is lower than refractive indexes of the B axis and C axis, in which the A axis is arranged along a longitudinal direction of the liquid crystal molecules in the liquid crystal layer 5 of the reflective display area 1a. That is, the A axis is in a direction rotated by 15 degree from the +X direction to the +Y direction in the XY plane.

Further, a retardation value of the viewer-side compensation plate 6a is set in a value with which retardation in the display surface of the liquid crystal 5 in the reflective display area is counteracted when no voltage is applied to the pixel electrodes 3a and the common electrodes 3b, so that the liquid crystal layer has optical isotropy.

The backside compensation plate 6b is a negative A plate of the retardation film as well as the viewer-side compensation plate 6a, the A axis thereof is arranged along a longitudinal direction of the liquid crystal molecules in the liquid crystal layer 5 of the transmissive display area 1b. That is, the A axis direction of the backside compensation plate 6b is in a direction rotated by 15 degree from the +X direction to the +Y direction in the XY plane. Further, a retardation value of the backside compensation plate 6b is set in a value with which retardation of the liquid crystal layer 5 in the transmissive display area is counteracted in cooperation with the viewer-side compensation plate 6a when no voltage is applied to the pixel electrodes 3a and the common electrodes 3b, so that the liquid crystal layer has optical isotropy.

As shown in FIG. 1, the liquid crystal layer 5 in the transmissive display area 1a is set to be twice as thick as the liquid crystal layer 5 in the reflective display area 1b, and birefringence of the liquid crystal molecules is the same between the transmissive display area 1b and the reflective display area 1a, so that the viewer-side compensation plate 6a and the backside compensation plate 6b are the retardation films having totally the same characteristic. Accordingly, the liquid crystal layer 5 both in the reflective display area 1a and the transmissive display area 1b become an isotropic layer counteracting optical anisotropy of the surface thereof.

As shown in FIG. 2, the liquid crystal display device 1 is mounted on a portable telephone 9.

Figure 3:
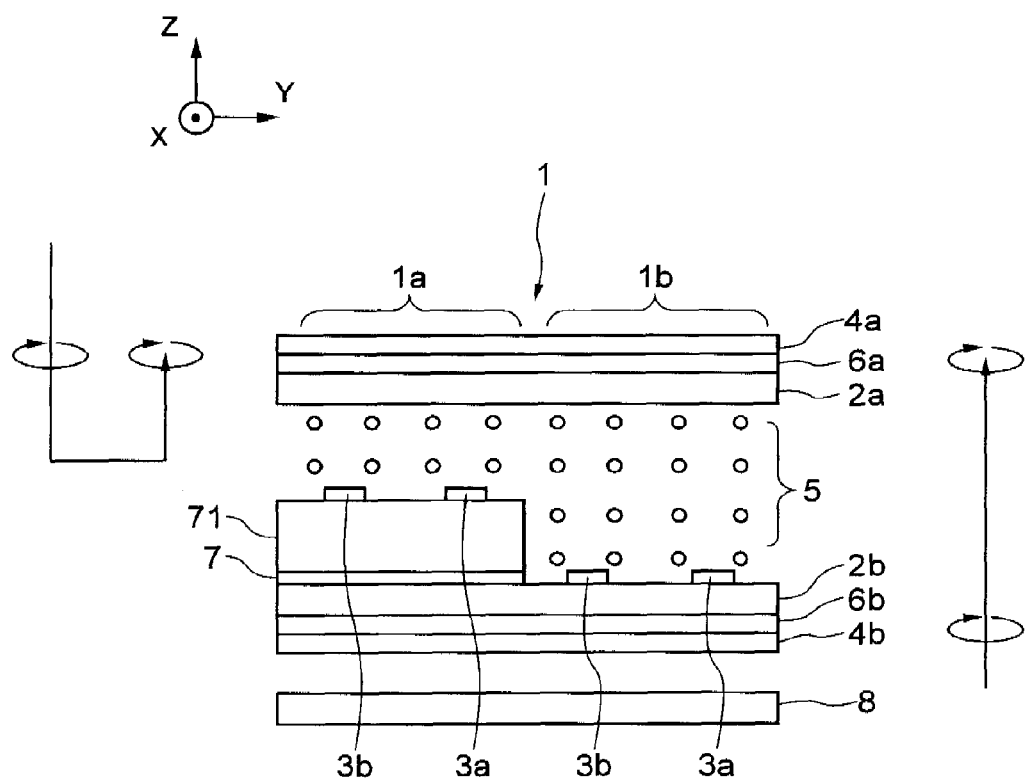
FIG. 3 is a view showing a frame format of an optical operation when no voltage is applied between a pixel electrode and a common electrode which are components of the embodiment illustrated in FIG. 1.
Figure 4:
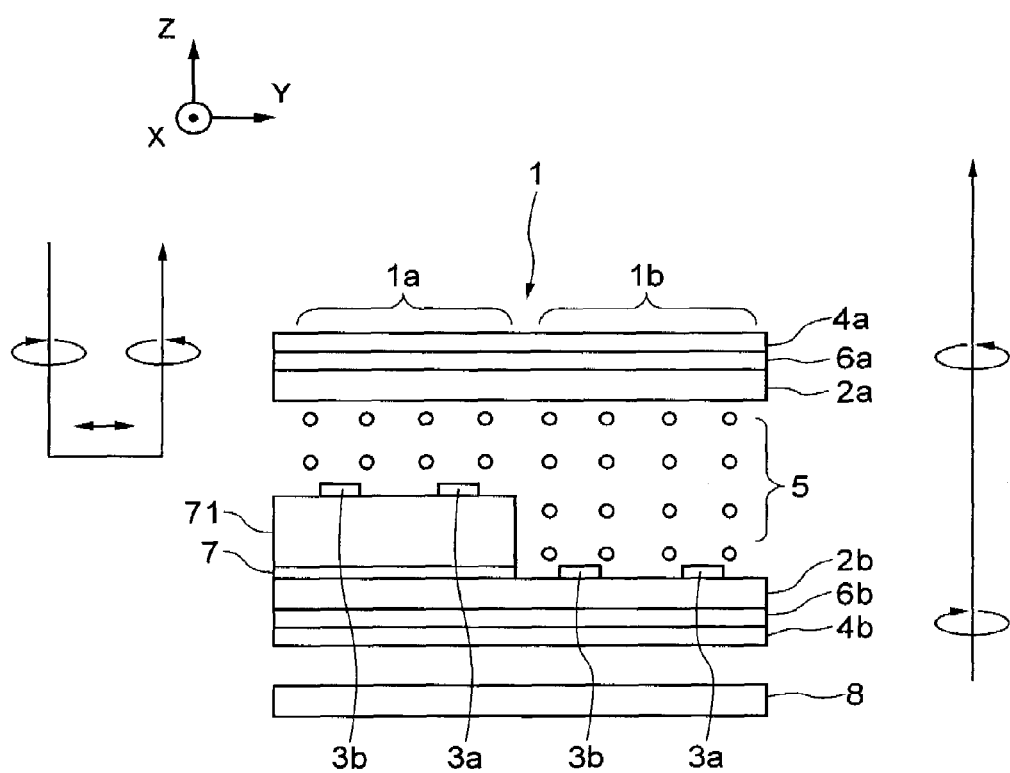
FIG. 4 is a view showing a frame format of an optical operation when a voltage is applied between the pixel electrode and the common electrode which are components of the embodiment illustrated in FIG. 1.

Next, operations of the liquid crystal display device 1 according to the present embodiment shown in FIG. 1, that is, operations of optical modulation of the liquid crystal display device 1 will be explained. FIG. 3 is a frame format of optical operation with respect to the liquid crystal display device 1 in which no voltage is applied between the pixel electrodes and the common electrodes, FIG. 4 is a frame format of optical operation in a case where a voltage is applied between the pixel electrodes and the common electrodes.

As shown in FIG. 3, when no voltage is applied to the pixel electrodes 3a and the common electrodes 3b, an external light entering the viewer-side circular polarizing plate 4a from outside emerges therefrom becoming a circular polarized light rotating clockwise and enters the viewer-side compensation plate 6a in the reflective display area 1a. As described, when no voltage is applied to the pixel electrodes 3a and the common electrodes 3b, the refractive index anisotropy in the display surface of the liquid crystal layer 5 in the reflective display area 1a is counteracted by the viewer-side compensation plate 6a, and the layer operates as an isotropic layer, so that the light which has been transmitted by the viewer-side compensation plate 6a and the liquid crystal layer 5 in the reflective display area 1a holds itself being a circular polarized light rotating clockwise.

Next, the light entered the reflective plate 7 is converted into a circular polarized light rotating counter-clockwise when reflected by the reflective plate 7, and enters again the liquid crystal layer 5 and the viewer-side compensation plate 6a in turn. As in the case of the incoming way, the refractive index anisotropy in the display surface of the liquid crystal layer 5 of the reflective display area 1a is counteracted by the viewer-side compensation plate 6a and the layer operates as an isotropic layer, so that the light emitted from the viewer-side compensation plate 6a holds itself being a circular polarized light rotating counter-clockwise.

Though the light enters the viewer-side circular polarizing plate 4a, this viewer-side circular polarizing plate 4a transmits a circular polarized light rotating clockwise, and absorbs a circular polarized light rotating counter-clockwise. Accordingly, the light does not emerge from the viewer-side circular polarizing plate 4a, which results in a block display. That is, when no voltage is applied to the pixel electrodes 3a and the common electrodes 3b, display in the reflective display area 1a becomes black.

Further, when no voltage is applied to the pixel electrodes 3a and the common electrodes 3b in the transmissive display area 1b, a light for the transmissive display which has emerged from the backlight 8 enters the backside polarizing plate 6b, and then emerges therefrom becoming a circular polarized light rotating counter-clockwise. The light enters the backside compensation plate 6b, the liquid crystal layer 5, and the viewer-side compensation plate 6a in this order. As described, the refractive index anisotropy in the display surface of the liquid crystal layer 5 in the transmissive display area 1b is counteracted by the backside compensation plate 6b and the viewer-side compensation plate 6a so that the layer operates as an isotropic layer. Accordingly, the light enters the viewer-side circular polarizing plate 4a as it is, as the circular polarized light rotating counter-clockwise.

The viewer-side circular polarizing plate 4a transmits a circular polarized light rotating clockwise, however, it absorbs a circular polarized light rotating counter-clockwise. Therefore, the light does not emerge from the viewer-side circular polarizing plate 4a, which results in a black display. That is, when no voltage is applied to the pixel electrodes 3a and the common electrodes 3b, the display becomes black in the transmissive display area 1b as in the case of the reflective display area 1a.

Next, as shown in FIG. 4, when a voltage is applied to the pixel electrodes 3a and the common electrodes 3b, the refractive index anisotropy varies because alignment in the liquid crystal layer 5 varies both in the reflective display area 1b and the transmissive display area 1a. The external light emerges from the viewer-side circular polarizing plate 4a becoming a circular polarized light rotating clockwise, and enters the viewer-side compensation plate 6a and the liquid crystal layer 5 in the reflective display area 1b.

The refractive index anisotropy of the liquid crystal layer 5 has varied because of the voltage as described, the circular polarized light rotating clockwise changes its polarization state. The change amount depends on an applied voltage and a provided thickness of the liquid crystal layer. If the state changes for one-quarter wavelength rotation, and the circular polarized light is converted into a linear polarized light, it enters the reflective plate 7. The reflective plate 7 does not have a function of changing the state of linear polarization, so that the linear polarized light emerges as it is, and enters the liquid crystal layer 5 and the viewer-side compensation plate 6a in the reflective display area 1a again.

As in the case of incoming way, the liquid crystal layer 5 and the viewer-side compensation plate 6a operate as a quarter-wavelength plate, so that the linear polarized light is converted into a circular polarized light rotating clockwise, and then enters the viewer-side polarizing plate 4a. Because the viewer-side polarizing plate 4a transmits a circular polarized light rotating clockwise, the light emerges and a white display is realized. That is, when a voltage is applied to the pixel electrodes 3a and the common electrodes 3b, the display in the reflective display area becomes white.

When a voltage is applied to the pixel electrodes 3a and the common electrodes 3b in the transmissive display area 1b, a light emitted from the backlight 8 for transmissive display enters the backside circular polarizing plate 6b, and emerges therefrom as a circular polarized light rotating counter-clockwise. The light then enters the backside compensation plate 6b, the liquid crystal layer 5, and the viewer-side compensation plate 6a in this order. Since the refractive index anisotropy of the liquid crystal layer 5 has varied because of the voltage as described, the polarized light rotating counter-clockwise changes its polarization state. The change amount depends on an applied voltage and a provided thickness of the liquid crystal layer. If the state changes for one-half wavelength, and the polarized light is converted into a polarized light rotating clockwise, the light which entered the viewer-side polarizing plate 4a as a circular polarized light rotating clockwise is transmitted by the viewer-side circular polarizing plate 4a, then a white display is realized. That is, when a voltage is applied to the pixel electrodes 3a and the common electrodes 3b in the transmissive display area 1b, the display becomes white as in the case of the reflective display area 1a.

As described above, the normally black mode semi-transmission type liquid crystal display device is achieved in which the transmissive display area and the reflective display area are driven by the horizontal electric field.

According to the liquid crystal display device 1 of the first embodiment, even the semi-transmission type liquid crystal display device in IPS mode having comb-shaped parallel electrodes can accomplish excellent display quality in viewing angles and the like utilizing a circular polarizing plate, by providing a compensation plate with which refractive index anisotropies in the display surface of the liquid crystal layer in the reflective display area 1a and the transmissive display area 1b are counteracted, which leads both of the transmissive display area and the reflective display area to be in the normally black mode. Moreover, in IPS mode, liquid crystal molecules do not rise but rotate in the display surface to display, so that an excellent viewing angle characteristic in principle is exhibited.

Here, according to the liquid crystal display device 1 of the present embodiment, the refractive index anisotropy in the display surface is completely counteracted by the viewer-side compensation plate 6a and the backside compensation plate 6b in the reflective display area 1a and the transmissive display area 1b, however, the liquid crystal display device is not limited to this. That is, compensation degrees depends on designs and productions, and the important point is that the semi-transmission type liquid crystal display device in IPS mode is realized by utilizing a compensation plate to reduce a refractive index anisotropy in the display surface of the liquid crystal layer 5, and then combining a circular polarizing plate therewith. In this regard, however, excellent performance can be achieved in contrast ratios, viewing angles, and the like when the refractive index anisotropy is counteracted as much as possible.

Further, according to the present embodiment, the liquid crystal layer 5 in the reflective display area 1a is half as thick as the liquid crystal layer 5 in the transmissive display area 1b, and the viewer-side compensation plate 6a counteracts the refractive index anisotropy in the display surface of the liquid crystal layer 5 in the reflective display area 1a so that the layer has isotropy, and the backside compensation plate 6b counteracts the refractive index anisotropy in the display surface of the liquid crystal layer 5 in the transmissive display area 1b in cooperation with the viewer-side compensation plate 6a so that the layer has isotropy. However, the present invention is not limited to this, and other thicknesses condition may be applied. The important thing is that the viewer-side compensation plate 6a counteracts the refractive index anisotropy in the display surface of the liquid crystal layer 5 in the reflective display area 1a, and that the backside compensation plate 6b counteracts the refractive index anisotropy in the display surface of the liquid crystal layer 5 in the transmissive display area 1b in cooperation with the viewer-side compensation plate 6a. In this regard, however, the cost can be low when the liquid crystal layer 5 in the reflective display area 1a is set in half the thickness of the liquid crystal layer 5 in the transmissive display area as in the present embodiment, because the same compensation plates can be utilized for the viewer-side compensation plate 6a and the backside compensation plate 6b.

Moreover, as described, the pixel electrodes 3a and the common electrodes 3b of the present embodiment are arranged in the Y-axis direction, and these longitudinal are in the X-axis direction, however, the present invention is not limited to this. The pixel electrodes and the common electrodes may be arranged diagonally to the X-axis direction, and the diagonal angle may have different value depending on a coordinate of the X-axis to have multi-domain structure. The multi-domain structure can improve a viewing angle characteristic, especially, when a voltage is applied.

Further, the example has been described in which the liquid crystal display device of the present embodiment comprises the pixel electrodes 3a and the common electrodes 3b made of transparent conductor such as ITO, however, the present invention is not limited to this. The pixel electrodes and the common electrodes may be made of optically opaque metal. With this, the pixel electrode or the common electrode and the wiring can be used in common when supplying voltages for driving the liquid crystal layer through the use of switching devices such as the thin-film transistors in particular. This allows simplification of the process. Further, in general, it is easier to process a metal body than processing a transparent semiconductor. Based on the reasons above, it is possible to cut the cost. Furthermore, when a voltage is not applied to the pixel electrode and the common electrode so that no potential difference is generated therebetween, i.e. in the case of black display, it is possible with the present invention to achieve an excellent black display with less excessive whitening phenomenon by reducing the reflection at the pixel electrode or common electrode formed with metal. The reason is that the liquid crystal layer is changed into an isotropic layer within the display surface by the compensation plate under the black display state and a circular polarizing plate is provided therein. Therefore, like the black display state in the reflective display area, the light made incident on the liquid crystal display device from outside cannot be outputted to the outside. Furthermore, the reflective display area may be on comb-shaped electrodes formed out of metal as in the reflection type liquid crystal panel in the horizontal electric field mode used for the conventional liquid crystal display device described in Patent Document 2.

In addition, according to the liquid crystal display device of the present embodiment, the pixel electrode $3a$ and the common electrode $3b$ are formed in the same layer, however, the present invention is not limited to this. These electrodes can be formed in different layers as long as they are in a parallel electrode type, and an insulating layer may be formed between those different electrode layers. In particular, when it is applied to an active-matrix type, the pixel electrode and the common electrode can be formed using a gate electrode forming a thin film transistor of an pixel, and a source or a drain electrode, with which a new layer is not needed to be provided, and the cost can be low.

Further, the liquid crystal display device of the present embodiment can be combined with the FFS mode liquid crystal panel described in Non-Patent Document 1. Moreover, the common electrode or the pixel electrode may also work as a reflective plate.

Further, according to the liquid crystal display device of the present embodiment, the liquid crystal molecules are oriented in parallel by a general orientation processing. The general orientation processing includes a rubbing process for an organic film such as polyimide, oblique evaporation for an inorganic film, and the like.

Moreover, according to the liquid crystal display device of the present invention, the liquid crystal molecules have positive dielectric anisotropy, however, the present invention is not limited to this. Liquid crystal molecules having negative dielectric anisotropy can be utilized. In this regard, however, the liquid crystal molecules having negative dielectric anisotropy are required to be set in a orientation direction nearly parallel to an electric field direction in its primary orientation, that is, it is needed to be set in a direction of nearly the +Y-axis which is rotated by 90 degrees from the direction of the above described present invention in the XY plane, because the orientation direction of the liquid crystal molecules having negative dielectric anisotropy is varied to be vertical to a direction of the electric field when a voltage is applied. The viewer-side compensation plate $6a$ and the backside compensation plate $6b$ also need to be rotated by 90-degree for arrangement in the XY plane.

Further, according to the liquid crystal display device of the present embodiment, the reflective plate 7 simply works as a mirror surface. However, it may have finely uneven surface to control its reflective characteristic for external light.

Furthermore, the liquid crystal display device of the present embodiment may have a planarizing layer formed on the pixel electrodes $3a$ and the common electrodes $3b$ in comb-shaped state. Accordingly, effect of the uneven shape of comb-shaped electrodes on the liquid crystal alignment can be reduced, and the liquid crystal can be aligned evenly, which improves the quality with preventing variation in optical characteristics.

In addition, according to the liquid crystal display device of the present embodiment, the thickness of the liquid crystal layer 5 is different between the reflective display area $1a$ and the transmissive display area $1b$. Accordingly, tones in the reflective display and the transmissive display can be appropriately adjusted.

As described above, the liquid crystal display device according to the present invention can be suitably applied to portable terminal apparatuses such as portable telephones. The portable terminal apparatuses include not only portable telephones, but also PDAs (Personal Digital Assistants), game machines, digital cameras, and camcorders, and the like. Further, the liquid crystal display device according to the present invention can be applied not only to the portable terminal devices, but also to various kinds of terminal apparatuses such as laptop computers, cash dispensers, and vending machines.

Further, conventionally, it has been attempted to reduce refractive index anisotropy and, especially, to improve a viewing angle characteristic, by providing a compensation plate to a complete transmission type liquid crystal display device in a horizontal electric field mode which does not have a reflective display area. A linear polarizing plate is utilized in this case, but a good semi-transmissive display cannot be realized only with a reflective display area formed by providing a reflective plate. That will be explained as follows.

Refractive index anisotropy in a display surface is counteracted by the compensation plate, as well as the present invention, in the reflective display area formed merely by providing the reflective plate to the conventional liquid crystal display device. However, the polarizing plate is a plate emitting a linear polarized light, so that an external light transmitted through the polarizing plate reaches the reflective plate as the linear polarized light. As described, while the reflective plate reverses a rotation direction of a circular polarized light, it reflects a linear polarized light as it is, so that the reflected light is still the linear polarized light. Next, the light is transmitted by the liquid crystal layer and the compensation plate. Because the refractive index anisotropy is counteracted there, the light enters the polarizing plate without its polarization state changed. The polarization state is the same as one of incoming way, so that the light is transmitted by the polarizing plate and a display cannot be black. That is, excellent semi-transmissive display cannot be achieved with this structure.

Figure 5:
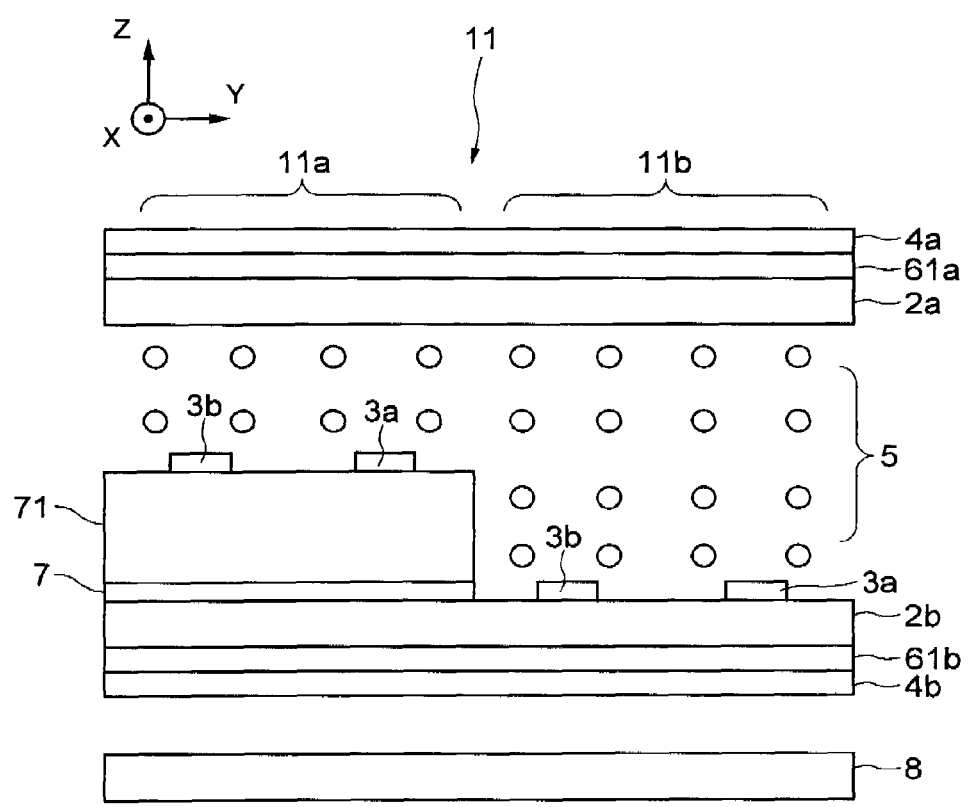
FIG. 5 is a cross-sectional view showing a structure of a liquid crystal display device according to a second embodiment of the present invention.

Next, a second embodiment according to the present invention will be explained. FIG. 5 is a cross-sectional view showing a structure of a liquid crystal display device 11 according to the second embodiment. FIG. 5 has the same reference numerals as in FIG. 1 for the same components.

Compared to the first embodiment, the second embodiment is different in that a viewer-side compensation plate $61a$ is used instead of the viewer-side compensation plate $6a$, and a backside compensation plate $61b$ is used instead of the backside compensation plate $6b$ for the liquid crystal display device 11 described therein. The viewer-side compensation plate $61a$ and the backside compensation plate $61b$ are positive A plates of retardation film, and extraordinary directions of these refractive index are set to be in vertical to an orientation direction of liquid crystal molecules in a liquid crystal layer 5. That is, an A axis is in a direction rotated by 15 degree from a +X direction to a −Y direction in a XY plane.

Further, when no voltage is applied to pixel electrodes $3a$ and common electrodes $3b$, a retardation value of the viewer-side compensation plate $61a$ is set in a value with which retardation in a display surface of the liquid crystal layer 5 in a reflective display area $11a$ is counteracted so that the liquid crystal layer has optical isotropy. Furthermore, when no voltage is applied to the pixel electrodes $3a$ and the common electrodes $3b$, a retardation value of the backside compensation plate $61b$ is set in a value with which retardation of the liquid crystal layer 5 in a transmissive display area $11b$ is counteracted in cooperation with the viewer-side compensation plate 61a so that the liquid crystal layer has optical isotropy. Structures of the present embodiment apart from the above are the same as ones of the first embodiment.

Compared to the liquid crystal display device 1 according to the first embodiment, the liquid crystal display device 11 according to the present embodiment is inferior in a viewing angle characteristic because a retardation value in the XY plane is larger than a retardation value in the Z-axis direction. However, the liquid crystal display device 11 can be manufactured in low cost because an often-used positive A plate of retardation plate can be utilized as a compensation plate. Operations and effects apart from the above are the same as ones of the first embodiment.

Figure 6:
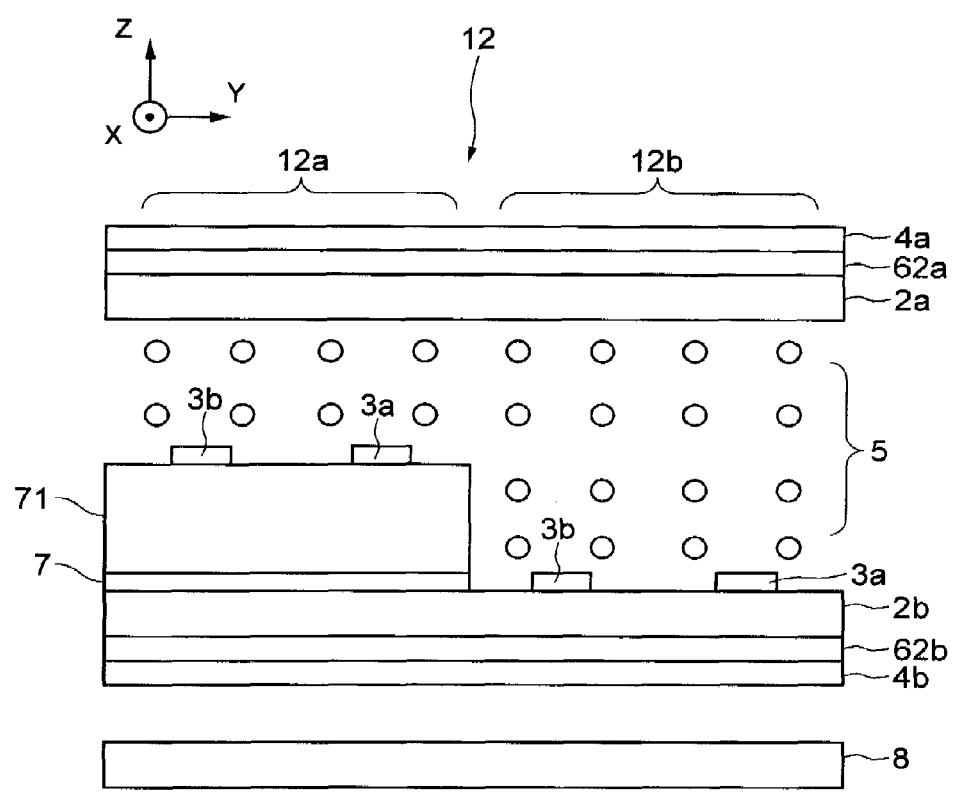
FIG. 6 is a cross-sectional view showing a structure of a liquid crystal display device according to a third embodiment of the present invention.

Next, a third embodiment according to the present invention will be explained. FIG. 6 is a cross-sectional view showing a structure of a liquid crystal display device 12 in the third embodiment. FIG. 6 has the same reference numerals as in FIG. 1 showing the first embodiment to indicate the same components.

Compared to the liquid crystal display device 1 according to the first embodiment, the liquid crystal display device shown in the third embodiment is different in that a viewer-side compensation plate 62a are used instead of the viewer-side compensation plate 6a, and a backside compensation plate 62b are used instead of the backside compensation plate 6b. The viewer-side compensation plate 62a and the backside compensation plate 62b are retardation films in which two retardation films, a positive A plate and a positive C plate, are put together.

The positive C plate is a retardation film having a positive extraordinary refractive index in a direction of film thickness, and an index ellipsoid is in a shape of raised cylinder. An extraordinary direction of the refractive index in the positive A plate is set to be vertical to an orientation direction of liquid crystal molecules in a liquid crystal layer 5. That is, the A axis is in a direction rotated by 15 degrees from the +X direction to the −Y direction in the XY plane. Further, when no voltage is applied to a pixel electrodes 3a and a common electrodes 3b, a retardation value in the positive A plate of the viewer-side compensation plate 62a is set in a value with which retardation of a display surface of the liquid crystal layer 5 in a reflective display area 12a is counteracted so that the liquid crystal layer has optical isotropy. A retardation value in the positive C plate of the viewer-side compensation plate 62a is set to make the index ellipsoid be a complete sphere in cooperation with the refractive index anisotropies of the liquid crystal layer 5 in the reflective display area 12a and the positive A plate.

As in the case above, when no voltage is applied to the pixel electrodes 3a and the common electrodes 3b, a retardation value in the positive A plate of the backside compensation plate 62b is set in a value with which retardation in the display surface of the liquid crystal layer 5 in the transmissive display area 12b is counteracted in cooperation with the positive A plate of retardation film of the viewer-side compensation plate 62a so that the liquid crystal layer has optical isotropy. A retardation value of the positive C plate as the backside compensation plate 62b is set to make the index ellipsoid be a complete sphere in cooperation with the refractive index anisotropies of the liquid crystal layer 5 in the transmissive display area 12a and the positive A plate. Other structures than the above of the present embodiment are the same as ones of the first embodiment.

Compared to the liquid crystal display device 1 in the first embodiment, the liquid crystal display device 12 of the present embodiment can be improved in a viewing angle characteristic because a combination of the refractive index anisotropies of the liquid crystal layer 5, the viewer-side compensation plate 62a, and the backside compensation plate 62b can make the index ellipsoid be a complete sphere.

Further, according to the liquid crystal display device 12 of the present embodiment, different retardation plates, the positive A plate and the positive C plate, are combined to be used, which allows the directions of XYZ to be set independently. For example, when it is required to provide a protective film to a compensation plate, a polarizing plate and the like, refractive index anisotropies can be compensated even for the protective film, which is advantageous to improve performance of contrast ratios, viewing angle characteristic, and so on.

According to the liquid crystal display device of the present embodiment, both of the viewer-side compensation plate 62a and the backside compensation plate 62b are made of the positive A plate and the positive C plate combined, however, the present invention is not limited to this, the configuration can be varied if required. For example, the viewer-side compensation plate 62a may be made of the positive A plate only, and the backside compensation plate 62b may employ the positive A plate and the positive C plate, in which this positive C plate may counteract a refractive index anisotropy only in the thickness direction of the transmissive display area.

In the case above, a viewing angle characteristic for the refractive display becomes sacrificed, however, the transmissive display can obtain a good performance. Further, the cost can be low because one of the positive C plates can be omitted. Here, the viewing angle characteristic can be improved even if the positive C plate does not counteract completely the refractive index anisotropy in the thickness direction of the transmissive display area. Other operations and effects of the third embodiment than the above are the same as ones of the first embodiment.

Figure 7:
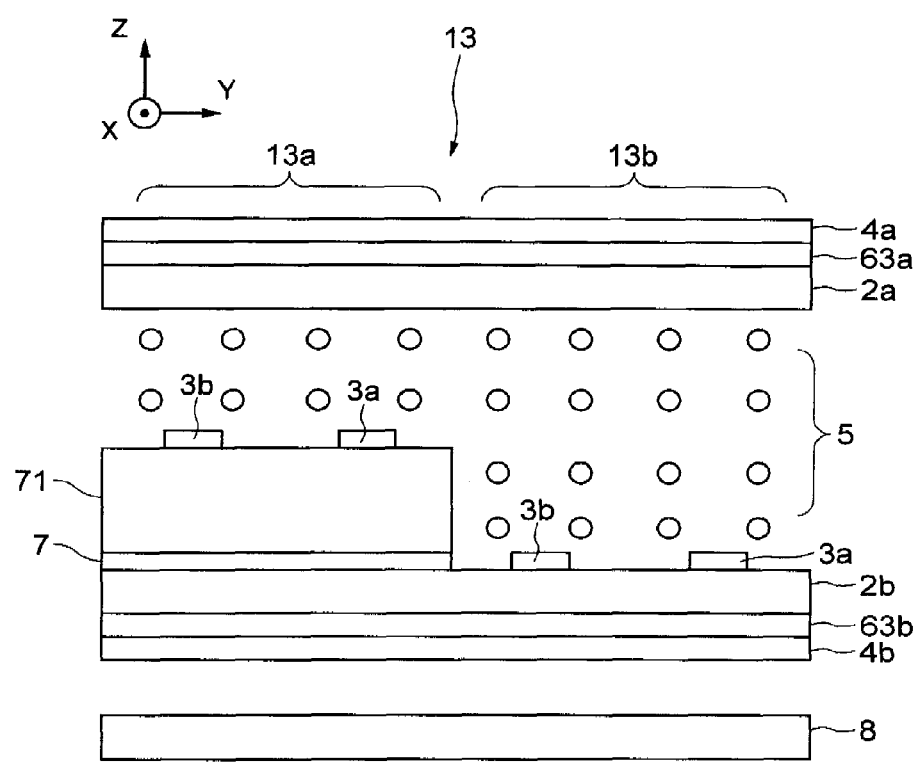
FIG. 7 is a cross-sectional view showing a structure of a liquid crystal display device according to a fourth embodiment of the present invention.

Next, a fourth embodiment according to the present invention will be explained. FIG. 7 is a cross-sectional view showing a structure of a liquid crystal display device 13 of the fourth embodiment. The same components are indicated in the same reference numerals between FIG. 7 and FIG. 1 showing the first embodiment.

Compared to the liquid crystal display device 1 of the first embodiment, the liquid crystal display device 13 of the fourth embodiment is different in that a viewer-side compensation plate 63a is used instead of the viewer-side compensation plate 6a, and a backside compensation plate 63b is used instead of the backside compensation plate 6b. The viewer-side compensation plate 63a and the backside compensation plate 63b are biaxial retardation films having different values of each three-dimensional main refractive index.

A value of three-dimensional main refractive index of the viewer-side compensation plate 63a is set to counteract extraordinary refractive index of the liquid crystal layer 5 in the reflective display area 13a so as to make an index ellipsoid be a complete sphere. Further, a value of three-dimensional main refractive index of the backside compensation plate 63b is set to counteract extraordinary refractive index of the liquid crystal layer 5 of the transmissive display area 13b in cooperation with the viewer-side compensation plate 63a so as to make the index ellipsoid be a complete sphere. Other structures of the present embodiment than the above are the same as ones of the first embodiment.

The liquid crystal display device of the present embodiment can make the index ellipsoid be a complete sphere as well as the liquid crystal display device 12 of the third embodiment, which can improve a viewing angle characteristic. Further, the present embodiment needs less retardation films than the third embodiment, which enables the cost to be low.

Moreover, as in the liquid crystal display device 12 of the third embodiment, the liquid crystal display device of the present embodiment can employ different combinations for the viewer-side compensation plate and the backside compensation plate. For example, the viewer-side compensation plate may be made of the positive A plate only, and the backside compensation plate may use the biaxial retardation film of the present embodiment, then the positive A plate and the biaxial retardation film may counteract the refractive index anisotropy in the transmissive display area. Other operations and effects of the fourth embodiment are the same as ones of the first embodiment.

Figure 8:
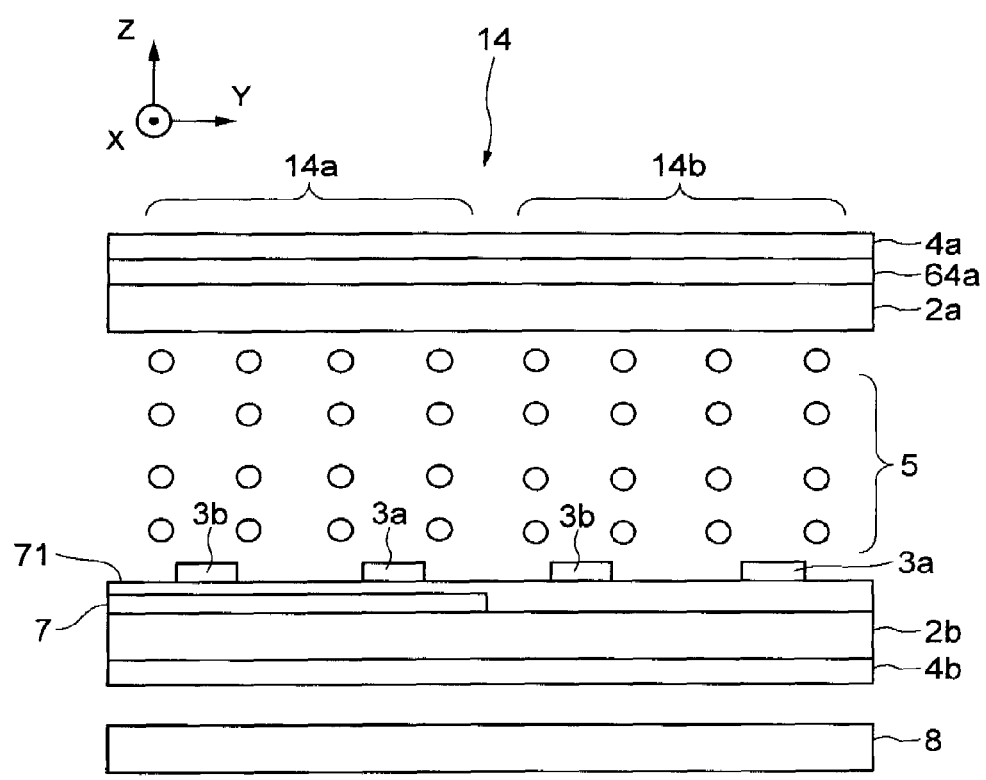
FIG. 8 is a cross-sectional view showing a structure of a liquid crystal display device according to a fifth embodiment of the present invention.

Next, a fifth embodiment of the present invention will be explained. FIG. 8 is a cross-sectional view showing a structure of a liquid crystal display device 14 of the fifth embodiment. The same components are indicated in the same reference numerals between FIG. 8 and FIG. 1 showing the first embodiment.

Compared to the liquid crystal display device 1 of the first embodiment, the liquid crystal display device 14 according to the fifth embodiment is different in that the thickness of the liquid crystal layer 5 is even between the reflective display area 14a and the transmissive display area 14b, a viewer-side compensation plate 64a are used instead of the viewer-side compensation plate 6a, and a backside compensation plate is omitted. For the viewer-side compensation plate 64a, the negative A plate of retardation film is used as in the case of the viewer-side compensation plate 6a of the first embodiment. When no voltage is applied to pixel electrodes 3a and common electrodes 3b, a retardation value of the viewer-side compensation plate 64a is set to counteract refractive index anisotropy in a display surface of a liquid crystal layer 5 of a transmissive display area 14b so as to make the liquid crystal layer have optical isotropy. Because the thickness of the liquid crystal layer 5 is even between the transmissive display area 14b and a reflective display area 14a, when the refractive index anisotropy of the liquid crystal layer 5 is counteracted in the transmissive display area 14b, the refractive index anisotropy of the liquid crystal layer 5 in the reflective display area 14a is also counteracted. Other structures of the present embodiment than the above are the same as ones of the first embodiment.

According to the liquid crystal display device 14 of the present embodiment, it is required to apply different drive voltage between the reflective display area 14a and the transmissive display area 14b in order to adjust tones between the reflective display area and the transmissive display area, but omission of the backside compensation plate allows the cost to be low, and can prevent characteristic variations due to increase of films.

Further, in order to apply different voltages between the reflective display area and the transmissive display area, it may be possible to form an insulating layer on electrodes in the reflective display area to reduce an effective electric field. Furthermore, the effective electric field in the reflective display area can be reduced by forming intervals between the comb-shaped pixel electrodes and common electrodes in the reflective display area arranged wider than intervals of the comb-shaped pixel electrodes and common electrodes in the transmissive display area.

When the thickness of the liquid crystal layer between the reflective display area and the transmissive display area cannot be even due to the laminar structure, it is preferable that a retardation value of the viewer-side compensation plate should be determined according to the thickness of liquid crystal layer in the transmissive display area giving priority to the transmissive display performance. It is because the transmissive display performance has priority over the reflective display performance in general. Other operations and effects of the fifth embodiment than the above are the same as ones of the first embodiment.

Figure 9:
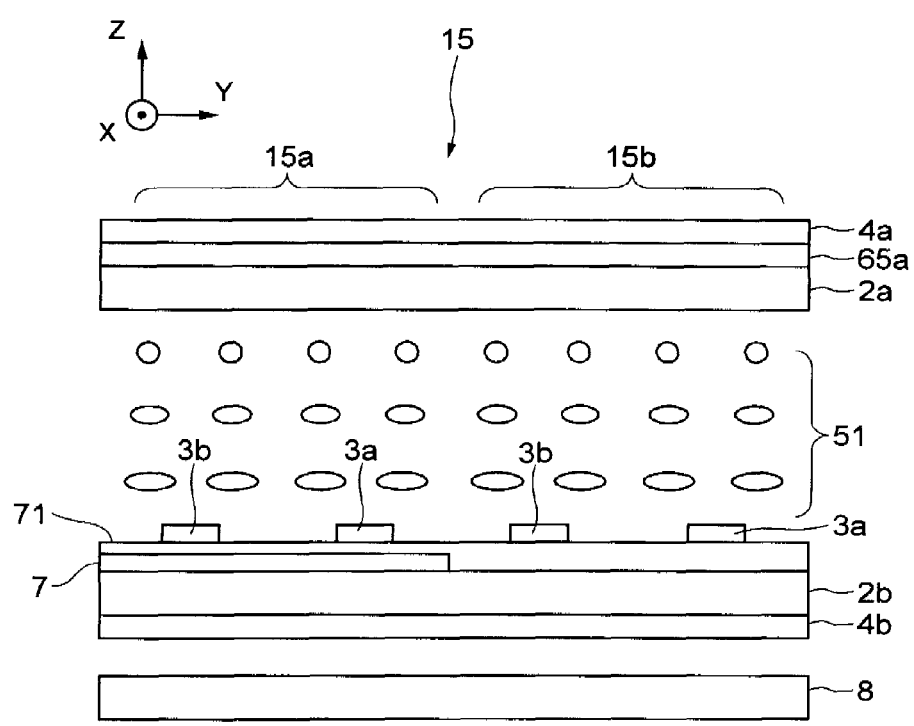
FIG. 9 is a cross-sectional view showing a structure of a liquid crystal display device according to a sixth embodiment of the present invention.

Next, a sixth embodiment according to the present embodiment will be explained. FIG. 9 is a cross-sectional view showing a structure of a liquid crystal display device 15 of the sixth embodiment. The same components are indicated in the same reference numerals between FIG. 9 and FIG. 8 showing the fifth embodiment.

Compared to the liquid crystal display device 14 of the fifth embodiment, the liquid crystal display device 15 of the sixth embodiment is different in that a liquid crystal layer 51 having twist-aligned liquid crystal molecules is used instead of the liquid crystal layer 5 having a parallel-aligned liquid crystal molecules, and a viewer-side compensation plate 65a are used instead of the viewer-side compensation plate 64a.

In order to realize the twist alignment in a prescribed direction, the liquid crystal layer 51 includes chiral materials together with the positive type liquid crystal molecules, and a viewer-side substrate 2a and a backside substrate 2b are processed to have different orientation directions each other. For example, the viewer-side substrate 2a is processed to have the liquid crystal molecules oriented in the −X direction, the backside substrate 2b is processed to have the liquid crystal molecules oriented in the −Y direction, and chiral materials rotated counter-clockwise are mixed with the liquid crystal molecules.

Accordingly, when no voltage is applied to pixel electrodes 3a and common electrodes 3b, the liquid crystal molecules of the liquid crystal layer 51 are oriented in the Y-axis direction near the backside substrate 2b, rotated clockwise by 90 degrees toward the viewer-side substrate 2a which is in the +Z direction, and are oriented in the X-axis direction near the viewer-side substrate 2a.

On the other hand, the viewer-side compensation plate 65a is a twisted-nematic retardation film provided to counteract refractive index anisotropy of the liquid crystal layer 51, in which rod-shaped polymeric liquid crystals are oriented to counteract the refractive index anisotropy of the liquid crystal layer 51. For example, the rod-shaped polymeric liquid crystals are twisted-aligned from the X-axis direction to the Y-axis direction, rotated counter-clockwise toward +Z direction, and its retardation is set in a value to counteract the refractive index anisotropy of the liquid crystal layer 51.

As described, according to the liquid crystal display device 15 of the present embodiment, the thickness of the liquid crystal layers 51 are even in the transmissive display area 15b and the reflective display area 15a, so that when the refractive index anisotropy of the liquid crystal layer 51 in the transmissive display area 15b is counteracted, the refractive index anisotropy of the liquid crystal layer 51 in the reflective display area 15a is also counteracted. Other structures in the present embodiment than the above are the same as ones of the fifth embodiment.

The liquid crystal display device 15 of the present embodiment applies the liquid crystal layer 51 having a twist state in the primary orientation to prevent variations of birefringence due to thickness variations of the liquid crystal layer 51 caused by variation of manufacturing processes, which realizes a good compensation. That is, the liquid crystal layer 5 of the fifth embodiment have an uniaxial orientation in a certain direction, so that thickness variations of the liquid crystal layer 5 affects variation of birefringence in the XY plate greatly. On the other hand, the orientation directions are distributed in two-dimensional in the XY plate in the present embodiment, which can reduce effect of the thickness variation.

Here, as for the liquid crystal display device 15 according to the present embodiment, the liquid crystal layer 51 has the liquid crystal molecules oriented in the Y-axis direction near the backside substrate 2b, rotated counter-clockwise by 90 degree toward the viewer-side substrate 2a in the +Z direction, while oriented in the X-axis direction near the viewer-side substrate 2a, when no voltage is applied to the pixel electrodes 3a and the common electrodes 3b. However, the present invention is not limited to this. Different angles can be used for both an orientation angle and a twist angle near the substrates. When those angles are changed, however, an angle in the viewer-side compensation plate 65a should be changed. In particular, when the liquid crystal molecules are set to be oriented in a direction except an electric field direction, optical modulation effect can be increased in the liquid crystal layer 51 when voltage is applied, which allows improved transmission and a bright display. According to the present embodiment, the pixel electrodes 3a and the common electrodes 3b are arranged in the Y-axis direction, so that the electric field direction is in the Y-axis direction in the XY plane. Therefore, it is desirable that the primary orientation direction of the liquid crystal molecules should not direct to the Y-axis at any point on the Z-axis. For example, the liquid crystal molecules near the backside substrate 2b are oriented in a direction rotated by 10 degree from the −X direction to the +Y direction, and it rotates counter-clockwise by 90 degrees toward the viewer-side substrate 2a in the +Z direction, while the liquid crystal molecules near the viewer-side substrate 2a are oriented in a direction rotated by 10 degree from −Y direction to −X direction.

Further, assuming that there is a perpendicular line to the electric field direction in the display surface, it is desirable that the primary orientations of the liquid crystal layers of the viewer-side substrate 2a and the backside substrate 2b should be disposed axisymmetrically about the perpendicular line. Optical modulation effect under voltage application can be enlarged in such a liquid crystal layer, so that a brighter display can be realized.

According to the above description, the rod-shaped polymeric liquid crystal is used in the viewer-side compensation plate 65a of the present embodiment, however, the present invention is not limited to this. A twist-aligned discotic liquid crystal can be also used. In this case, the discotic liquid crystal molecules are vertically aligned shape as a disk set up, and a surface of the disk rotates in a direction in which the disk stands. Accordingly, an index ellipsoid can be closed to a sphere, and a viewing angle characteristic can be improved.

Moreover, the twisted-nematic retardation film having the rod-shaped polymeric liquid crystal which is twist-aligned according to the present embodiment can be utilized in combination with the positive C plate of retardation film.

Accordingly, the index ellipsoid can be a complete sphere, which enables a viewing angle characteristic to be improved. It is desirable that the positive C plate of the retardation film should be disposed in the viewer-side compensation plate 65a to compensate optically both of a reflective display area 15a and a transmissive display area 15b, however, the positive C plate may be disposed between the backside substrate 2b and the backside polarizing plate 4b to compensate optically the transmissive display area 15b only. Other operations and effects of the sixth embodiment are the same as ones of the first embodiment.

Figure 10:
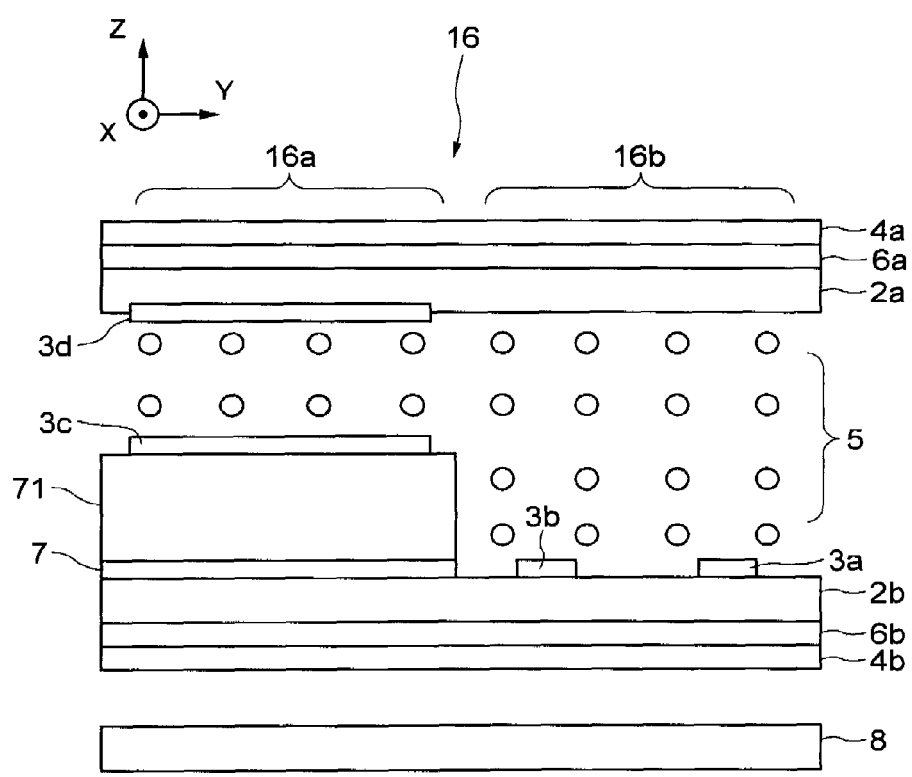
FIG. 10 is a cross-sectional view showing a structure of a liquid crystal display device according to a seventh embodiment of the present invention.

Next, a seventh embodiment according to the present invention will be explained. FIG. 10 is a cross-sectional view showing a structure of a liquid crystal display device 16 of the seventh embodiment. The same components of FIG. 8 are indicated in the same reference numerals as in FIG. 1 showing the first embodiment.

Compared to the liquid crystal display device 1 of the first embodiment, the liquid crystal display device 16 of the seventh embodiment is different in that a viewer-side substrate 2a in a reflective display area 16a is provided with a common electrode 3d for a vertical electric field and a backside substrate 2b is provided with a pixel electrode 3c for the vertical electric field, and that liquid crystal molecules of a liquid crystal layer 5 in the reflective display area 16 is driven by the vertical electric field. A transmissive display area 16b is driven by a horizontal electric field as in the case of the first embodiment. Other structures of the present embodiment than the above are the same as ones of the first embodiment.

Compared to the liquid crystal display device 1 of the first embodiment, the liquid crystal display device 16 of the present invention can be improved in its reflectance although a viewing angle characteristic becomes worse in the reflective display, because the reflective display area 16a thereof can be driven by a vertical electric field. The visibility of reflective display depends largely on a distribution characteristic of the light source and a reflective characteristic of the reflection plate. Thus, it is possible that the user may not actually feel a large effect even though the viewing angle characteristic of the reflective display is improved, depending on the conditions of the light source or the like. However, when the reflectance is improved rather than the viewing angle characteristic of the reflective display, the user can visually recognize the reflective display under the more divers light source condition. As described, the embodiment can preferably be applied especially to the case where improvements in the reflectance are taken into account before improving the viewing angle characteristic.

This embodiment refers to the case where the liquid crystal molecules in the reflective display area are driven by the vertical electric field. As in the embodiment, the critical point constituting the basis of the present invention is the structure in which a compensator for giving isotropy is combined with the liquid crystal layer that has the reflective index anisotropy within the display surface, and a circular polarizing plate is provided. That is, the horizontal electric field drive is not necessarily an essential structural element. However, the viewing angle characteristic can be improved greatly through applying the horizontal electric field drive. Further, although it has been described by referring to the case where the present invention is applied to a semi-transmission type liquid crystal display device, the present invention can also be applied to a complete-transmission type liquid crystal display device. However, it is preferable to be applied in particular to the semi-transmission type liquid crystal display device because the display control can be largely simplified, since the transmissive display and the reflective display can be standardized to a normally black mode.

Other operations and effects than the above are the same as ones of the first embodiment.

Figure 11:
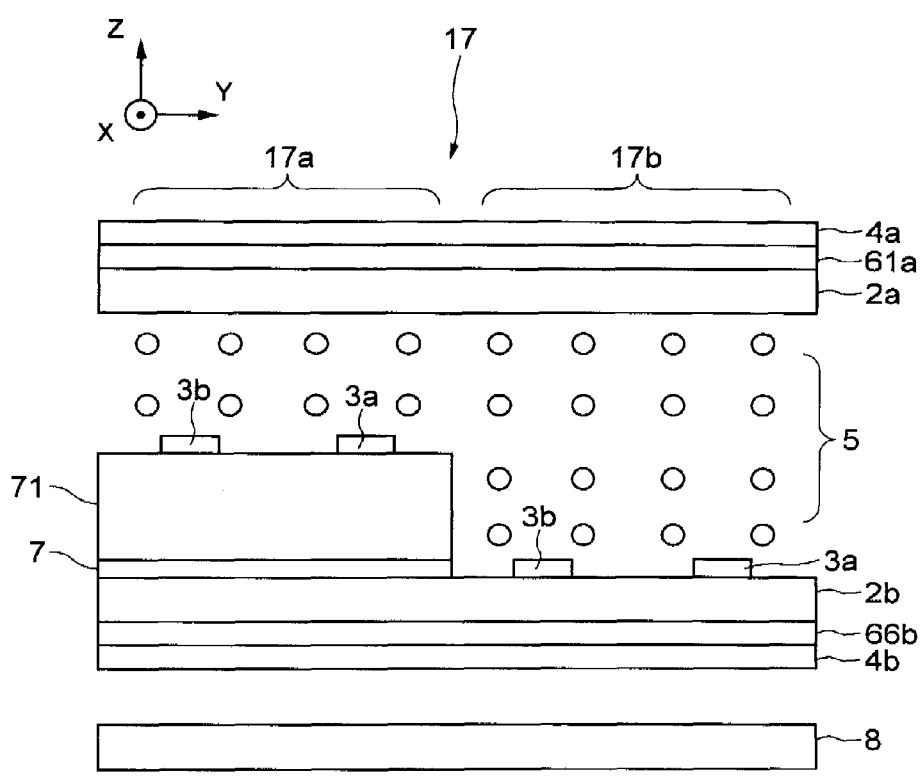
FIG. 11 is a cross-sectional view showing a structure of a liquid crystal display device according to an eighth embodiment of the present invention.

Next, an eighth embodiment according to the present invention will be explained. FIG. 11 is a cross-sectional view showing a structure of a liquid crystal display device 17 of the eighth embodiment. The same components are indicated in the same reference numerals between FIG. 11 and FIG. 1 showing the first embodiment.

Compared to the liquid crystal display device 1 of the first embodiment, the liquid crystal display device 17 according to the eighth embodiment is different in that the viewer-side compensation plate 61 of the second embodiment is used instead of the viewer-side compensation plate 6a, and that a backside compensation plate 66b is used instead of the backside compensation plate 6b. The viewer-side compensation plate 61a is the positive A plate of retardation film, as described, and is set to counteract birefringence in a display surface of a liquid crystal layer 5 in a reflective display area 17a so as to transmit the light optically when no voltage is applied to a pixel electrode 3a and a common electrode 3b. The backside compensation plate 66b is the negative A plate of retardation film as well as the backside compensation plate 6b of the first embodiment, however, its retardation value is set in a value with which retardation of the liquid crystal layer 5 in the transmissive display area 17b is counteracted in cooperate with the viewer-side compensation plate 61a so that the liquid crystal layer has optical isotropy when no voltage is applied to a pixel electrode 3a and a common electrode 3b. Other structures of the present embodiment than the above are the same as ones of the first embodiment.

According to the liquid crystal display device 17 of the present embodiment, the viewer-side compensation plate 61a is equivalent to the compensation plate of the second embodiment, and the backside compensation plate 66b is nearly equivalent to the compensation plate of the first embodiment, so that characteristics of the first and the second embodiments can be included in the liquid crystal display device 17. That is, the positive A plate of retardation film can be used for the viewer-side compensation plate, which is cheaper compared to one of the liquid crystal display device 1 in the first embodiment, which enables the cost to be low. On the other hand, the negative A plate of retardation film can be used for the backside compensation plate, which is superior to one used in the liquid crystal display device 11 of the second embodiment, so that a viewing angle characteristic of the transmissive display can be improved. Therefore, a semi-transmission type liquid crystal display device in a horizontal electric field mode which has an excellent viewing angle characteristic for the transmissive display can be realized less costly. Other operations and effects in the eighth embodiment than the above are the same as ones of the first embodiment.

Figure 12:
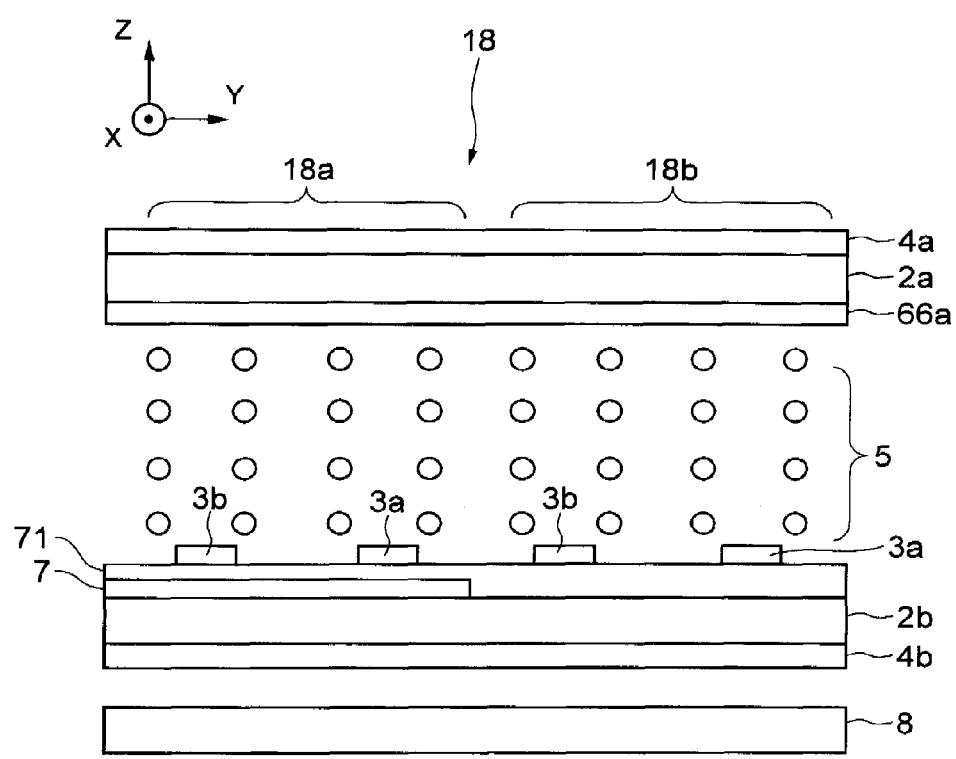
FIG. 12 is a cross-sectional view showing a structure of a liquid crystal display device according to a ninth embodiment of the present invention.

Next, a ninth embodiment according to the present invention will be explained. FIG. 12 is a cross-sectional view showing a structure of a liquid crystal display device the embodiment. As shown in FIG. 12, compared to the liquid crystal display device 14 according to the fifth embodiment described above, the liquid crystal display device 18 according to the ninth embodiment uses a viewer-side compensation layer 66a instead of using the viewer-side compensation plate 64a, and the viewer-side compensation layer 66a is formed on the liquid crystal layer 5 side of the viewer-side substrate 2a. That is, it is a distinctive feature of the embodiment to employ so-called an in-cell type compensation layer in which a compensation layer is disposed on the liquid crystal layer of the substrate as a compensator for reducing the refractive index anisotropy of the liquid crystal layer within the display surface. Further, it is also a feature of the embodiment that the compensation layer is formed in the viewer-side substrate. In particular, only the compensation layer for reducing the refractive index anisotropy of the liquid crystal layer within the display surface is formed into an in-cell type, and the conventional structure is employed for the circular polarizing plate. As a way of example, the compensation layer of the embodiment can be achieved through polymerization by performing orientation processing of liquid crystal monomer. In addition, the compensation layer 66a is formed in a structure of negative A plate. Structures of the embodiment other than those described above are the same as the ones of the fifth embodiment described earlier. Reference numeral 18a is a reflective display area and 18b is a transmissive display area.

The basic operation of the embodiment is the same as that of the above-described fifth embodiment. However, it is possible with the embodiment to achieve an additional effect through the use of the in-cell type compensation layer. That is, in order to reduce the refractive index anisotropy of the liquid crystal layer within the display surface with the above-described fifth embodiment, it is necessary to improve the axial precision between the orientation direction of the liquid crystal molecules in the liquid crystal layer and the viewer-side compensation plate. The reason for this is that if the axial precision is poor, the orientation direction of the liquid crystal and the axial direction of the compensation plate become shifted from each other, thereby deteriorating the compensating performance. Further, when the compensator is laminated as a compensation plate on the outer side, i.e. laminated on the opposite side from the liquid crystal layer of the viewer-side substrate, as in the fifth embodiment described above, a complicated manufacture process control is required for reducing the shift. It is because there are emerged a large number of control items such as controlling the angle margins when cutting out compensation plates from a raw material, controlling the angle margins when laminating the compensation plate to the viewer-side substrate, etc.

On the contrary, when the compensation layer is formed into an in-cell type as in the ninth embodiment, the axis of the compensation layer can be controlled by employing the conventional orientation method of the liquid crystal layer. Therefore, high axial precision can be achieved with the minimum control. Further, it is possible to arrange the compensation layer closely to the liquid crystal layer, so that a high-quality display can be achieved by reducing the disturbance of the polarized light.

Meanwhile, the circular polarizing plate has a larger margin for the axial shift compared to the compensator. That is, the circular polarizing plate that has a larger margin is preferable to be placed on the outer side. In particular, when the polarizing plate is formed into an in-cell type, there are more issues to be overcome than the case of forming the compensator into an in-cell type, such as securing the high degree of polarization, liquid crystal panel process resistance, preventing liquation of impurities to the liquid crystal layer, etc. Therefore, the polarizing plate is formed into a circular polarizing plate to secure the axial margin and laminated on the outer side, and the compensator is formed into an in-cell type. With this, it is possible to achieve both the excellent characteristic and low cost.

As described, it is the important concept of the embodiment to form the compensator into an in-cell type, and the compensator can employ not only the negative A plate structure but also the structures depicted in other embodiments. In particular, when using the compensators of the positive A plate structure and positive C plate structure as in the third embodiment described above, it is possible to form the positive A plate (requires high axial precision) into an in-cell type, and laminate the positive C plate (exhibits no refractive index anisotropy within the display surface) as a retardation film. That is, as has been described that it is the important concept to form the compensator into an in-cell type, it is more preferable to form the one for compensating the refractive index anisotropy of the liquid crystal layer within the display surface into an in-cell type, among those compensators.

Further, compared to the case as in the first embodiment of the present invention described above where the compensator is provided on both sides, i.e. the viewer-side substrate and the backside substrate, the number of compensation layers can be reduced from two layers to a single layer. Therefore, it is preferable since the cost can be reduced.

With the in-cell type compensator, reflection due to a metal electrode can be suppressed even when a metal pixel electrode or metal common electrode is formed on the viewer-side substrate, thereby allowing a high contrast to be provided. It is because there is no liquid crystal layer and no compensation layer interposed between the metal electrode and the circular polarizing plate. Thus, the polarization direction of the light emitted from the circular polarizing plate when reflected by the metal electrode becomes orthogonal, so that the light cannot be emitted from the circular polarizing plate. Operations and effects of the ninth embodiment other than those described above are the same as the ones of the fifth embodiment described above.

Figure 13:
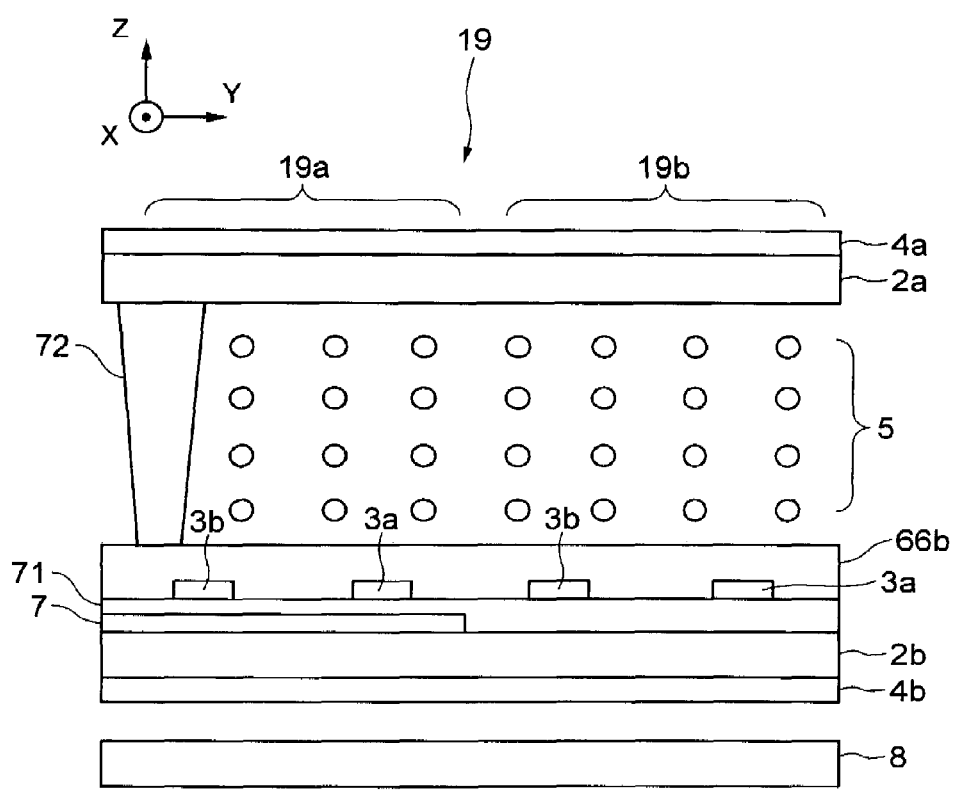
FIG. 13 is a cross-sectional view showing a structure of a liquid crystal display device according to a tenth embodiment of the present invention.

Next, a tenth embodiment according to the present invention will be explained. FIG. 13 is a cross-sectional view showing a structure of a liquid crystal display device of the embodiment. As shown in FIG. 13, compared to the liquid crystal display device 18 according to the ninth embodiment described above, the liquid crystal display device 19 according to the tenth embodiment uses a backside compensation layer 66b instead of using the viewer-side compensation layer 66a, and the backside compensation layer 66b is formed on the liquid crystal layer 5 side of the backside substrate 2b. The backside compensation layer 66b is equivalent to the viewer-side compensation layer 66a of the ninth embodiment described above. In the viewer-side substrate 2a, there is formed a columnar-type spacer 72 for keeping the thickness of the liquid crystal layer 5a to a proper value through keeping the space between the viewer-side substrate 2a and the backside substrate 2b to a proper value. As a way of example, the columnar-type spacer can be fabricated through a known process such as photolithography using a photosensitive material. As described, the embodiment is characterized that an in-cell type compensation layer is formed on the backside substrate side, and a columnar-type spacer is formed in the viewer-side substrate that opposes to the substrate where the compensation layer is formed. Structures of the embodiment other than those described above are the same as the ones of the ninth embodiment described earlier. Reference numeral 19a is a reflective display area and 19b is a transmissive display area.

The basic operation of the embodiment is the same as that of the above-described ninth embodiment. However, through the use of the columnar-type spacer, the thickness of the liquid crystal layer can be more uniformed. Therefore, the refractive index anisotropy of the liquid crystal layer within the display surface can be reduced with high precision by the use of the compensation layer. As a result, it is possible to obtain a high contrast and to widen the viewing angles. Further, compared to the case of using a spheric-type spacer, the embodiment is not only capable of suppressing the disturbance in the orientation of the liquid crystal layer caused due to the spheric-type spacer thereby to achieve high-quality picture, but also capable of preventing the spheric-type spacer from being sunk into the in-cell type compensation layer thereby to improve the uniformity of the gap, i.e. the uniformity of the thickness of the liquid crystal layer. This is because it is difficult to control the sink-in degree of the in-cell type compensation layer or the like for a relatively soft member, due to the shape of the spheric-type spacer. When the columnar-type spacer is used, however, it is possible to provide the area of a tilted part compared to the case of the spheric-type spacer. Therefore, it is possible to control the sink-in of the spacer and improve the controllability of the gap.

Further, since the columnar-type spacer and the in-cell type compensation layer are provided on the substrates opposing to each other in the embodiment, the orientation characteristic of the in-cell type compensation layer can be improved. Therefore, it is possible to improve the display quality such as achieving high contrast. It is because the orientation of the compensation layer is disturbed by the columnar-type spacer, if the in-cell compensation layer is formed after forming the columnar-type spacer. Further, if the in-cell type compensation layer is formed before forming the columnar-type spacer, the orientation of the in-cell type compensation layer is disturbed in the manufacture process of the columnar-type spacer. As described, when forming the compensation layer in particular, it is preferable to form the columnar-type spacer on a different substrate from the substrate where the in-cell type compensation layer is provided.

Furthermore, it is preferable that the substrate for providing the columnar-type spacer be the viewer-side substrate. In the viewer-side substrate, a light shielding layer is formed for concealing the wirings and boundary areas between the neighboring pixels. The light shielding layer is formed thicker than the wirings and the like. That is, it is possible to shield the light securely through providing a light shielding layer on the viewer side, which is thicker than the targets to be concealed. Further, by forming the columnar-type spacer in the viewer-side substrate where the light shielding layer is formed, it is possible to arrange the columnar-type spacer by securely aligning it with the light shielding layer. As a result, a high picture-quality can be achieved, since the columnar-type spacer is not visually recognized by the user even if there is a position shift generated in assembling the viewer-side substrate and the backside substrate.

As described, it is preferable to use the columnar-type spacer as a gap retainer when the refractive index anisotropy of the liquid crystal layer within the display surface is compensated by the in-cell type compensation layer. From the view point of improving the display quality, it is preferable to form the columnar-type spacer in the viewer-side substrate and form the in-cell type compensation layer in the backside substrate.

The backside compensation layer is provided on the liquid crystal layer side than the pixel electrode or common electrode in the embodiment, however, the present invention is not limited to this. It is possible to provide the compensation layer on the backside substrate side than the pixel electrode or the common electrode to reduce the drive voltage. This is because drop of the voltage applied to the liquid crystal layer can be prevented with the compensation layer. Operation and effects of the tenth embodiment other than those described above are the same as the ones of the ninth embodiment described earlier.

Figure 14:
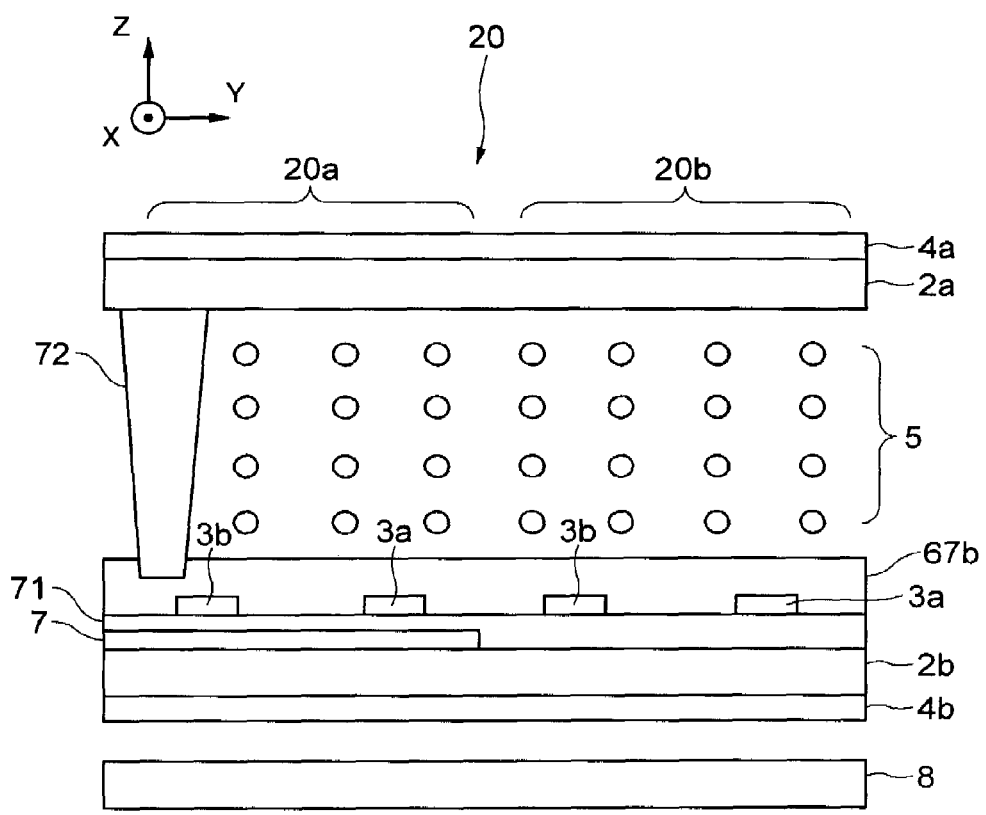
FIG. 14 is a cross-sectional view showing a structure of a liquid crystal display device according to an eleventh embodiment of the present invention.

Next, an eleventh embodiment according to the present invention will be explained. FIG. 14 is a cross-sectional view showing a structure of a liquid crystal display device of the embodiment. As shown in FIG. 14, compared to the liquid crystal display device 19 according to the tenth embodiment described above, the liquid crystal display device 20 according to the eleventh embodiment uses a backside compensation layer 67b. The backside compensation layer 67b is low in the hardness compared to the backside compensation layer 66b of the ninth embodiment described above, and it is constituted such that the amount of sinking the columnar-type spacer into the backside compensation layer 67b can be controlled at the time of manufacture. Structures of the embodiment other than those described above are the same as the ones of the tenth embodiment described earlier. Reference numeral 20a is a reflective display area and 20b is a transmissive display area.

Next, there will be explained a method for manufacturing the liquid crystal display device according to the eleventh embodiment. For distinctively clarifying differences of the manufacturing method according to the embodiment, a conventional manufacturing method will be explained.

With the conventional manufacturing method, as in the aforementioned embodiment, for example, after forming a columnar-type spacer in the viewer-side substrate, it is then aligned and laminated with the backside substrate. Then, a prescribed pressure is applied to set the space between the both substrates, i.e. the gap, in a proper value. In this case, if there is distribution in the height of the columnar-type spacer within the display surface, for example, it is reflected upon the gap value as well. Thus, there is generated unevenness in the gap within the surface. The reason for this is that the structural members such as the columnar-type spacer for providing the space and the surrounding members do not change the shapes. Thus, when there is generated unevenness within the surface of the structural members, the difference thereof is reflected as a difference in the gap. In the case where the compensation is achieved through the use of the compensation plate and the compensation layer as in the present invention, compensation cannot be achieved sufficiently if the retardation of the liquid crystal layer to be compensated, i.e. a value obtained through multiplying the thickness of the liquid crystal layer to the refractive index anisotropy of the liquid crystal molecule, is not formed within a specific range. In the area where the compensation is not achieved sufficiently, the refractive index anisotropy of the liquid crystal layer in the display surface cannot compensated with high precision. Thus, the transmittance of black is not decreased sufficiently, which results in causing an excessive whitening phenomenon and deterioration in the contrast ratio. Furthermore, when the contrast ratio is decreased, the viewing angle characteristic is decreased as well. This is because the index showing the viewing angle characteristic depends largely on the contrast ratio and, when the contrast ratio of the front face is decreased, the contrast ratio of the oblique direction is deteriorated as well. As a result, the range of angles that can achieve a prescribed contrast ratio is narrowed. As described, deterioration in the compensation precision causes deterioration in the display quality. Especially, unevenness is generated in the compensation precision when there is unevenness generated in the gap within the display surface, which results in more deterioration in the display quality.

For this, with the manufacturing method of the display device according to the eleventh embodiment, the backside compensation layer 67b is formed in the backside substrate 2b, and the columnar-type spacer 72 is formed in the viewer-side substrate 2a. At that time, hardness of the backside compensation layer 67b, hardness of the columnar-type spacer 72, and the density of the columnar-type spacer 72 are set such that the columnar-type spacer 72 can be sunk into the backside compensation layer 67b. After laminating and aligning the two substrates, a prescribed pressure is applied to set the space between both substrates, the gap, in a proper value. At that time, a device for applying the pressure to both substrates is constituted to be capable of detecting the gap between the both substrates within the display area at a plurality of areas. Further, it is constituted to be capable of applying pressures of different values in the vicinity of the measured areas. Therefore, when the height of the columnar-type spacer 72 is not uniform, the device for applying the pressure to both substrates increases the pressure for an area with a large gap, upon detecting such area. Upon this, the columnar-type spacer in this area is sunk into the backside compensation layer. Thus, the gap can be made smaller and the difference in the gap within the surface can be decreased. With this, retardation of the liquid crystal layer within the display surface can be made uniform, so that the optical compensation by the compensator can be achieved as designed and deterioration of the display quality can be suppressed. It is a characteristic structure of the display device manufactured in this manner that there exits an area where the columnar-type spacer is sunk into the compensation layer.

It is also possible to control the gap to be uniform by setting the height of the columnar-type spacer 72 to be larger than the gap, and applying a large pressure over the entire display surface to make the columnar-type spacer sink into the compensation layer in the entire display surface, and then controlling the gap. In this case, such phenomenon of fluctuation in the gap within the surface can be suppressed even in the case where a pressure, oscillation, or stress is applied to the display device after the manufacture. Therefore, the display quality can be improved and the improved quality can be maintained. That is, it is desirable that matching between the liquid crystal layer and the compensator be secured and the matching state be not changed due to some reasons. For the liquid crystal layer, it is desirable to be constituted such that there is no change in the thickness thereof.

The embodiment is constituted such that the columnar-type spacer formed in the viewer-side substrate sinks into the backside compensation layer formed in the backside substrate. However, the present invention is not limited to this. As a way of example, in the case such as the above-described first and fifth embodiments where the compensator is provided as a compensation plate, it is possible to achieve the same effects by additionally providing a soft layer where the columnar-type spacer can be sunk in. In this case, this soft layer is not necessarily formed over the entire surface of the backside substrate. It is enough to be formed only in the part that opposes to the columnar-type spacer. As another example, the columnar-type spacer itself may be formed to change its shape. In this case, the material for forming the columnar-type spacer may be changed to a soft material, or it is effective to reduce the in-plane density of the columnar-type spacer. Also it is effective to increase a pressure applied to both substrates at the time of manufacturing. In such case where the columnar-type spacer itself is formed to change its shape, the stress resistance is deteriorated compared to other cases where the spacer sinks in. However, a certain degree of resistance can be secured, since the liquid crystal layer itself has an effect of preventing swelling of the gap. It is unnecessary to form a layer for the columnar-type spacer to sink in, so that this case is preferable when a compensator is not provided on the liquid crystal layer side of the substrate.

Further, liquid crystals may be dropped before the viewer-side substrate and the backside substrate are laminated. This is preferable since it is possible to detect not only the gap between the substrates but also the retardation of the liquid crystal layer.

As described above, in the embodiment, the columnar-type spacer or the compensator is constituted to be capable of correcting the thickness of the liquid crystal layer. With this, unevenness in the thickness of the liquid crystal layer within the display surface can be made uniform, and matching state between the compensator can be made highly precise to achieve the high display quality.

Further, through the constitution for allowing suppression of such phenomenon in which the thickness of the liquid crystal layer is fluctuated due to some external or internal reasons (e.g. sink-in of the columnar-type spacer to the compensation layer), the achieved high-quality can be maintained for a long period of time. Operation and effects of this embodiment other than those described above are the same as the ones of the tenth embodiment described earlier.

Figure 15:
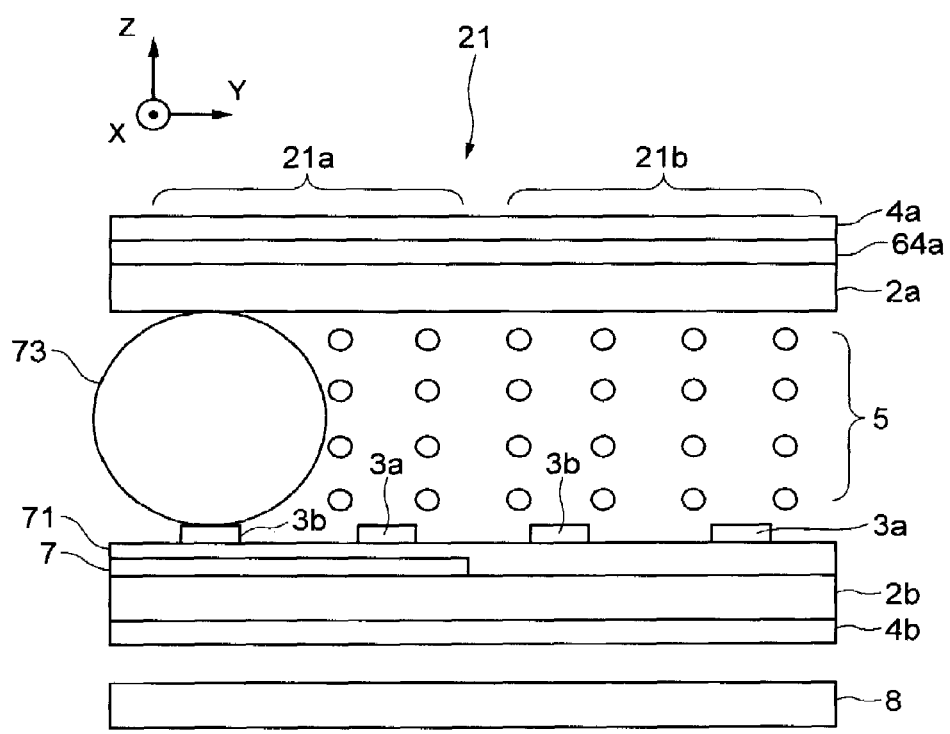
FIG. 15 is a cross-sectional view showing a structure of a liquid crystal display device according to a twelfth embodiment of the present invention.

Next, a twelfth embodiment according to the present invention will be explained. FIG. 15 is a cross-sectional view showing a structure of a liquid crystal display device of the embodiment. As shown in FIG. 15, compared to the liquid crystal display device 14 according to the fifth embodiment described above, the liquid crystal display device 21 according to the twelfth embodiment is provided with an adhesive granular spacer 73. The adhesive granular spacer 73 is obtained by applying a thermoset resin that is made of an acryl resin to the periphery of the granular spacer. It is a feature of this embodiment that the backside substrate 2*a* and the viewer-side substrate 2*b* are fixed through the adhesive granular spacer 73. In FIG. 15, a part of structural elements including the adhesive granular spacer 73 is illustrated by changing the scale. Structures of the embodiment other than those described above are the same as the ones of the fifth embodiment described earlier. Reference numeral 21*a* is a reflective display area and 21*b* is a transmissive display area.

In the case such as the present invention where an optical device for changing the refractive index anisotropy of the liquid crystal layer within the display surface to isotropy, it is desirable to achieve highly precise matching of the refractive index anisotropy of the liquid crystal layer and that of the compensation layer. Further, it is desirable for this matching state to be maintained not only at the stage of manufacture but also after the passage of time (durable for changes over time). It is because fluctuations can be suppressed not only for the external factors such as a stress, pressure, oscillation but also for the internal factors such as the internal stress of the liquid crystal display device itself.

It is a feature of the embodiment to use the adhesive granular spacer for providing the durability for the changes over time. In general, the granular spacer is used so that the space between the backside substrate 2*a* and the viewer-side substrate 2*a* does not become too small. However, by giving adhesiveness to the granular spacer, it is possible to prevent the space between the substrates from being changed over time. This allows the matching state of the refractive index anisotropy of the liquid crystal layer and the compensator to be maintained for a long period of time, especially when the optical device for changing the liquid crystal layer to isotropic as in the present invention. Operation and effects of this embodiment other than those described above are the same as the ones of the fifth embodiment described earlier.

Figure 16:
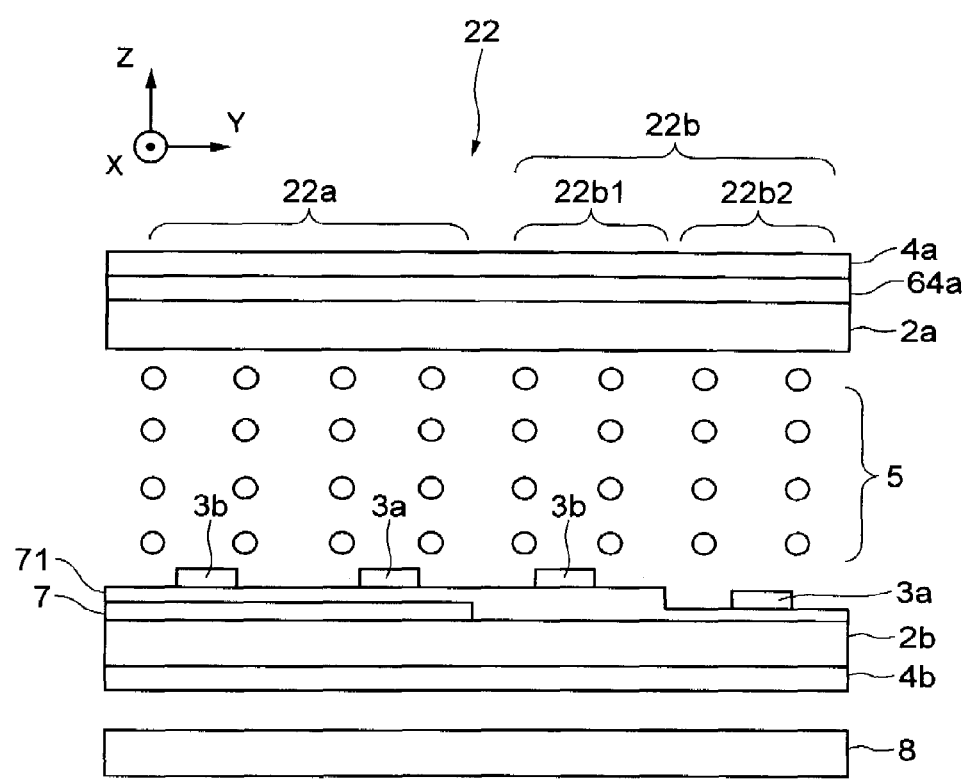
FIG. 16 is a cross-sectional view showing a structure of a liquid crystal display device according to a thirteenth embodiment of the present invention.

Next, a thirteenth embodiment according to the present invention will be explained. FIG. 16 is a cross-sectional view showing a structure of a liquid crystal display device of this embodiment. As shown in FIG. 16, compared to the liquid crystal display device 14 according to the fifth embodiment described above, the liquid crystal display device 22 according to the thirteenth embodiment is different in respect that a transmissive area 22*b* is constituted with two areas, i.e. transmissive display areas 22*b*1 and 22*b*2, and the thicknesses of the liquid crystal layers of the two kinds of areas are different. In this embodiment, the thickness of the liquid crystal layer of the transmissive display area 22*b*1 is set smaller than the thickness of the liquid crystal layer of the transmissive display area 22*b*2. Further, the proportion of the areas 22*b*1 and 22*b*2 in the transmissive display area 22*b* is 50% for each. Furthermore, the reflective display area 22*a* is constituted in the same manner as the reflective display area 14*a* of the liquid crystal display device 14 according to the fifth embodiment described above. Structures of the embodiment other than those described above are the same as the ones of the fifth embodiment described earlier.

Figure 17:
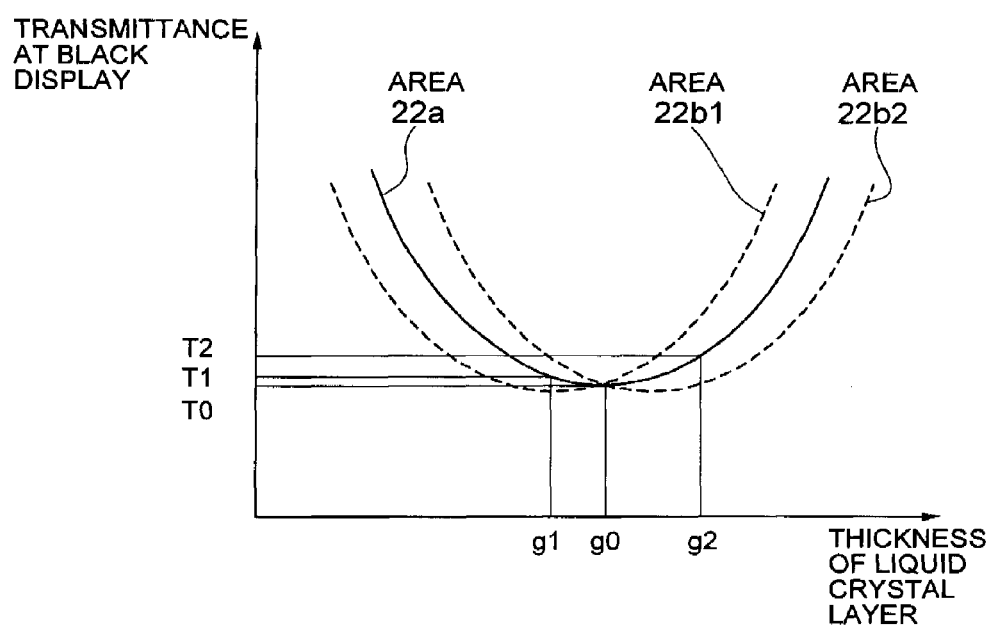
FIG. 17 is a graph showing operations of the liquid crystal display devices according to the embodiments, in which the horizontal axis takes the thickness of the liquid crystal layer and the vertical axis takes the transmittance at the time of black display.

Next, operations of the liquid crystal display device according to the thirteenth embodiment will be explained. FIG. 17 is a graph for showing the operations of the liquid crystal display device according to this embodiment, where the horizontal axis is the thickness of the liquid crystal layer and the vertical axis is the transmittance at the time of black display. This graph particularly illustrates an influence of the fluctuation in the liquid crystal layer thickness for the transmittance at the time of black display in the transmissive display area.

Figure 18:
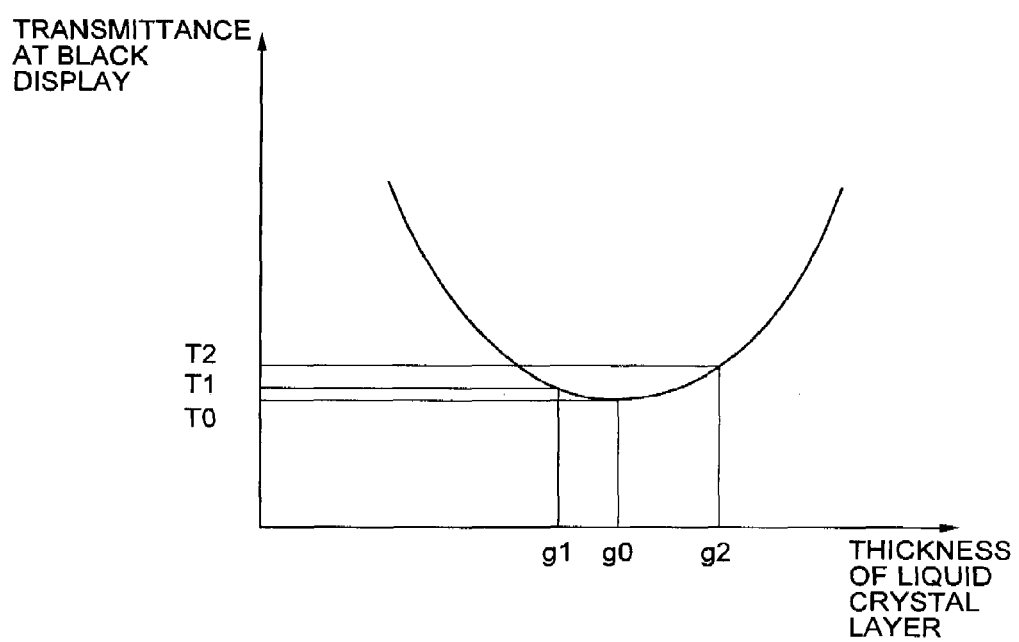
FIG. 18 is a graph showing operation of the liquid crystal display device as a comparative example of the embodiments, in which the horizontal axis takes the thickness of the liquid crystal layer and the vertical axis takes the transmittance at the time of black display.

For the conveniences' sake, operations of a liquid crystal display device as a comparative example of the embodiment will be explained by referring to FIG. 18, before explaining the operations of the liquid crystal display device of this embodiment shown in FIG. 17. FIG. 18 is a graph for showing the dependency of the transmittance at the time of black display on the fluctuations of the liquid crystal layer thickness in the case where, unlike the case of the liquid crystal display device of this embodiment, the transmissive display area is constituted with a single gap and the thickness of the liquid crystal layer in the transmissive display area is uniform. In the graph, the horizontal axis is the thickness of the liquid crystal layer and the vertical axis is the transmittance at the time of black display. As shown in FIG. 18, in the case where the transmissive display area is constituted with a single gap, the transmittance at the time of black display takes the minimum value T0 when the thickness of the liquid crystal layer is an ideal value g0. When the gap is changed from the ideal value, the transmittance at the time of black display is increased from the minimum value T0. For the conveniences' sake, the minimum value of the gap fluctuation is referred to as g1, and the transmittance at the time of black display in that state is referred to as T1. Similarly, the maximum value of the gap fluctuation is referred to as g2, and the transmittance at the time of black display in that state is referred to as T2. That is, there is a variation of g1 to g2 in the thickness of the liquid crystal layer, and the transmittance at the time of black display increases thereby. Accordingly, the contrast ratio is decreased and the viewing angle characteristic is deteriorated. In the case where there is generated a variation within the display surface in particular, unevenness is generated in the contrast ratio, which causes an issue of deteriorating the display quality.

On the contrary, in the liquid crystal display device of this embodiment, the transmissive display area is constituted with the two areas 22*b*1 and 22*b*2 with the liquid crystal layers of different thicknesses. Therefore, as shown in FIG. 17, the transmittance at the time of black display is the arithmetic mean of the characteristics of the two areas with the liquid crystal layers of different thicknesses. For example, the dependencies of the transmittance at the time of black display on the liquid crystal layer thickness in the transmissive display areas 22*b*1 and 22*b*2 are illustrated in FIG. 17 with dotted lines. The characteristic of the transmissive display area 22*b* thereby becomes the arithmetic mean of the characteristics shown with the dotted lines. In FIG. 17, the characteristic of the transmissive display area 22*a* is shown with a solid line. That is, it is possible to suppress fluctuations in the transmittance at the time of black display even if there is a fluctuation in the thickness of the liquid crystal layer. This allows suppression of unevenness in the contrast ratio even if there is a fluctuation in the thickness of the gap, i.e. fluctuation in the thickness of the liquid crystal layer, especially within the display surface. Thus, the display quality can be maintained. In particular, when the refractive index anisotropy of the liquid crystal layer within the display surface is compensated optically as in the present invention, it is possible to achieve matching of the liquid crystal layer and the compensator with high precision to achieve a high display quality. As a result, a high effect can be obtained.

The embodiment employs the liquid crystal layers with different thicknesses only in the transmissive display area. However, the present invention is not limited only to this but may also be applied to the reflective display area in the same manner. Further, the areas with different thicknesses may be set to have different area ratios. Alternatively, two or more kinds of areas may be used. It is desirable for those areas with different thicknesses to be connected gradually, if possible. With this, disturbance in the orientation of the liquid crystal molecules at the boundary between the areas can be suppressed. Furthermore, the structure for providing the areas with different thicknesses can be provided to the viewer-side substrate, although it may be provided to the backside substrate. Operation and effects of this embodiment other than those described above are the same as the ones of the fifth embodiment described earlier.

Figure 19:
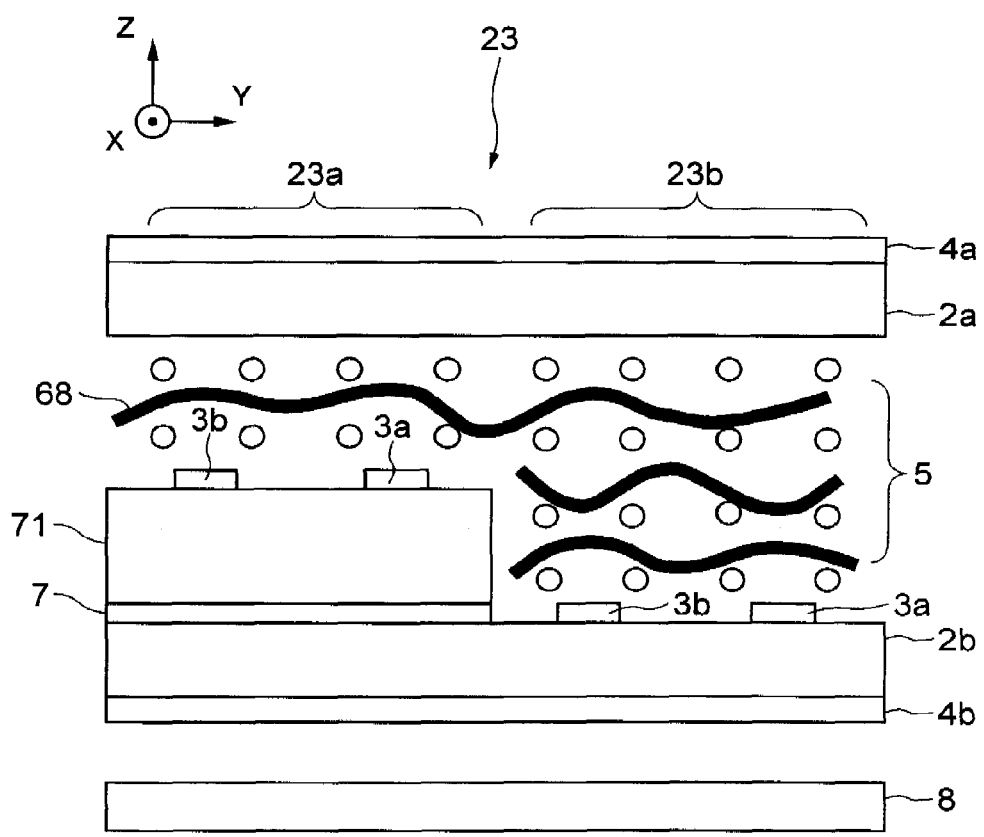
FIG. 19 is a cross-sectional view showing a structure of a liquid crystal display device according to a fourteenth embodiment of the present invention.

Next, a fourteenth embodiment according to the present invention will be explained. FIG. 19 is a cross-sectional view showing a structure of a liquid crystal display device of this embodiment. As shown in FIG. 19, compared to the liquid crystal display device 1 according to the first embodiment described above, the liquid crystal display device 23 according to the fourteenth embodiment uses a polymer network type compensation layer 68 instead of using the viewer-side compensation plate 6a and the backside compensation plate 6b. The polymer network type compensation layer 68 is provided in the space between the viewer-side substrate 2a and the backside substrate 2b, and the polymer network type compensation layer 68 alone is constituted to compensate the refractive index anisotropy of the liquid crystal layer within the display surface. Further, a liquid crystal layer 5 is held within the polymer network type compensation layer 68. That is, in the space between the viewer-side substrate 2a and the backside substrate 2b, both the liquid crystal layer 5 and the polymer network type compensation layer 68 for reducing the refractive index anisotropy of the liquid crystal layer 5 within the display surface are arranged in a coexisting manner. Structures of the embodiment other than those described above are the same as the ones of the first embodiment described earlier. Reference numeral 23a is a reflective display area and 23b is a transmissive display area.

It is a distinctive feature of the embodiment that the compensator for compensating the refractive index anisotropy of the liquid crystal layer within the display surface is provided along with the liquid crystal layer as the polymer network type compensation layer. This enables automatic matching of the liquid crystal layer and the compensator even if there is a fluctuation generated in the gap between the viewer-side substrate and the backside substrate, which provides a resistance for the fluctuation of the gap.

Furthermore, since the compensator can be included in the liquid crystal layer, it is unnecessary to provide it on the outer side as a compensation plate. Thus, the cost can be reduced. Moreover, the compensation plate is unnecessary even when the thickness of the liquid crystal layer in the transmissive display area is different from that of the crystal layer in the reflective display area. Accordingly, the gradation characteristic of the transmissive reflection area and that of the reflective display area can be aligned with high precision. When the polymer that constitutes the polymer network type compensation layer forms a fine structure (for example, when it is finer than the wavelength of the visible light), the effect for dispersing the incident light becomes significant. Thus, it is not preferable. That is, it is preferable for the polymer network type compensation layer to have a structure larger than the wavelength of the visible light.

The polymer network type compensation layer and the liquid crystal layer according to the embodiment can be formed with a regular phase separation method, e.g. through curing the mixture of a photo-curing resin and a liquid crystal material by exposure. Further, the polymer network type compensation layer may be formed in a three-dimensional honeycomb shape in advance. By introducing the liquid crystal molecules thereafter, the structure of the embodiment can be achieved. Operation and effects of this embodiment other than those described above are the same as the ones of the first embodiment described earlier.

Figure 20:
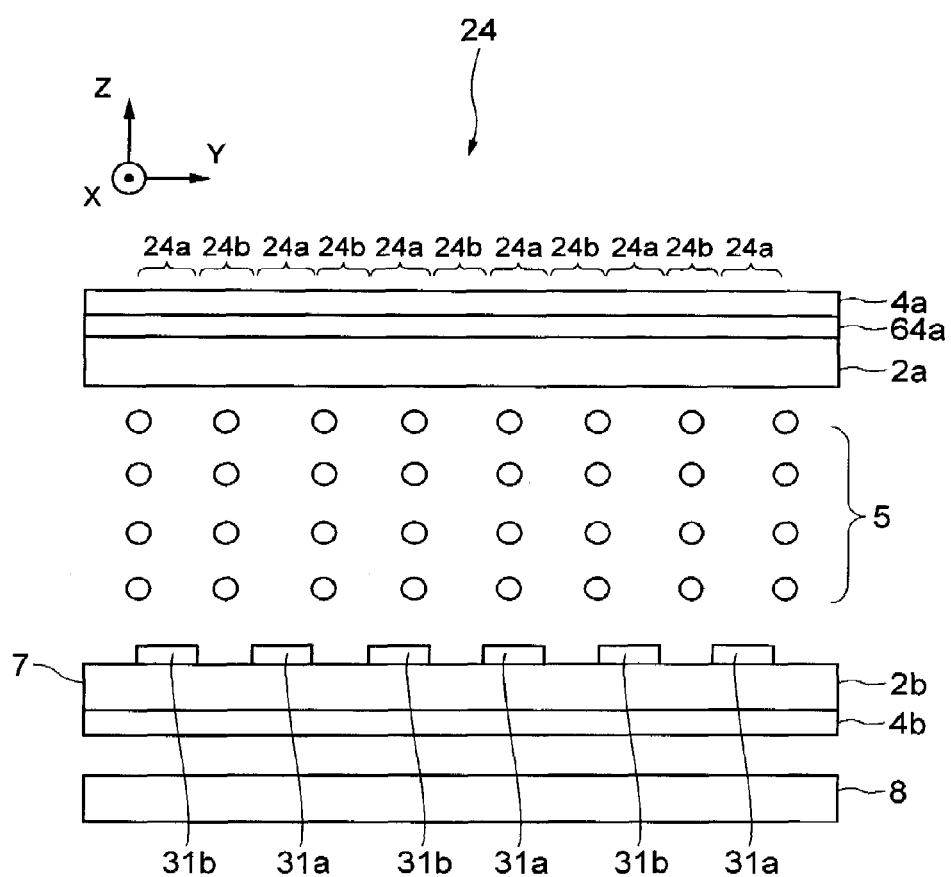
FIG. 20 is a cross-sectional view showing a structure of a liquid crystal display device according to a fifteenth embodiment of the present invention.

Next, a fifteenth embodiment according to the present invention will be explained. FIG. 20 is a cross-sectional view showing a structure of a liquid crystal display device of this embodiment. As shown in FIG. 20, compared to the liquid crystal display device 14 according to the fifth embodiment described above, the liquid crystal display device 24 according to the fifteenth embodiment uses a pixel electrode 31a and a common electrode 31b. The pixel electrode 31a and the common electrode 31b are formed by using an optically opaque metal, and these electrodes function as the reflective plate. Therefore, the reflective plate 7 of the above-described fifth embodiment is not provided in this embodiment. Accordingly, a reflective display area 24a is the area of the pixel electrode 31a and the common electrode 31b, and a transmissive display area 24b is the area between the pixel electrode 31a and the transmissive display area 31b. Further, the insulating layer 71a is also omitted in this embodiment.

Furthermore, in this embodiment, the electrode width, i.e. the width of the pixel electrode 31a and the common electrode 31b, is 1 μm, and the inter-electrode distance, i.e. the distance between the pixel electrode 31a and the common electrode 31b, is also 1 μm. The thickness of the liquid crystal layer 5 is set as 3.5 μm. That is, it is so set that the sum of the electrode width and the inter-electrode distance becomes smaller than the thickness of the liquid crystal layer. Structures of this embodiment other than those described above are the same as the ones of the fifth embodiment described earlier.

Before explaining the liquid crystal display device of this embodiment, a high-transmittance IPS system liquid crystal device invented by the inventors of the present invention will be explained. In this liquid crystal display device of the high-transmittance IPS system, the electrode width is smaller than the thickness of the liquid crystal layer and the orientation of the liquid crystal molecules between the electrodes is changed by an electric field that is generated by a pair of parallel electrodes constituted with a pixel electrode and a common electrode. The orientation of the liquid crystal molecules on the electrodes changes also by conforming to the change in the orientation, so that not only the orientation of the liquid crystal molecules between the electrodes but also the orientation of the liquid crystal molecules on the electrodes is changed.

In this embodiment, the electrode width, i.e. the width of the pixel electrode or the common electrode is expressed as w. Further, the inter-electrode distance, i.e. the distance between the pixel electrode and the common electrode, is expressed as S, and the thickness of the liquid crystal layer is expressed as d. Based on the relationships of the electrode width w, the distance S between the electrodes, and the liquid crystal layer thickness d, the four cases below will be explained.

(1) Case where w/d<1 applies (w=1 μm, S=6 μm, and d=3 μm)
(2) Case where w/d=1 applies (w=3 μm, S=6 μm, and d=3 μm)
(3) Case where (w+L)/d≦1 applies (w=0.5 μm, S=2.5 μm, and d=4 μm)
(4) Case where (w+S)/d≦1/2 applies (w=0.2 μm, S=0.9 μm, and d=3.5 μm)

The same liquid crystal molecules were used in common for the four cases. For example, the physical property values were as follows. The refractive index anisotropy Δn at the wavelength of 550 nm was 0.1, the dielectric anisotropy Δε was 14, the permittivity in the direction parallel to the liquid crystal orientation vector was 18.4, and the elastic constants were K11=11.3 pN (picoNewton), K22=6.9 pN, K33=11.6 pN. This liquid crystal molecules have the twist elastic constant K22 that is smaller than the bend elastic constant K33, so that the liquid crystal can be easily twisted.

The cases of (1) to (4) were experiments and simulations executed for analyzing the behaviors of the liquid crystal molecules between the electrodes and on the electrode. Thus, a circular polarizing plate was not used, and the conventional polarizing plates that generate linear polarized light were combined. In an example, one of two polarizing plates arranged on both sides of the liquid crystal device was arranged with its absorption axis aligned along the major axis direction of the liquid crystal molecule, and the other polarizing plate was arranged such that its absorption axis became orthogonal to the polarizing plate mentioned above. Further, the experiments described below used a transparent material for the electrodes in order to observe the behavior of the liquid crystal molecules on the electrodes as transmittance.

(1) Case where w/d<1 applies (w=1 μm, S=6 μm, and d=3 μm)

Figure 21:
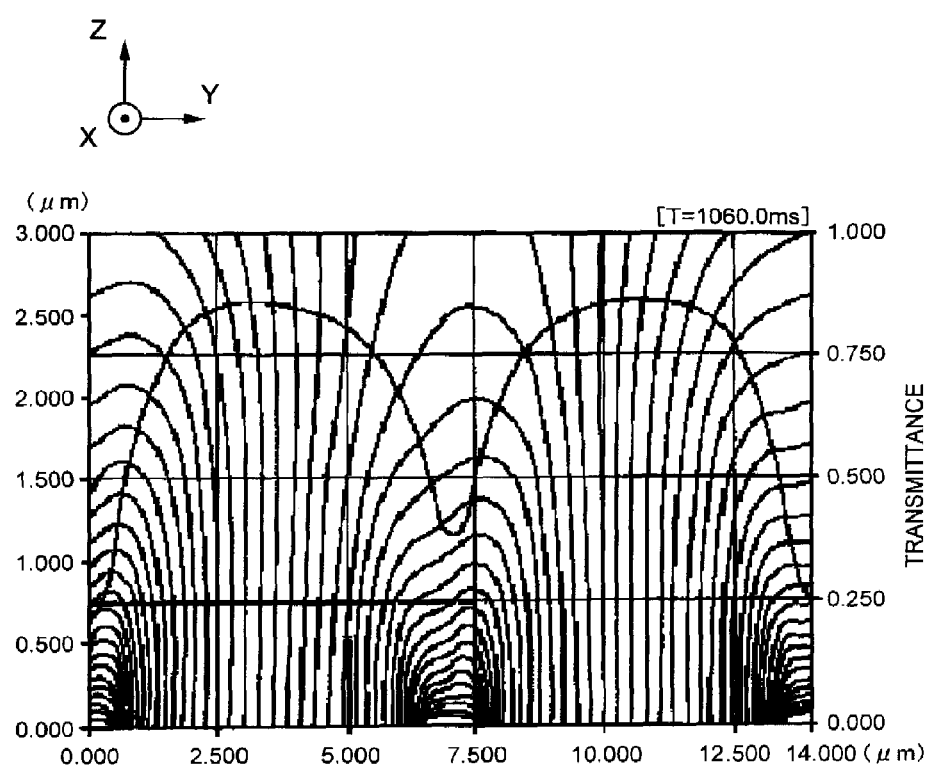
FIG. 21 shows the result of simulating the liquid crystal orientation, electric field distribution, and transmittance distribution in a case where (1) w/d<1 applies.
Figure 22:
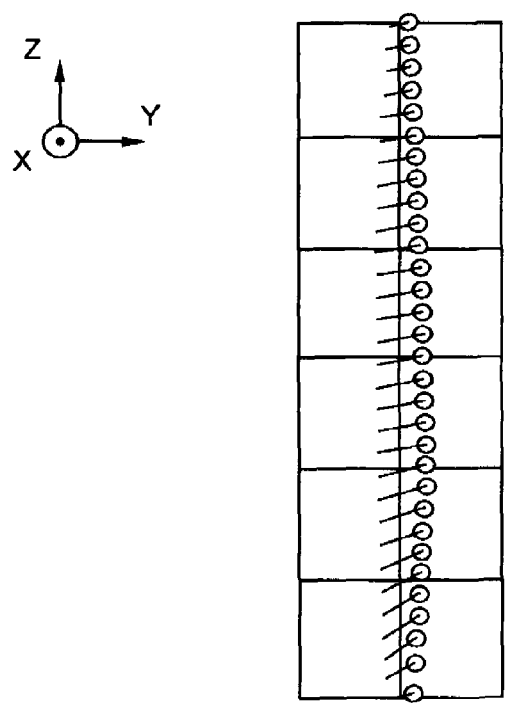
FIG. 22 is an enlarged view of the liquid crystal orientation on an electrode according to the simulation result shown in FIG. 21.
Figure 23:
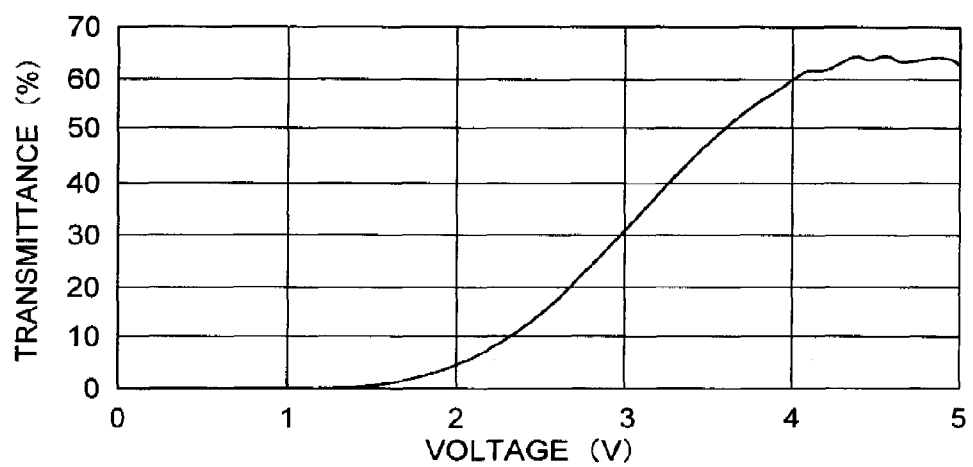
FIG. 23 is a graph obtained by measuring the voltage-transmittance characteristics in an area with a diameter of 1 μm at the center between the electrodes.
Figure 24:
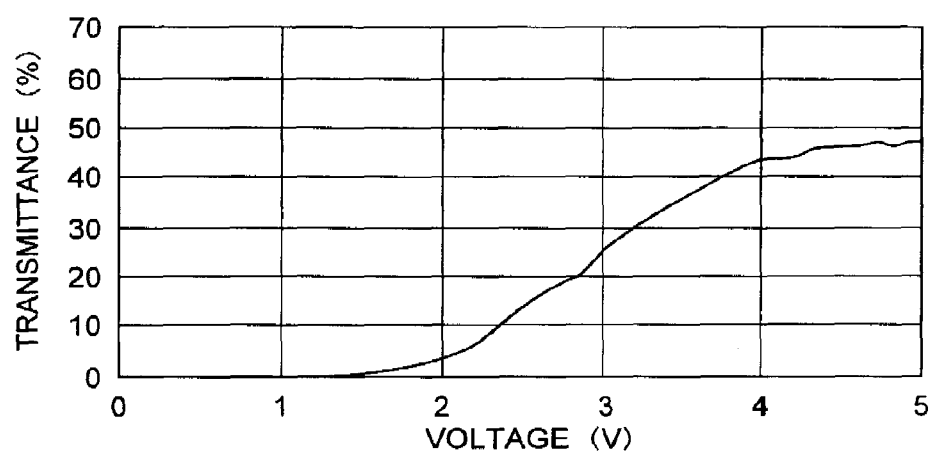
FIG. 24 is a graph obtained by measuring the voltage-transmittance characteristics in an area with a diameter of 1 μm at the center on the electrodes.

FIG. 21 shows the result of simulating the liquid crystal orientation, the electric field distribution and the transmittance distribution, in order to analyze the operation principles of the liquid crystal display device of this case when a voltage is applied. FIG. 22 is an enlarged view showing the orientation of the liquid crystal on the electrodes as a result of the simulation in FIG. 21. FIG. 23 shows a graph obtained by measuring the voltage-transmittance characteristic in an area with a diameter of 1 μm in the center between the electrodes, and FIG. 24 shows a graph obtained by measuring the voltage-transmittance characteristic in an area with a diameter of 1 μm on the electrode.

As shown in FIG. 21 and FIG. 22, as for the orientation state of the liquid crystal molecules when a voltage is applied between the common electrode and the pixel electrode, the molecules are aligned in substantially the X-axis direction in the vicinity of the substrate interface between the electrodes due to an anchoring effect of the orientation processing. As going away from the substrate interface, however, the orientation is changed to the Y-axis direction in accordance with the direction of the horizontal electric field generated by the parallel electrodes. In the meantime, as for the orientation state of the liquid crystal molecules on the electrodes, the orientation stays in the initial state in the vicinity of the interface of +Z side substrate as in the case of the orientation between the electrodes. However, the orientation is changed to Y-axis direction as going from the +Z side substrate as in the case between the electrodes. As described, this example is characterized that the orientation of the liquid crystal molecules on the electrodes changes to the Y-axis direction as in the orientation direction of the liquid crystal molecules between the electrodes.

With this, not only the transmittance of the area between the electrodes but also that of the area on the electrodes in particular is increased in this example. FIG. 23 shows a graph showing the result of measuring the voltage-transmittance characteristic in the area with a diameter of 1 μm in the center between the electrodes in order to investigate the transmittance values. Similarly, FIG. 24 shows a graph showing the result obtained by measuring the voltage-transmittance characteristic in an area with a diameter of 1 μm on the electrode. For the transmittance value, it is defined as 100% when the absorption axes of two polarizing plates are arranged in parallel, in order to eliminate the influence of the optical characteristic of the polarizing plates. A voltage of 0V-5V is applied for each case. In the center between the electrodes, the maximum transmittance, 64%, is obtained at the voltage of 4.5V. Similarly, the maximum transmittance, 47%, is obtained on the electrode at the voltage of 4.5V. The transmittance value on the electrode is lager than that of a conventional IPS system with a large electrode width.

In order for the transmittance on the electrode to increase by an application of a voltage, it is necessary for the orientation direction of the liquid crystal molecules on the electrodes to be changed such that the transmittance is increased by the voltage. Specifically, it needs to be changed such that the orientation vector direction of the liquid crystal molecules changes to the Y-axis direction, as the liquid crystal molecules between the electrodes. In order to analyze the changes in the orientation direction of the liquid crystal molecules on the electrodes, the behavior of the liquid crystal molecules and the electric field distribution were investigated by using a liquid crystal orientation simulator that was available on the market. FIG. 21 shows the result thereof, regarding the YZ plane in particular. For the electric filed distribution, shown are equipotential lines where the potentials are equal. As shown in FIG. 21, the electric field faces in the Y-axis direction in the vicinity of the center between the electrodes in particular, so that the liquid crystal molecules are rotated largely towards the Y-axis direction. In the vicinity of the substrate in the area between the electrodes, there are liquid crystal molecules that do not rotate towards the Y-axis direction due to an anchoring effect of the orientation processing. However, the proportion thereof for the Z-axis direction is very small. Meanwhile, in the area on the electrode, the electric field is substantially in +Z direction. Thus, there is observed slight rise in the liquid crystal molecules very close to the electrode by the generated vertical field of the Z-axis direction (see FIG. 22). However, the angle and the proportion thereof for the Z-axis direction are small. It can be seen that most of the liquid crystal molecules do not follow the direction of the electric field but rotate largely towards the Y-axis direction like the liquid crystal molecules between the electrodes. That is, in the area on the electrode other than the vicinity of the electrode, the liquid crystal molecules do not change the orientation direction to the vertical electric field in the Z-axis direction, but rotate in the Y-axis direction by conforming to the orientation of the liquid crystal molecules between the electrodes. As a result, the transmittance on the electrodes is increased.

For the reason why the liquid crystal molecules on the electrodes conform to the orientation of the liquid crystal molecules between the electrodes against the electric field, first, it may be considered because the electrode width is smaller than the cell gap. With this, the liquid crystal molecules on the electrodes have a larger area to be in contact with the liquid crystal molecules between the electrodes than an area to be in contact with the substrate interface. Therefore, the liquid crystal molecules are prone to conforming to the orientation of the liquid crystal molecules between the electrodes rather than being bound to the initial orientation in the substrate interface. On the contrary, in the conventional IPS system, there is almost no change in the orientation direction from the initial state even when a voltage is applied. This is considered because the restraint to the substrate interface is more significant. In this example, the electrode width is formed smaller than the cell gap. Therefore, the restraint to the substrate interface is reduced relatively, thereby allowing the liquid crystal molecules to conform to the orientation of the liquid crystal molecules between the electrodes.

That is, this indicates that it is more stable for the liquid crystal molecules on the electrodes in terms of the energy to twist-deform by following the orientation of the liquid crystal molecules between the electrodes against the electric field, rather than staying in the initial orientation against the electric field.

Further, when the liquid crystal molecules on the electrodes follow the liquid crystal orientation between the electrodes, the liquid crystal molecules in the vicinity of the electrode become more likely to undergo twist deformation compared to the conventional IPS. Therefore, it is also possible to obtain an effect of improving the transmittance between the electrodes.

As in positive-type liquid crystal molecules 51 of this embodiment, by setting the twist elastic constant K22 of the liquid crystal molecules to be smaller than the bend elastic constant K33, the free energy at the time of twist deformation can be made smaller. This allows the liquid crystal molecules on the electrodes to conform to the liquid crystal molecules between the electrodes to undergo twist deformation more easily. With this, the transmittance of the liquid crystal layer on the electrodes can be improved more efficiently.

Further, compared to a conventional laminated electrode type FFS system in particular, the liquid crystal display device of this example is capable of increasing the transmittance with a parallel electrode structure where the electrodes are not laminated. With this, it is possible to achieve the liquid crystal device without a complicated lamination process, so that the cost therefor can be reduced.

Furthermore, compared to a conventional parallel electrode type FFS system in particular, the liquid crystal device of this example can provide a large space between the pixel electrode and the common electrode. Therefore, a probability of generating short-circuit between both electrodes can be decreased, which enables manufacture with a high yield.

Moreover, in both the laminated electrode type and parallel electrode type FFS systems, the orientation of the liquid crystal molecules on the electrodes is changed by a strong electric field component of the Z-direction generated due to a short distance between the electrodes. Meanwhile, it is changed in the liquid crystal device of this embodiment by conforming to the change in the liquid crystal orientation between the electrodes. Therefore, rise of the liquid crystal molecules towards the Z-axis direction can be suppressed. As a result, rise of the liquid crystal molecules towards the oblique direction can be suppressed, so that the viewing angle characteristic can be improved compared to the case of the FFS system.

(2) Case where w/d=1 applies (w=3 μm, S=6 μm, and d=3 μm)

Figure 25:
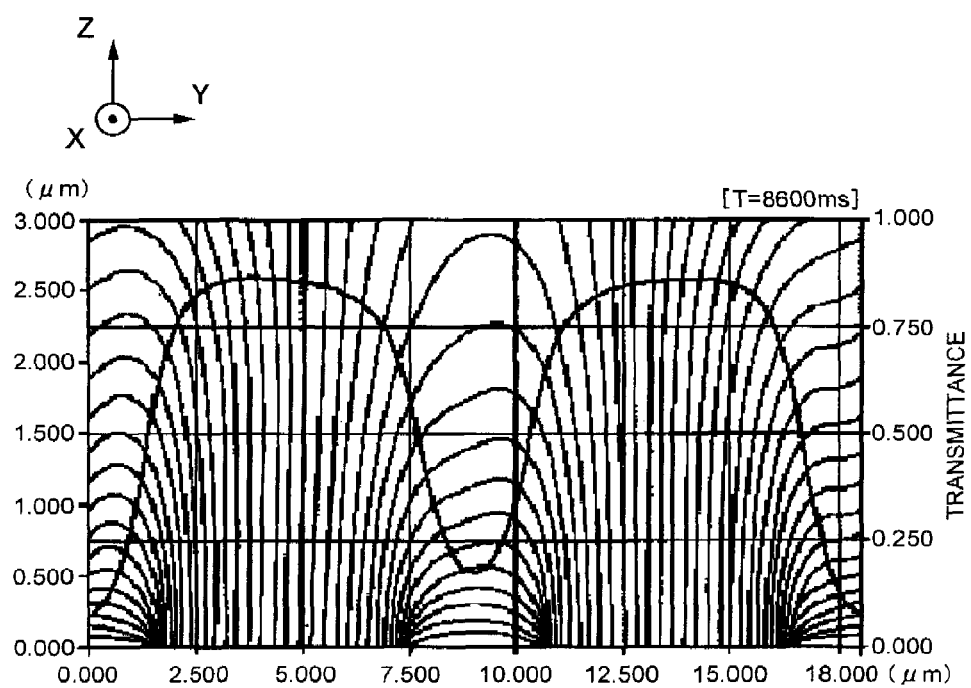
FIG. 25 shows the result of simulating the liquid crystal orientation, electric field distribution, and transmittance distribution in a case where (2) w/d=1 applies.
Figure 26:
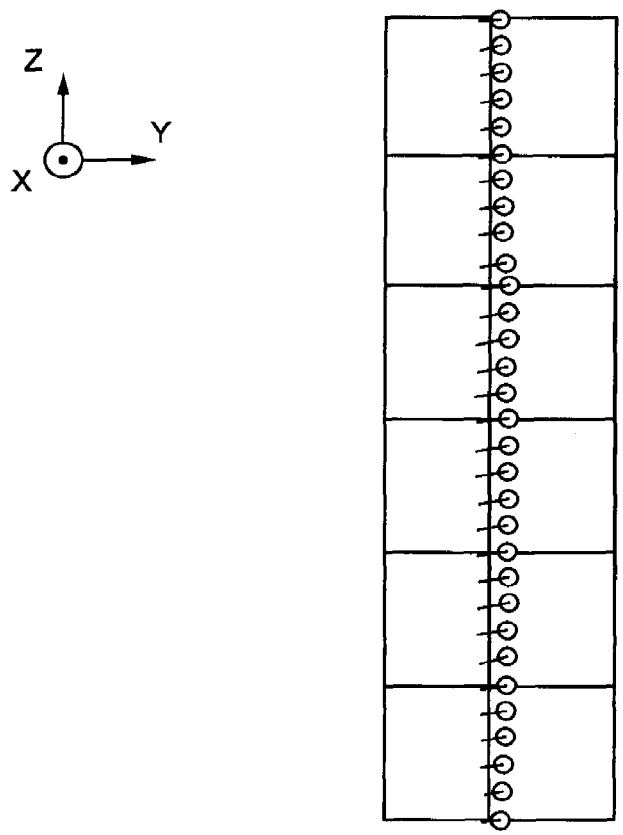
FIG. 26 is an enlarged view of the liquid crystal orientation on an electrode according to the simulation result shown in FIG. 25.
Figure 27:
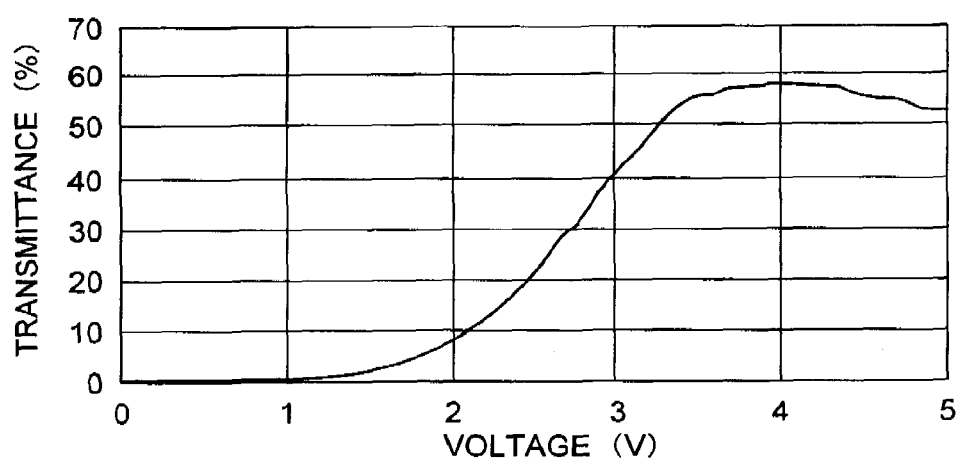
FIG. 27 is a graph obtained by measuring the voltage-transmittance characteristics in an area with a diameter of 1 μm at the center between the electrodes.
Figure 28:
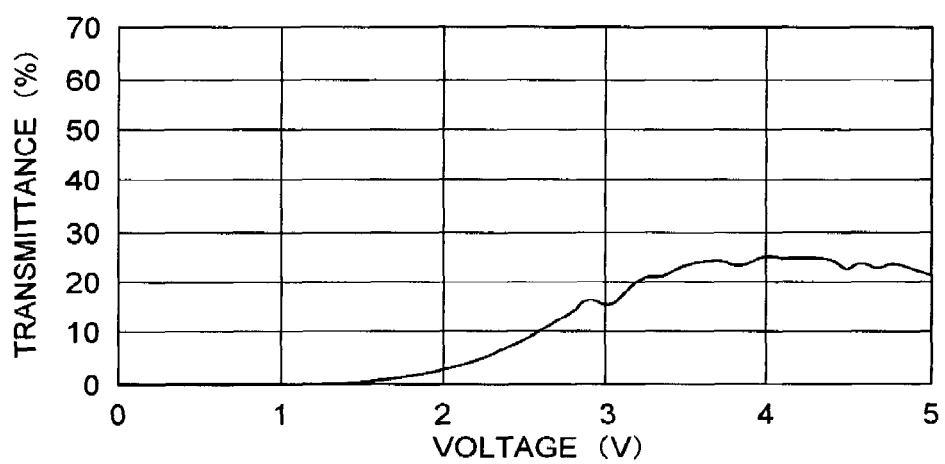
FIG. 28 is a graph obtained by measuring the voltage-transmittance characteristics in an area with a diameter of 1 μm at the center on the electrodes.

FIG. 25 shows the result of simulating the liquid crystal orientation, the electric field distribution and the transmittance distribution, in order to analyze the operation principles of the liquid crystal display device of this case when a voltage is applied. FIG. 26 is an enlarged view showing the orientation of the liquid crystal on the electrode as a result of the simulation in FIG. 25. FIG. 27 shows a graph obtained by measuring the voltage-transmittance characteristic in an area with a diameter of 1 μm in the center between the electrodes, and FIG. 28 shows a graph obtained by measuring the voltage-transmittance characteristic in an area with a diameter of 1 μm on the electrode.

This example is the case of a conventional IPS system as a comparative example for the case of (1) w/d<1, which shows the case where the electrode width has a value equal to or larger than the cell gap, and the liquid crystal molecules positioned above the electrodes are hardly driven.

As shown in FIG. 25 and FIG. 26, as for the orientation state of the liquid crystal molecules when a voltage is applied between the common electrode and the pixel electrode, the molecules are aligned in substantially the X-axis direction in the vicinity of the substrate interface between the electrodes due to an anchoring effect of the orientation processing. As going away from the substrate interface, however, the orientation is changed to the Y-axis direction in accordance with the direction of the horizontal electric field generated by the parallel electrodes. It is the same as the case of (1) described above in this respect. In the meantime, as for the orientation state of the liquid crystal molecules on the electrodes, the orientation stays in the initial state in the vicinity of the interface of +Z side substrate as in the case between the electrodes, and the orientation stays in the initial state as well without changing towards the Y-axis direction even in the part away from the +Z side substrate. That is, the orientation does not change towards the Y-axis direction in this example, whereas the orientation of the liquid crystal molecules on the electrodes in the part away from the +Z side substrate changes towards the Y-axis direction in the case of (1) described above.

In this example, the transmittance increases to be in white state when a voltage is applied between the common electrode and the pixel electrode. However, the transmittance in an area on the electrodes largely decreases even though the transmittance in the area between the electrodes increases. FIG. 27 shows a graph showing the result obtained by measuring the voltage-transmittance characteristic in the area with a diameter of 1 μm in the center between the electrodes in order to investigate the transmittance values. Similarly, FIG. 28 shows a graph obtained by measuring the voltage-transmittance characteristic in an area with a diameter of 1 μm on the electrode. A voltage of 0V-5V is applied for each case. In the center between the electrodes, the maximum transmittance, 59%, is obtained at the voltage of 4.1V. Meanwhile, even though the maximum transmittance is obtained on the electrode at the voltage of 4.1V as well, the value thereof is merely 24%. That is, the transmittance value on the electrodes in this example decreased largely, even though almost the same value as that of the case of (1) described above is obtained for the transmittance value between the electrodes.

Then, in order to investigate the transmission deterioration, the orientation direction of the liquid crystal molecules on the electrodes, the electric field distribution and the transmittance distribution were analyzed by using a liquid crystal orientation simulator that was available on the market. FIG. 25 shows the result thereof. The area between the electrodes (in the vicinity of the center area between the electrodes in particular), the direction of the electric field is the Y-axis direction. Thus, the liquid crystal molecules rotate largely towards the Y-axis direction, and the transmittance is improved as a result. On the other hand, the transmittance is decreased largely in an area on the electrode. This is because the liquid crystal molecules on the electrodes hardly conform to the change in the orientation between the electrodes and stay in the initial state, as shown in FIG. 26. That is, it can be seen that, in the conventional IPS system, the liquid crystal molecules positioned on the electrodes are hardly driven, so that the transmittance on the electrodes does not increase.

(3) Case where $(w+L)/d \leqq 1$ applies ($w=0.5$ μm, $S=2.5$ μm, and $d=4$ μm)

Figure 29:
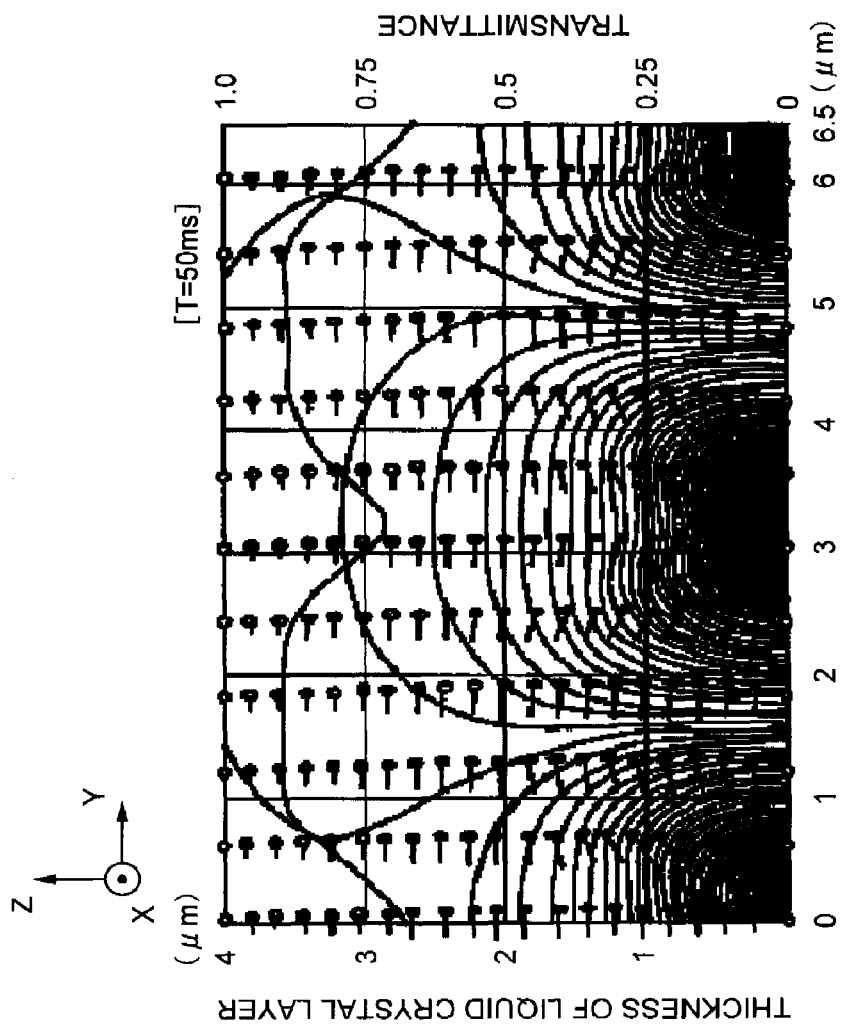
FIG. 29 is a cross-sectional view showing the electric field structure and the liquid crystal orientation of the liquid crystal device when a voltage is being applied in a case where (3) $(w+L)/d \leq 1/2$ applies, which in particular shows a sectional view showing the relationship between the electric field structure and the liquid crystal orientation, the transmittance distribution through simulation.

FIG. 29 is a cross-sectional view showing the electric field structure and the liquid crystal orientation of the liquid crystal device of this example when a voltage is applied, which in particular shows a sectional view showing the relationship between the electric field structure and the liquid crystal orientation, the transmittance distribution through simulation. A voltage that is a rectangular wave of ±5V, 60 Hz is applied between the electrodes.

In the examples of (3) and (4), the +Z side substrate is referred to as an opposing substrate, and the −Z side substrate as a main substrate.

A first feature of the structure in this example regards to the electrode structure where $(w+L)/d \leqq 1$ applies. Further, a second feature of the structure in this example regards to the electric field structure in which, as shown in FIG. 29, there is an electric field area where the electric field intensity between the electrodes in the vicinity of the opposing-side substrate is equal to or less than the intensity of the electric field on the electrodes. Furthermore, a third feature of the structure in this example regards to the liquid crystal orientation structure in which, due to the electric field structure, orientation of the liquid crystal molecules on the electrodes is changed in accordance with the orientation of the liquid crystal molecules between the electrodes and, in particular, there is such an area not only on the electrode but also between the electrodes that the director direction of the liquid crystal molecules differ from the electric field direction.

First, there will be described the electric field structure that is the second feature of the structure in this example. As described above, the electric field structure of the present invention is characterized to have an area where the electric field intensity between the electrodes in the vicinity of the opposing-side substrate is equal to or less than the intensity of the electric field on the electrodes. Referring now to the simulation result of the transmittance shown in FIG. 29, the transmittance including that on the electrode and between the electrodes is 83%, which is an extremely high transmittance even compared to the example (1) or (2) described above. Through carrying out devoted investigations on the results, the inventors of the present invention has come to invent the electric field structure that can achieve an extremely high transmittance even in the case of using positive type liquid crystal molecules. As described above, it is the feature of the electric field structure of the present invention to have an area where the electric field intensity between the electrodes in the vicinity of the opposing-side substrate is equal to or less than the intensity of the electric field on the electrodes. By introducing this electric field structure to the case where a comb-shaped electrode is provided as in the electrode structure of the present invention, a weak electric field layer with an extremely weak electric field can be generated within the liquid crystal layer in the vicinity of the opposing substrate. Introduction of this weak electric field layer is one of the important concepts in this example, which is largely different from the conventional IPS system and the case of (1) described above. Through the invention of the electric field structure to which the weak electric field layer is employed, it is possible with this example to achieve a high transmittance.

Now, FIG. 29 showing the simulation result of this example, FIG. 25 showing the simulation result of the electric field structure depicted in the case of example (2) described above, and FIG. 21 showing the simulation result of the electric field structure depicted in the case of example (1) described above will be compared. In the conventional electric field structure shown in FIG. 25, the equipotential lines run towards a direction vertical to the substrate surface, i.e. in the Z-axis direction, for the case between the electrodes. Further, the equipotential lines for the case over the electrode run towards the direction substantially in parallel to the substrate surface, i.e. the Y-axis direction in the cross-sectional view of FIG. 25. In the conventional electric field structure, a horizontal electric field is generated to achieve twist deformation of the liquid crystal orientation between the electrodes. However, a relatively strong electric field is generated over the electrode in the direction vertical to the substrate surface, thereby hindering the twist deformation of the liquid crystal orientation. As a result, the transmittance on the electrodes is decreased.

Meanwhile, in the case of example (1) shown in FIG. 21, the liquid crystal orientation on the electrodes conforms to the liquid crystal orientation between the electrodes so that the transmittance over the electrodes is increased than the case of (2). However, the electric field structure is almost the same as that of (2). On the contrary, in the electric field structure of this example, a horizontal electric field is generated on the main substrate side between the electrodes. However, on the opposing substrate side, the electric field runs in a direction that is not considered as a horizontal electric field any more. The intensity of the electric field in the vicinity of the opposing substrate is weaker than the intensity of the electric field in the case of (1) or (2) described above, thereby forming a weak electric field layer. Further, looking at the electric filed structure on the electrodes, even though the electric field runs in a direction vertical to the substrate surface as in the case of (1) or (2) describe above, the electric field intensity is relatively weak, thereby forming a weak electric field layer as well. Comparing the intensities of the electric field between the electrodes and on the electrodes in the vicinity of the opposing substrate, the intensity of the electric field between the electrodes is equal to or less than that of the electric field on the electrodes. That is, considering the vicinity of the opposing substrate, the weak electric field layer in this example means that there is formed an extremely weaker electric field layer compared to the conventional electric field structure. The intensity of the electric field of this weak electric field layer is extremely weaker than the intensity of the electric field in the vicinity of the electrode.

Next, there will be described the liquid crystal orientation that is the third feature in the structure of this example. Due to the electric field structure of this example described above, the liquid crystal molecules between the electrodes in the vicinity of the main substrate undergo twist deformation due to the horizontal electric field as in the conventional case. Meanwhile, the liquid crystal molecules within the weak electric field layer formed in the vicinity of the opposing substrate can move relatively freely and individually from the electric field, since the electric field intensity is weaker than the conventional case. As a result, the liquid crystal molecules within the weak electric field layer conform to the change in the orientation of the liquid crystal molecules between the electrodes in the vicinity of the main substrate to undergo twist deformation, rather than conforming to the electric field. This is because it is more stable for the liquid crystal molecules on the electrodes in terms of the energy to undergo twist deformation by conforming to the orientation of the surrounding liquid crystal molecules, rather than keeping the conventional orientation within the weak electric field layer or orienting vertically in accordance with the weak vertical electric field. The liquid crystal molecules on the electrodes on the main substrate side rise slightly by the effect of the electric field in a direction vertical to the substrate surface. However, since the electrode width itself is small and by being pushed by the surrounding twist orientation, the range thereof remains small. With this, an effective twist deformation of the liquid crystal orientation can be achieved.

In the case of (1) described above, the liquid crystal molecules between the electrodes are twist-deformed by the electric field generated by a pair of parallel electrodes, and the liquid crystal molecules on the electrodes conform to this deformation against the electric field to change the orientation like the crystal liquid molecules between the electrodes. Compared to the case of (1), this example is characterized that: the liquid crystal molecules between the electrodes on the substrate side having a pair of parallel electrodes are twist-deformed by the electric field generated by the pair of parallel electrodes; the liquid crystal molecules between the electrodes at a position away from the substrate conform to this deformation to undergo twist deformation; the liquid crystal molecules on the electrodes also conform to the twist deformation between those electrodes to undergo twist deformation; and the orientation is changed against the electric field direction not only on the electrodes but also between the electrodes, at an area away from the substrate having the pair of parallel electrodes. The liquid crystal orientation structure that is the third feature of this example can be achieved by the electric field structure, i.e. the weak electric field layer that is the second feature of this example described above.

Next, there will be described the electrode structure for achieving the second feature of this example (i.e. the weak electric field layer), and the operation thereof. That is, described is the first feature of the structure of this example. As described above, it is the character of the electrode structure of this example that the sum of the electrode width and the inter-electrode distance is equal to or less than the thickness of the liquid crystal layer. In order to produce the weak electric field layer, a strong electric field layer of greater electric field intensity may be confined in the vicinity of the electrode. An orientation simulation of the liquid crystal molecules is required for the details of the electric field distribution. Briefly, however, as in the simulation result shown in FIG. 29, the strong electric field area is present in the thickness direction of the liquid crystal layer within a range of the height W+S from the electrode, i.e. within a range equal to the sum of the electrode width and the inter-electrode distance. Accordingly, it is possible to form the weak electric field area by setting the thickness of the liquid crystal layer to be larger than the value of W+S. That is, $d \geq W+S$. In this example, as described above, the electrode width is set as 0.5 μm, the inter-electrode distance as 2.5 μm, and the thickness of the liquid crystal layer as 4 μm, which satisfies the condition of $d \geq W+S$.

In this example, most of the part in the liquid crystal layer s capable of undergoing twist deformation through an introduction of the weak electric field layer. That is, the liquid crystal molecules between the electrodes on the substrate side having a pair of parallel electrodes are twist-deformed by the electric field generated by the pair of parallel electrodes; the liquid crystal molecules between the electrodes at a position away from the substrate conform to this deformation to undergo twist deformation; the liquid crystal molecules on the electrodes also conform to the twist deformation between the electrodes to undergo twist deformation; and the orientation is changed against the electric field direction not only on the electrodes but also between the electrodes, at an area away from the substrate having the pair of parallel electrodes. With this, more liquid crystal molecules than the conventional case change the orientation to the Y-axis direction, so that a higher transmittance can be achieved compared to the conventional case.

With the liquid crystal display device of this example, it is possible to achieve an extremely high transmittance even when using positive type liquid crystal, through introducing the weak electric field layer and a twist deformation mechanism of the liquid crystal layer obtained thereby. Further, rise of the liquid crystal molecules towards the Z-axis direction can be suppressed, so that the viewing angle characteristic can be improved.

(4) Case where $(w+S)/d \leq 1/2$ applies (w=0.2 μm, S=0.9 μm, and d=3.5 μm)

Figure 30:
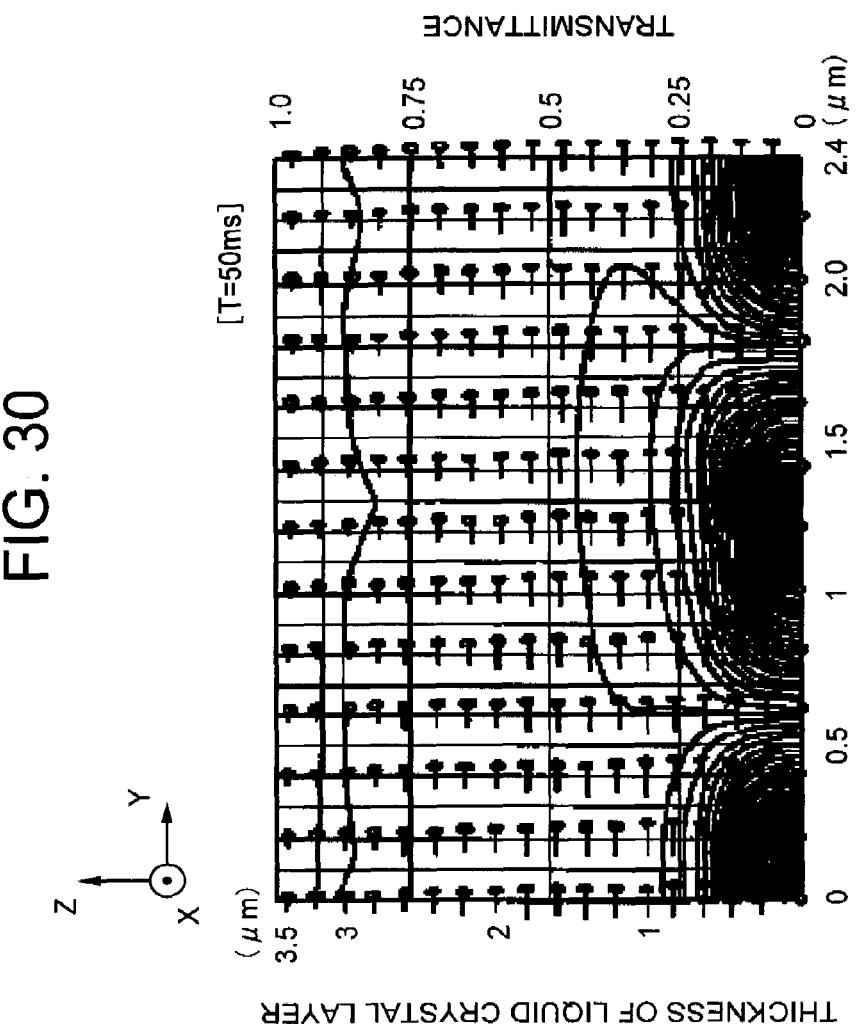
FIG. 30 is a cross-sectional view showing the electric field structure and the liquid crystal orientation of the liquid crystal device when a voltage is being applied in a case where (4) $(w+S)/d \leq 1/2$ applies, which in particular shows a sectional view showing the relationship between the electric field structure and the liquid crystal orientation, the transmittance distribution through simulation.

FIG. 30 is a cross-sectional view showing the electric field structure and the liquid crystal orientation of the liquid crystal device of this example when a voltage is applied, which in particular shows a sectional view showing the relationship between the electric field structure and the liquid crystal orientation, the transmittance distribution through simulation. A voltage that is a rectangular wave of ±5V, 60 Hz is applied between the electrodes.

In this example, the electrode width is set as 0.5 μm, the inter-electrode distance as 0.9 μm, and the thickness of the liquid crystal layer as 3.5 μm. As described, a first feature of the structure in this example is that the sum of the electrode width and the inter-electrode distance is a half or less than the thickness of the liquid crystal layer, which satisfies the condition of $d \geq 2(W+S)$.

Further, as shown in FIG. 30, a second feature of the structure in this example regards to the electric field structure, in which there is a vertical electric field in the vicinity of the opposing substrate between the electrodes. Furthermore, a third feature of the structure in this example regards to the liquid crystal orientation structure in which, due to the electric field structure, orientation of the liquid crystal molecules on the electrodes is changed in accordance with the orientation of the liquid crystal molecules between the electrodes and, in particular, there is such an area not only on the electrode but also between the electrodes that the director direction of the liquid crystal molecules differ from the electric field direction. In addition, this area has a thickness of a half or greater than the thickness of the liquid crystal layer.

Next, there will be described the electric field structure that is the second feature of the structure in this example. As described above, the electric field structure of the present invention is characterized to have a vertical electric field in the vicinity of the opposing substrate between the electrodes. Referring now to the simulation result of the transmittance shown in FIG. 30, the transmittance including that on the electrode and between the electrodes is 85%, which is a still higher transmittance even compared to the example (3) described above. Through carrying out devoted investigations on the results, the inventors of the present invention has come to invent the electric field structure that can achieve still higher transmittance even compared to the above-described case of example (3).

As described above, it is the feature of the electric field structure of this example to have the vertical electric field in the vicinity of the opposing substrate between the electrodes. By introducing this electric field structure to the case where a comb-shaped electrode is provided as in the electrode structure of this example, a vertical electric field can be generated not only on the electrodes but also between the electrodes in the liquid crystal layer in the vicinity of the opposing substrate. Compared to the conventional IPS system and the case of the above-described example (1) where there is a strong horizontal electric field generated in the vicinity of the opposing substrate between the electrodes or in the case of example (3) where there is generated an electric field that cannot be clearly defined as a horizontal electric field, this example is different in respect that, as a result of introducing the vertical electric field to the vicinity of the opposing substrate between the electrodes, the vertical electric field that is present initially on the electrodes and the equipotential lines are connected, thereby generating the equipotential lines over a plurality of electrodes. This is one of the important concepts of this example. In this example, through arranging the equipotential lines of the vertical electric field as described above, it is possible to introduce the weak electric field layer to the vicinity of the center of the liquid crystal layer in the thickness direction. As a result, it is possible to achieve the orientation structure in which more than a half of the opposing substrate side of the liquid crystal layer is twist-deformed, thereby enabling still higher transmittance to be achieved.

Comparing the area having the weak electric field layer of the above-described example (3) with that of this example, as shown in FIG. 29, the weak electric field layer is formed in the liquid crystal layer in the vicinity of the opposing substrate in the case of (3), whereas the weak electric field layer is formed in the liquid crystal layer on the opposing substrate side than the center area in the thickness direction in this example, as shown in FIG. 30. This weak electric field layer has an electric field in the direction almost vertical to the substrate surface, and the intensity thereof is weaker compared to that of example (3) described above. That is, the weak electric field layer in this example means that an extremely weaker vertical electric field layer than the conventional electric field structure is formed in the liquid crystal layer on the opposing substrate side than the center area in the thickness direction.

Next, there will be described the liquid crystal orientation that is the third feature of the structure in this example. It is the same as the case of (3) described above that the liquid crystal molecules between the electrodes in the vicinity of the main substrate are twist-deformed by the horizontal electric field as in the conventional case. In this example, the electric field in the vicinity of the center area in the thickness direction of the liquid crystal layer, where the anchoring effect of the orientation device of the liquid crystal layer becomes the weakest, is weakened. Therefore, the liquid crystal molecules can move more freely. As a result, when the liquid crystal molecules between the electrodes in the vicinity of the main substrate undergo twist deformation, the liquid crystal molecules of more than a half on the opposing substrate side of the liquid crystal layer conform to this deformation to undergo twist deformation in the same manner. This is because it is more stable for the liquid crystal molecules on the electrodes in terms of the energy to undergo twist deformation by conforming to the orientation of the surrounding liquid crystal molecules, rather than keeping the conventional orientation within the weak electric field layer or orienting vertically in accordance with a weak vertical electric field. The liquid crystal molecules on the electrodes on the main substrate side rise slightly due to the effect of the electric field in a direction vertical to the substrate surface. However, since the electrode width itself is small and by being pushed by the surrounding twist orientation, the range thereof remains small. With this, an effective twist deformation of the liquid crystal orientation can be achieved. The liquid crystal orientation structure that is the third feature of this example can be achieved by the electric field structure that has a vertical electric field in the vicinity of the opposing substrate between the electrodes, i.e. the second feature of this example described above.

Next, there will be described the electrode structure for achieving the second feature of this example (i.e. the weak electric field layer) and the operation thereof. That is, the first feature of the structure in this example will be described. As described above, it is the feature of the electrode structure of this example that the sum of the electrode width and the inter-electrode distance is equal to or less than a half the thickness of the liquid crystal layer. As described above, a strong electric field layer with a relatively large electric field intensity exists in the range of the height W+S from the main substrate where the electrodes are formed, i.e. in the range equal to the sum of the electrode width and the inter-electrode distance. Thus, it is possible to generate the weak electric field layer in the liquid crystal layer on the +Z direction side than the center area of the liquid crystal layer by setting the thickness of the liquid crystal layer to be larger than twice the value of W+S. That is, $d \geq 2(W+S)$. In this example, as described above, the electrode width is set as 0.2 μm, the inter-electrode distance as 0.9 μm, and the thickness of the liquid crystal layer as 3.5 μm, which satisfies the condition of $d \geq 2(W+S)$.

In this example, through introducing the weak electric field layer to more than a half the area of the liquid crystal layer, twist deformation of the liquid crystal layer can be done more easily. That is, the liquid crystal molecules between the electrodes on the substrate side having a pair of parallel electrodes are twist-deformed by the electric field generated by the pair of parallel electrodes; the liquid crystal molecules between the electrodes positioned in the vicinity of the center area of the liquid crystal layer conform to this deformation to undergo twist deformation; and the liquid crystal molecules on the electrodes also conform to the twist deformation between the electrodes thereby to undergo twist deformation. As a result, twist deformation can be done easily in more than a half the area of the liquid crystal layer. Thus, the liquid crystal molecules undergo twist deformation against the electric field direction not only on the electrodes but also between the electrodes, at an area away by a value of more than a half the liquid crystal layer from the substrate having the pair of parallel electrodes. With this, more liquid crystal molecules than the conventional case change the orientation to the Y-axis direction, so that a still higher transmittance can be achieved compared to the conventional case.

With the liquid crystal display device of this example, it is possible to achieve an extremely high transmittance even when using positive type liquid crystal, through introducing the weak electric field layer to more than a half the area of the liquid crystal layer and a twist deformation mechanism of the liquid crystal layer obtained thereby. Further, rise of the liquid crystal molecules towards the Z-axis direction can be suppressed, so that the viewing angle characteristic can be improved.

Considering the time of deformation of the liquid crystal molecules, it is preferable for the thickness of the liquid crystal layer in this example to be set within the range of about 5 μm that is the thickness of a regular liquid crystal layer. It is because when the thickness of the liquid crystal layer becomes too thick, the anchoring effect of the orientation device becomes weak. Accordingly, restitution of the liquid crystal orientation becomes poor when setting off the voltage, thereby increasing the off response time. That is, it is preferable to set the sum of the electrode width and the inter-electrode distance to be within 2.5 μm. Further, as described above, it is necessary to set the electrode width W to be smaller than the inter-electrode distance S, so that it is preferable to set it within the range of $W \leq S/4$ as shown in the embodiment. That is, it is preferable to set the electrode width to be 0.5 μm or smaller.

As described above, in the high transmittance IPS type liquid crystal display device invented by the inventors of the present invention, the electrode width is smaller than the thickness of the liquid crystal layer, and orientation of the liquid crystal molecule between the electrodes is changed by the electric field generated by a pair of parallel electrodes constituted with a pixel electrode and a common electrode. Orientation of the liquid crystal molecules on the electrodes is changed by conforming to the change in the orientation, so that not only the orientation of the liquid crystal molecules between the electrodes but also the orientation of the liquid crystal molecules on the electrodes can be changed. Through constituting the electrode width, the inter-electrode distance, and the thickness of the liquid crystal layer as in the cases of (1), (3), and (4) described above, it is possible to control the change in the orientation of the liquid crystal molecules on the electrodes.

The features of the high transmittance IPS type liquid crystal display device invented by the inventors of the present invention will be summarized below.

That is, it is the liquid crystal display device which comprises at least a substrate having a pair of parallel electrodes and a liquid crystal layer arranged on the substrate, and the liquid crystal molecules of the liquid crystal layer are driven by an electric field generated by the pair of parallel electrodes, wherein: the electrode width of the pair of the parallel electrodes is smaller than the thickness of the liquid crystal layer; orientation of the liquid crystal molecules between the electrodes is changed by the electric field that is generated by the pair of parallel electrodes; orientation of the liquid crystal molecules on the electrodes is changed in the same manner by conforming to the change in the orientation between the electrodes; and the director direction of the liquid crystal molecules on the electrodes differs from the direction of the electric field on the electrodes. With this, the orientation of the liquid crystal molecules on the electrodes can be changed in the same manner as that of the liquid crystal molecules between the electrodes when a voltage is applied. Therefore, transmittance on the electrodes in particular can be improved, so that the transmittance of the liquid crystal display device including the transmittance between the electrodes can be increased. Further, it is possible to increase the transmittance in the vicinity of the electrodes not only on the electrodes but also between the electrodes. This effect is especially significant compared to the conventional parallel electrode type IPS system where the electrode width is equal to or greater than the thickness of the liquid crystal layer. Thus, it is possible to achieve a horizontal electric field mode liquid crystal device with a high transmittance. Furthermore, in the present invention, orientation of the liquid crystal molecules on the electrodes is changed by conforming to the change in the orientation of the liquid crystal molecules between the electrodes. Therefore, rise of the liquid crystal molecules can be suppressed. As a result, the viewing angle characteristic can be improved.

Further, it is preferable for the distance between the electrodes constituting the pair of parallel electrodes to be equal or greater than the width of the electrodes. With this, the proportion of the electrode alignment direction in the electric field generated by the pair of parallel electrodes can be increased, thereby allowing a low voltage drive to be achieved.

Furthermore, it is preferable for the twist elastic constant of the liquid crystal molecules to be smaller than the bend elastic constant. This makes it easier for the liquid crystal molecules on the electrodes to change the orientation by conforming to the orientation of the liquid crystal molecules between the electrodes changed by the electric field. Therefore, the transmittance of the liquid crystal layer on the electrodes and in the vicinity of the electrode can be improved more efficiently.

Further, the liquid crystal molecules of the liquid crystal layer may have a negative dielectric anisotropy. The negative type liquid crystal molecules with a negative dielectric anisotropy change the orientation in a direction orthogonal to the electric field. Thus, it is possible to prevent the conformity to the vertical electric field than the case of using positive type liquid crystal molecules, so that rotation within the XY plane can be done more easily. With this, the transmittance on the electrodes can be improved greatly compared to the case of using the positive type liquid crystal. As a result, the transmittance of the liquid crystal display device including the transmittance between the electrodes can be increased. In addition, rise of the liquid crystal molecules can be suppressed, thereby enabling the viewing angle characteristic to be improved.

Furthermore, the total value of the width of the electrodes that constitute the pair of parallel electrodes and the space thereof may be equal to or less than the thickness of the liquid crystal layer. With this, conformity of the liquid crystal orientation on the electrodes to the liquid crystal orientation between the electrodes can be enhanced in particular, thereby achieving a still higher transmittance. Further, since the electric field in the electrode alignment direction can be made stronger, it becomes possible to achieve a low drive voltage, resulting in a decrease in the power consumption.

Further, it is preferable for the electrode width of the pair of the parallel electrodes to be 1 µm or smaller. With this, orientation of the electric crystal molecules on the electrodes can be conformed to that of the liquid crystal molecules between the electrodes. Therefore, the transmittance can be improved further.

The liquid crystal display device according to this example is characterized as follows. That is, orientation of the liquid crystal molecules in the vicinity of the substrate between the electrodes is changed by the electric field generated by the pair of parallel electrodes; orientation of the liquid crystal molecules between the electrodes in an area that is away from the vicinity of the substrate in the thickness direction of the liquid crystal layer is changed in the same manner by conforming to this change in the orientation; the orientation of the liquid crystal molecules on the electrodes is changed in the same manner by conforming to the change in the orientation between the electrodes; the director direction of the liquid crystal molecules in the area away from the vicinity of the substrate between the electrodes is different from the direction of the electric field; and the director direction of the liquid crystal molecules on the electrodes is different from the direction of the electric field. In this example, more liquid crystal molecules can undergo twist deformation than the conventional system, so that the liquid crystal molecules in the area away from the substrate in particular can be more effectively twist-deformed. As a result, a higher transmittance than the conventional case can be achieved.

Further, there may exist an electric field area where the intensity of the electric field between the electrodes is equal to or less than the intensity of the electric field on the electrodes, at an area of the liquid crystal layer that is most distant from the substrate in the thickness direction. By forming the electric field structure using the structure of a pair of parallel electrodes, it is possible to generate a weak electric field layer in the area of the liquid crystal layer that is most distant from the substrate in the thickness direction, i.e. in the vicinity of the opposing substrate. With the generated weak electric field layer, the liquid crystal layer in the vicinity of the opposing substrate can be twist-deformed easily.

Furthermore, the total value of the width of the electrodes that constitute the pair of parallel electrodes and the space thereof is preferable to be equal to or less than the thickness of the liquid crystal layer. With this, a strong electric field layer with a larger electric field intensity than the weak electric field layer can be confined in the vicinity of the parallel electrode pair of the liquid crystal layer. Therefore, it is possible to generate a weak electric field layer in the area of the liquid crystal layer that is most distant from the substrate in the thickness direction.

The liquid crystal display device according to this example is characterized as follows. That is, orientation of the liquid crystal molecules in the vicinity of the substrate between the electrodes is changed by the electric field generated by the pair of parallel electrodes; orientation of the liquid crystal molecules in the center area of the liquid crystal layer in the thickness direction between the electrodes is changed in the same manner; the orientation of the liquid crystal molecules on the electrodes is changed in the same manner by conforming to the changes in the orientation between the electrodes; the director direction of the liquid crystal molecules in the center area of the liquid crystal layer in the thickness direction between the electrodes differs from the direction of the electric field; and the director direction of the liquid crystal molecules on the electrodes differs from the direction of the electric field. In this example, the electric field in the vicinity of the center area in the thickness direction of the liquid crystal layer, where the anchoring effect of the orientation device of the liquid crystal layer becomes the weakest, is weakened. Therefore, the liquid crystal molecules can move more freely. As a result, the liquid crystal layer can be twist-deformed more efficiently, thereby enabling a still higher transmittance to be achieved. In addition, rise of the liquid crystal molecules towards the vertical direction of the substrate can be suppressed, so that the viewing angle characteristic can be improved. Moreover, since it is possible to twist-deform the liquid crystal layer uniformly, a retardation plate with a uniform retardation distribution within the plane can be achieved.

Further, there may exist an electric field area where the direction of the electric field between the electrodes is a direction vertical to the substrate surface, at an area of the liquid crystal layer that is most distant from the substrate in the thickness direction. By forming the electric field structure of this example using the structure of a pair of parallel electrodes, it is possible to generate a vertical electric field layer not only on the electrodes but also between the electrodes in the liquid crystal layer in the vicinity of the opposing substrate. As a result, the vertical electric field that is present initially on the electrodes and the equipotential lines are connected, thereby generating the equipotential lines over a plurality of electrodes. The weak electric field layer can be introduced to the vicinity of the center area in the thickness direction of the liquid crystal layer. Therefore, twist deformation can be more easily done in a half or more of the liquid crystal layer on the opposing substrate side.

Furthermore, the total value of the width of the electrodes that constitute the pair of parallel electrodes and the space thereof may be equal to or less than a half of the thickness of the liquid crystal layer. With this, it becomes possible to generate a weak electric field layer in the liquid crystal layer on the opposing substrate side than the vicinity of the center area of the liquid crystal layer.

Moreover, the liquid crystal molecules of the liquid crystal layer may have a positive dielectric anisotropy. Particularly, through combined with the electric field structure of this example, it is possible to use a positive type liquid crystal which is generally low at cost and provided with an excellent property. Thus, the transmittance can be improved.

Further, it is preferable for the electrode width of the pair of the parallel electrodes to be 0.5 µm or smaller. With this, it is possible to set the thickness of the liquid crystal layer within the range of about 5 µm in this example. This enables the anchoring energy of the orientation device to be used effectively for the deformation of the orientation. Therefore, it is possible to improve the response time, particularly the response time when set off.

Furthermore, it is preferable to form a reverse-rotation domain preventing structure in the pair of parallel electrodes. This enables suppression of a phenomenon where there is generated an undesired orientation deformation of the liquid crystal molecules caused by the terminal part of the pair of parallel electrodes, which propagates over the entire pair of parallel electrodes. As a result, a stable twist deformation can be achieved.

In the semi-transmission type liquid crystal display device according to the embodiment, a pixel electrode and a common electrode made of metal are used for the liquid crystal display device according to the above-described fifth embodiment thereby to utilize those electrodes as reflective plates. The electrode width, i.e. the width of the pixel electrode 31*a* and the common electrode 31*b* is 1 µm, and the inter-electrode distance, i.e. the distance between the pixel electrode 31*a* and the common electrode 31*b* is also 1 µm. The thickness of the liquid crystal layer 5 is set as 3.5 µm. That is, it is so set that the sum of the electrode width and the inter-electrode distance becomes smaller than the thickness of the liquid crystal layer. This corresponds to the case of example (3).

With the embodiment, the transmittance of the transmissive display area can be improved, thereby allowing a bright transmissive display to be provided. As described, in a regular IPS system, a sufficient reflectance cannot be achieved even if the pixel electrode or the common electrode is formed as a reflective plate, since the liquid crystal layer thereabove does not move. With the embodiment, however, it is possible to change the orientation of the liquid crystal molecules on the electrodes so that a bright reflective display can be achieved. Further, orientation state of the liquid crystal molecules continues in the boundary between the transmissive display area and the reflective display area. Therefore, theoretically, there is no dead space that is not utilized for the transmissive display or reflective display. It is possible thereby to improve the use efficiency of the light in the pixels, which enables not only a bright transmissive display but also a bright reflective display. In addition, there is no mal-orientation of the liquid crystal molecules generated at the boundary of the transmissive display area and reflective display area. Thus, it is possible to improve the display quality. Moreover, the transmissive display area and the reflective display area can be formed finer. Therefore, it is possible to improve a sense of high-definition in the display even under a state where only the transmissive display or the reflective display is to be sighted. Operations and effects of the embodiment other than those described above are the same as the ones of the fifth embodiment described above.

Figure 31:
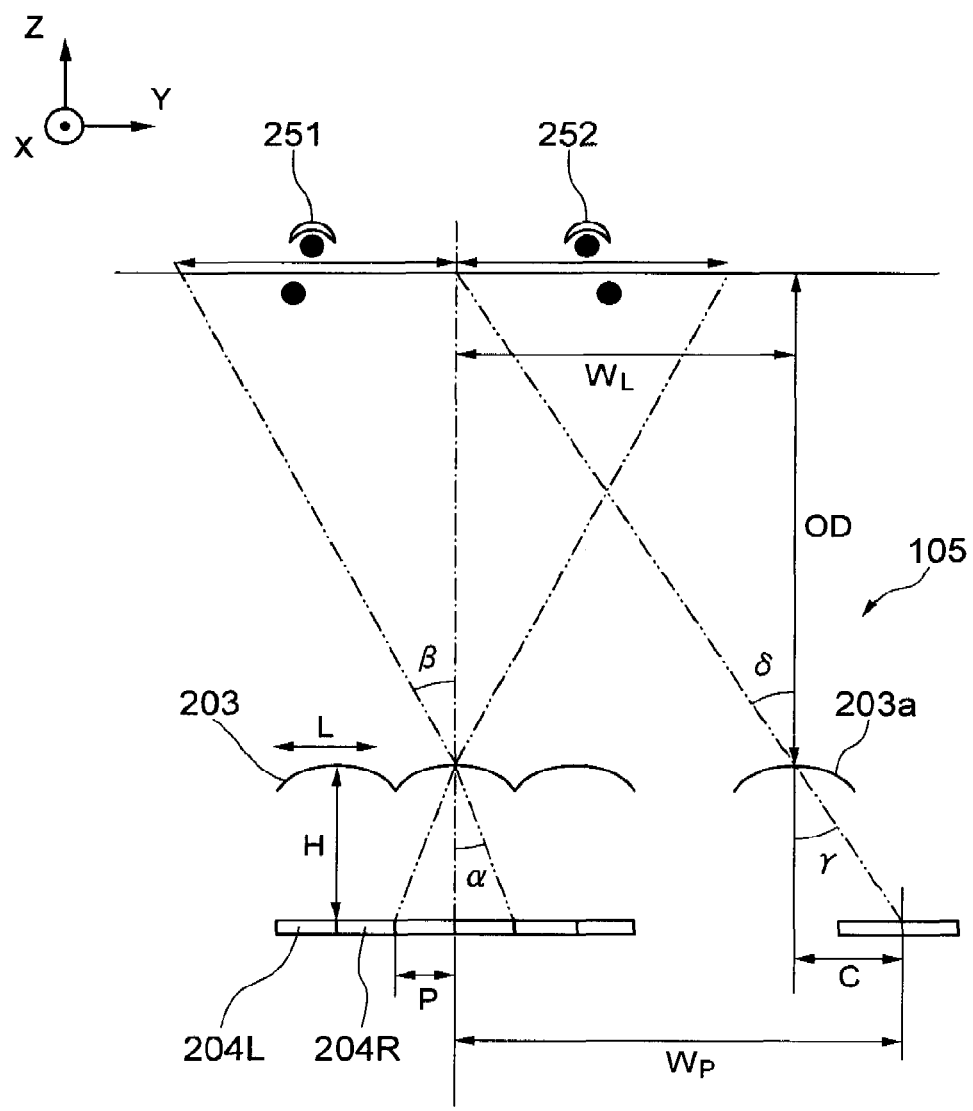
FIG. 31 is a cross-sectional view showing a structure of a liquid crystal display device according to a sixteenth embodiment of the present invention.

Next, a liquid crystal display device according to a sixteenth embodiment of the present invention will be explained. FIG. 31 is a cross-sectional view showing a structure of the liquid crystal display device according to this embodiment.

As shown in FIG. 31, the liquid crystal display device 105 according to the sixteenth embodiment is a stereoscopic image display device equipped with a lenticular lens 203.

Pairs of pixels constituted with one each of left-eye pixel 204L and right-eye pixel 204R as a display unit are arranged in matrix. The lenticular lens 203 is a lens array of a large number of cylindrical lenses 203a arranged one-dimensionally, and the alignment direction thereof is the direction towards which the left-eye pixel 204L and the right-eye pixel 204R are repeatedly arranged, i.e. in the Y-axis direction of FIG. 31. The extending direction of the cylindrical lenses 203a, i.e. the longitudinal direction, is a direction orthogonal to the alignment direction within the display surface, which corresponds to the X-axis direction of FIG. 31. Further, each of the pairs of pixels in the Y-axis direction corresponds to a single cylindrical lens 203a. The left-eye pixel 204L and the right-eye pixel 204R have the same structure as that of the pixels used in the liquid crystal display device depicted in the fifteenth embodiment of the present invention. The pixel electrodes and the common electrodes are disposed repeatedly in the Y-axis direction of FIG. 31. Structures of this embodiment other than those described above are the same as the ones of the fifteenth embodiment described earlier.

Described below is the operation of the liquid crystal display device according to the sixteenth embodiment constituted as described above. First, the pixel magnifying operation of the lenticular lens 203 will be described. As shown in FIG. 31, the distance between the principal point of the lenticular lens 203, i.e. the vertex, and the pixel is defined as H, the refractive index of the lenticular lens 203 as n, and the lens pitch as L. Further, the pitch of each of a single left-eye pixel 204L and a single right-eye pixel 204R is defined as P. Here, the alignment pitch of the display pixels constituted with one each of the left-eye pixel 204L and the right-eye pixel 204R is 2P.

It is assumed here that the distance between the lenticular lens 203 and an observer is the optimum observation distance OD, and each of the period of magnified projection image at this distance, i.e. each period of the width of the projection image of the left-eye pixel 204L and the right-eye pixel 204R on a virtual plane that is parallel to the lens and away from the lens by the distance OD is e. Further, it is assumed that the distance from the center of the cylindrical lens 203a positioned in the center of the lenticular lens 203 to the center of the cylindrical lens 203 positioned at the end of the lenticular lens in the X-axis direction is WL, and the distance from the center of the display pixels constituted with the left-eye pixel 204L and the right-eye pixel 204R positioned in the center of the display screen of the liquid crystal display device to the display pixels positioned at the end of the display screen in the X-axis direction is WP. Furthermore, it is assumed that the incident angle and the exit angle of the light at the cylindrical lens 203a positioned in the center of the lenticular lens 203 is α and β, respectively, and the incident angle and the exit angle of the light at the cylindrical lens 203a positioned at the end of the lenticular lens 203 is γ and δ, respectively. Furthermore, the difference between the distance WL and the distance WP is defined as C, and the number of pixels contained in the area of the distance WP is 2 m.

Since the alignment pitch L of the cylindrical lens 203a and the alignment pitch P of the pixels are related to each other, one of the pitches is determined in accordance with the other. Normally, it is common to design the lenticular lens in accordance with the display panel, so that the alignment pitch P of the pixels is treated as a constant. Further, the refractive index n is determined through selection of the material for the lenticular lens 203. On the contrary, a desired value is set for the observation distance OD between the lens and the observer, and for the period e of the pixel magnified projection image at the observation distance OD. By using those values, the distance H between the vertex of the lens and the pixel, and the lens pitch L are determined. According to Snell's law and geometrical relationships, the following equations 1 to 9 apply.

$$n \times \sin \alpha = \sin \beta \quad [\text{EQ. 1}]$$

$$OD \times \tan \beta = e \quad [\text{EQ. 2}]$$

$$H \times \tan \alpha = P \quad [\text{EQ. 3}]$$

$$n \times \sin \gamma = \sin \delta \quad [\text{EQ. 4}]$$

$$H \times \tan \gamma = C \quad [\text{EQ. 5}]$$

$$OD \times \tan \delta = WL \quad [\text{EQ. 6}]$$

$$WP - WL = C \quad [\text{EQ. 7}]$$

$$WP = 2 \times m \times P \quad [\text{EQ. 8}]$$

$$WL = m \times L \quad [\text{EQ. 9}]$$

Figure 32:
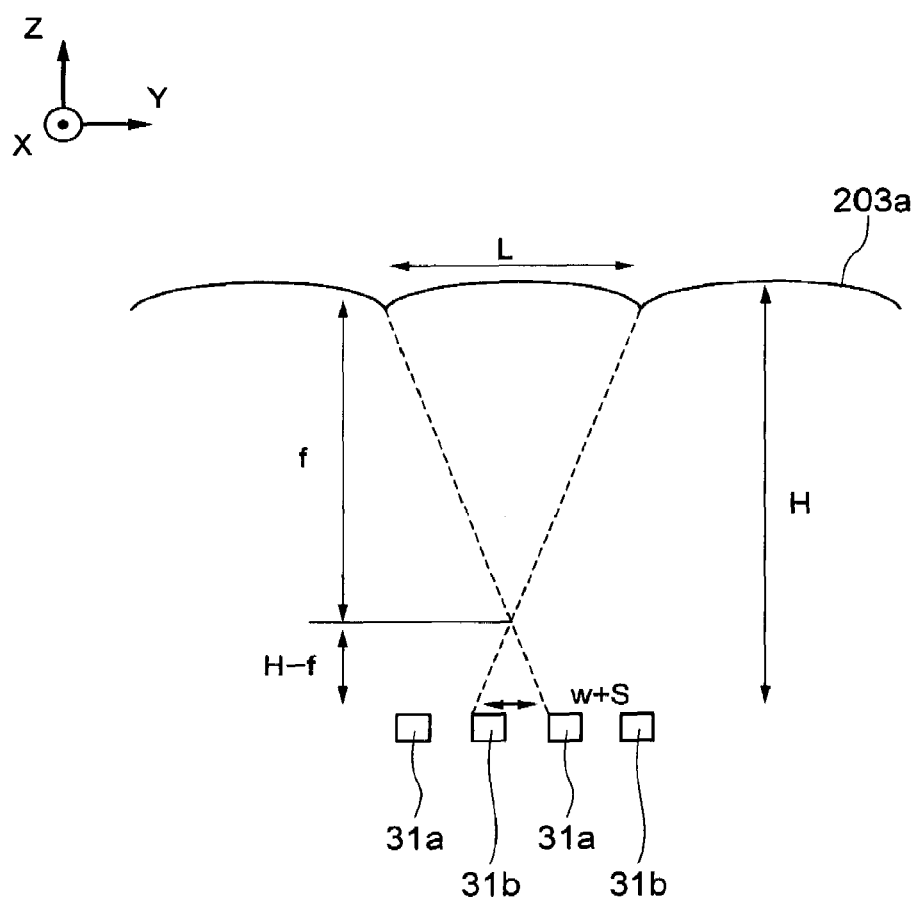
FIG. 32 is a cross-sectional view for calculating the focal distance of a cylindrical lens that constitutes a lenticular lens according to the embodiment.
Figure 33:
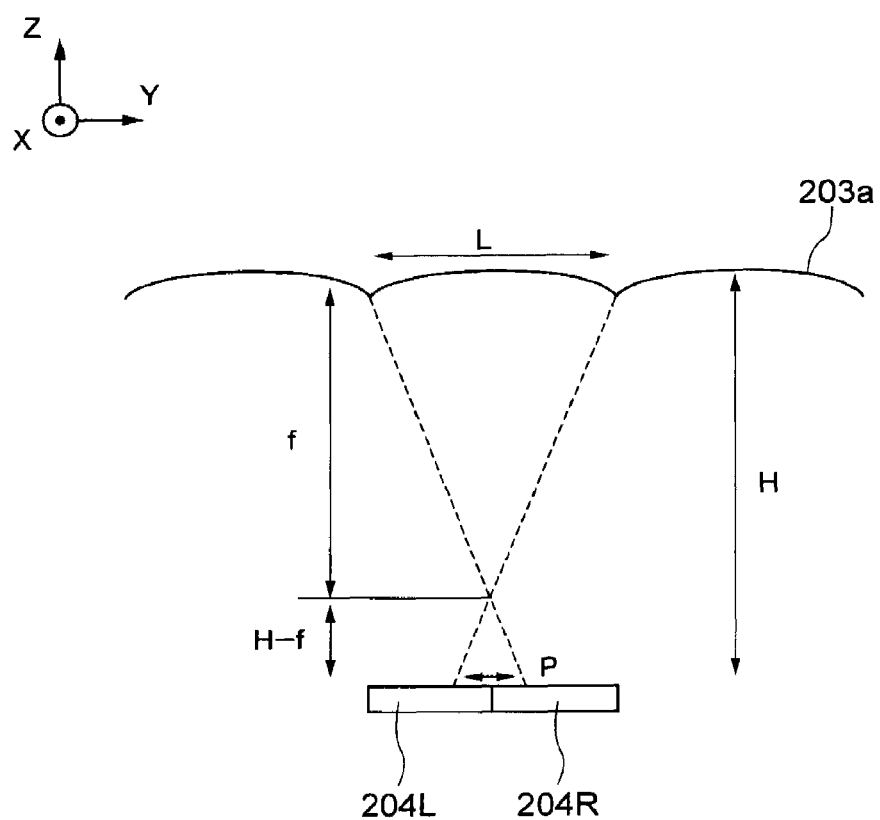
FIG. 33 is a cross-sectional view for calculating the focal distance of a cylindrical lens that constitutes a lenticular lens according to the embodiment.

Next, the focal distance f and the curvature radius r of the cylindrical lens are calculated. FIG. 32 is a cross-sectional view for calculating the focal distance of the cylindrical lens that constitutes the lenticular lens according to the embodiment. In the drawing, it is schematically depicted by changing the scale in a part thereof for easy understanding.

Normally, the focal distance of the cylindrical lens 203a is set as equal to the distance H between the vertex of the cylindrical lens and the pixel. However, if it is so set in this embodiment, the reflective display area where the pixel electrode 31 or the common electrode 31b is disposed is separated from the other transmissive display area by the cylindrical lens. In such a case, the observer recognizes the reflective areas as a black stripe pattern under an environment where the transmissive display becomes dominant, and recognizes the transmissive areas as the black stripe pattern under an environment where the reflective display becomes dominant. Therefore, the display quality is largely deteriorated. It is described in the beginning that the distance H is the distance between the vertex of the lenticular lens and the pixel. However, it is also the same to define the distance between the vertex of the cylindrical lens and the pixel as H, through the use of the cylindrical lens that is the structural element of the lenticular lens.

In order to overcome such issues regarding the display quality, the focal distance f of the cylindrical lens is in the present invention set smaller than the distance H between the vertex of the cylindrical lens and the pixel. This makes it possible to prevent the focal point of the lens from being coincided with the pixel electrode or the common electrode. Thus, the image of the electrodes on the observation plane becomes blurred, thereby improving the picture quality. Specifically, as shown in FIG. 32, there is a relation of similarity established between a triangle having the lens pitch L as the base and the focal distance f as the height, and a triangle having the electrode pitch w+S as the base and H-f as the height, and the following equation 10 applies.

$$L : f = w + S : H - f \quad [\text{EQ. 10}]$$

Through organizing the equation 10, the following equation 11 can be obtained.

$$f = H \times L / (L + w + S) \quad [\text{EQ. 11}]$$

With this, as shown in FIG. 32, it is possible to decrease the separation effect of the lens for amount of the electrode pitch w+S, which can thereby suppress such a phenomenon that the transmissive display area and the reflective display area are separated on the observation plane. That is, by setting the focal distance f smaller than the value obtained from the equation 11 as in the following equation 12, it is possible to deteriorate the lens separation effect thereby to suppress the phenomenon where the transmissive display area and the reflective display area are separated.

$$f \leq H \times L/(L+w+S) \quad [\text{EQ. 12}]$$

It is noted here that the equation 12 merely determines the upper limit of the focal distance f. As the focal distance f becomes smaller, the lens separation property is deteriorated. In order for the separation of the left and right pixels to be undisturbed in the embodiment, there may be established a relation of similarity between the triangle having the lens pitch L as the base and the focal distance f as the height, and a triangle having the pixel pitch P as the base and H-f as the height. Accordingly, the following equation 13 applies.

$$L{:}f = P{:}H{-}f \quad [\text{EQ. 13}]$$

The following equation 14 can be obtained from this. Further, the equation 15 can be established by combining the equation 12 and the equation 14. That is, it is preferable to set the focal distance f within the range where the equation 17 applies.

$$H \times L/(L+P) \leq f \quad [\text{EQ. 14}]$$

$$H \times L/(L+P) \leq f \leq H \times L/(L+w+S) \quad [\text{EQ. 15}]$$

Moreover, the radius curvature r of the lens can be obtained by the following equation 16.

$$r = f \times (n-1)/n \quad [\text{EQ. 16}]$$

As described, according to the embodiment, it is possible to achieve the transmissive display and reflective display of high picture quality in the display device that is provided with an image separation device such a lenticular lens, while keeping a high image separation property. That is, the semi-transmissive fine IPS structure of the embodiment exhibits an extremely good performance as the display device provided with an image separation device. This effect of the embodiment can be achieved only when the fine electrode structure and the lens settings are employed in combination, in addition to the feature of the present invention where the compensator and the circular polarizing plate are applied to the horizontal electric field type liquid crystal display device.

In the embodiment, there is described the stereoscopic image display device with two visual points, which is equipped with a left-eye pixel and a right-eye pixel. However, the present invention is not limited to this. It can be also applied to a display device of N-viewpoints type (N is a natural number) in the same manner. In this case, the number of pixels contained in the area of the distance WP, i.e. 2m, defined in the distance of WP described above may be treated as N×m. It is noted that N does not exclude 1, i.e. does not exclude the case where the pixel and the lens correspond on one-on-one basis. In that case, it is possible to reduce an influence of the areas that do not contribute to the display such as gate lines and data lines, so that the light use efficiency can be improved.

Further, the present invention is not limited only to the stereoscopic image display device but may also be applied to other display devices in the same manner, as long as the display device is equipped with a lenticular lens. As a way of example, the present invention can also be applied in the same manner to a multi-image display device that displays a plurality of planar images in different directions.

Furthermore, the image separation device of the present invention is not limited to the lenticular lens. A fly-eye lens in which lens elements are arranged two-dimensionally, a parallax barrier in which slits are arranged one-dimensionally, and a parallax barrier in which pin-holes are arranged two-dimensionally can also be applied in the same manner. That is, the embodiment can preferably be employed for the case where there is provided an optical device for magnifying an image for display, thereby providing a high picture-quality.

Further, the embodiment has been described by referring to the case where the electrode width and the inter-electrode distance are the same. However, the present invention is not limited to such case but may also be applied to the case where the electrode width and the inter-electrode distance are different. Since the embodiment is applied for the electrode pitch that is the sum of the electrode width and the inter-electrode distance, it can be applied in the same manner even if there is a change in the electrode width and the inter-electrode distance.

Moreover, the embodiment has been described by referring to the case where the pixel electrode and the common electrode extend in the X-axis direction. However, the present invention is not limited to this. The electrodes may be arranged on an XY plane in the X-axis direction, i.e. sloped against a direction that is orthogonal to the alignment direction of the lens, or the slope may take different values depending on the coordinates on the X-axis to provide multi-domains. With this, particularly when using the optical element of one-dimensional alignment such as a lenticular lens, it is possible to bring the focal distance of the lens still closer to the electrode surface without deteriorating the picture quality, through utilizing the fact that the separation effect does not work in the direction that is orthogonal to the lens alignment direction. As a result, the image separation effect can be more enhanced.

Figure 34:
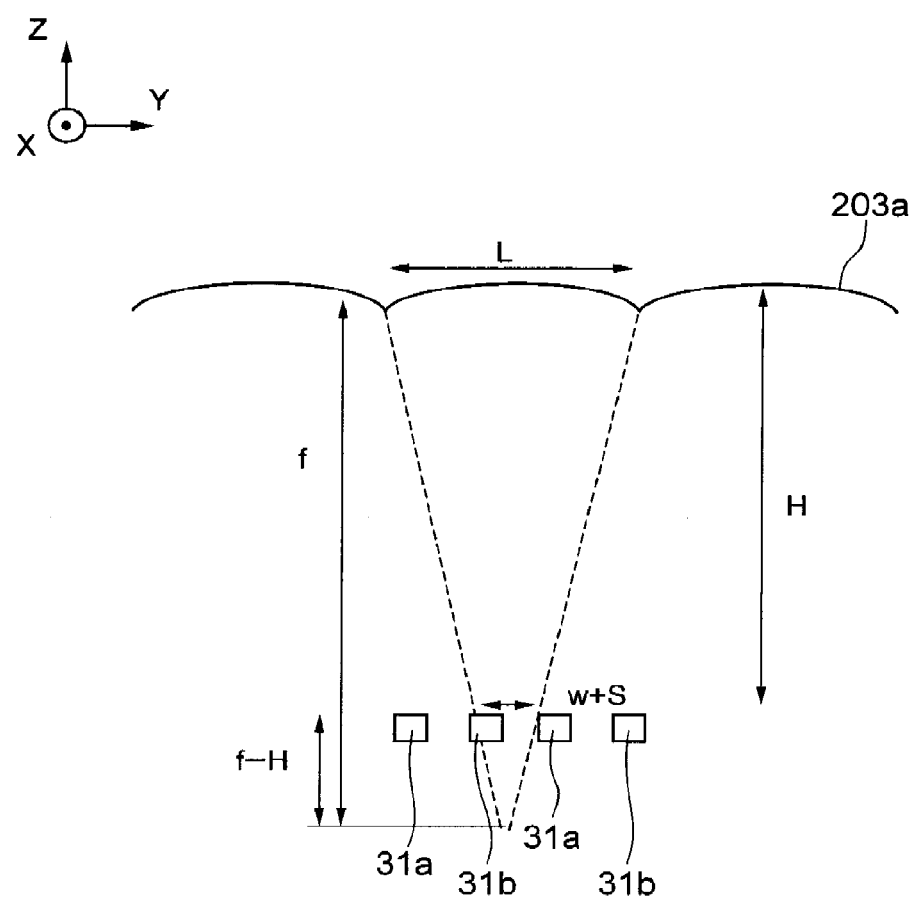
FIG. 34 is a cross-sectional view for calculating the focal distance of a cylindrical lens that constitutes a lenticular lens according to the embodiment.

In the embodiment, a transmissive display and a reflective display of high picture-quality are achieved by setting the focal distance f of the lenticular lens to be smaller than the distance H between the vertex of the lens and the pixel. However, the present invention is not limited this. It is also possible to achieve the display of high picture-quality in the same manner by setting the focal distance f to be larger than the distance H. As shown in FIG. 34, when the relationship of similarity is established between a triangle having the lens pitch L as the base and the focal distance f as the height and a triangle having the electrode pitch w+S as the base and f-H as the height, the following equation 17 applies. From this, the following equation 18 can be obtained.

$$L{:}f = w+S{:}f-H \quad [\text{EQ. 17}]$$

$$H \times L/(L-w-S) \leq f \quad [\text{EQ. 18}]$$

Figure 35:
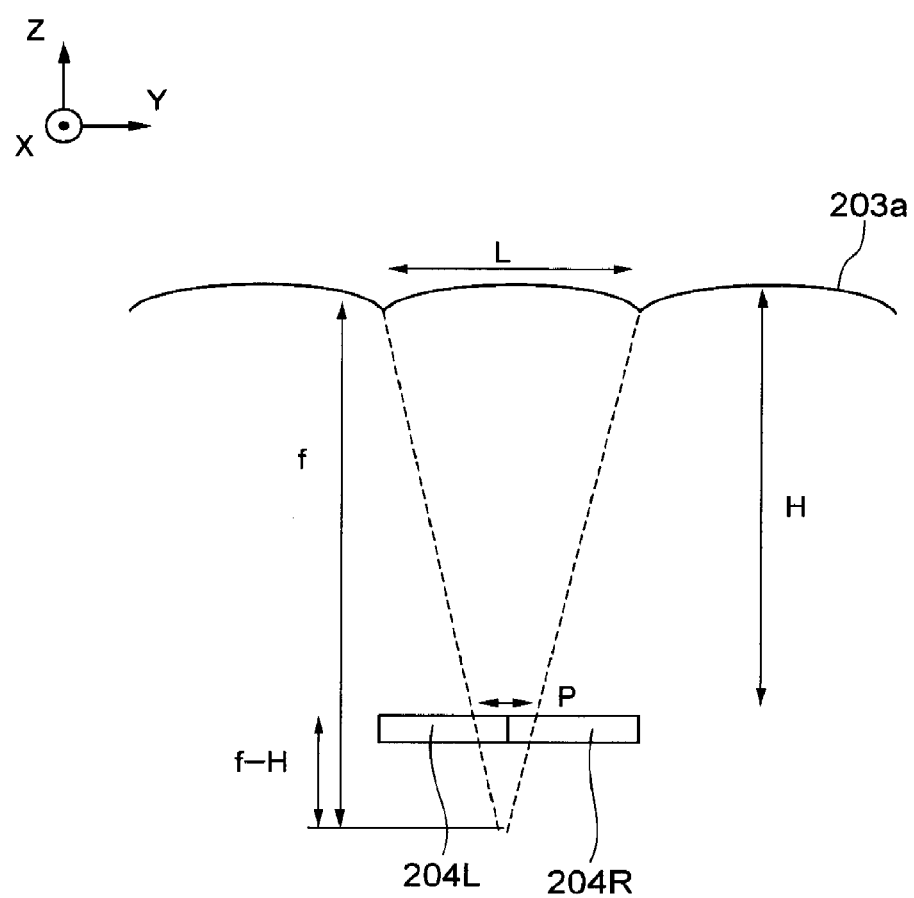
FIG. 35 is a cross-sectional view for calculating the focal distance of a cylindrical lens that constitutes a lenticular lens according to the embodiment.
Figure 36:
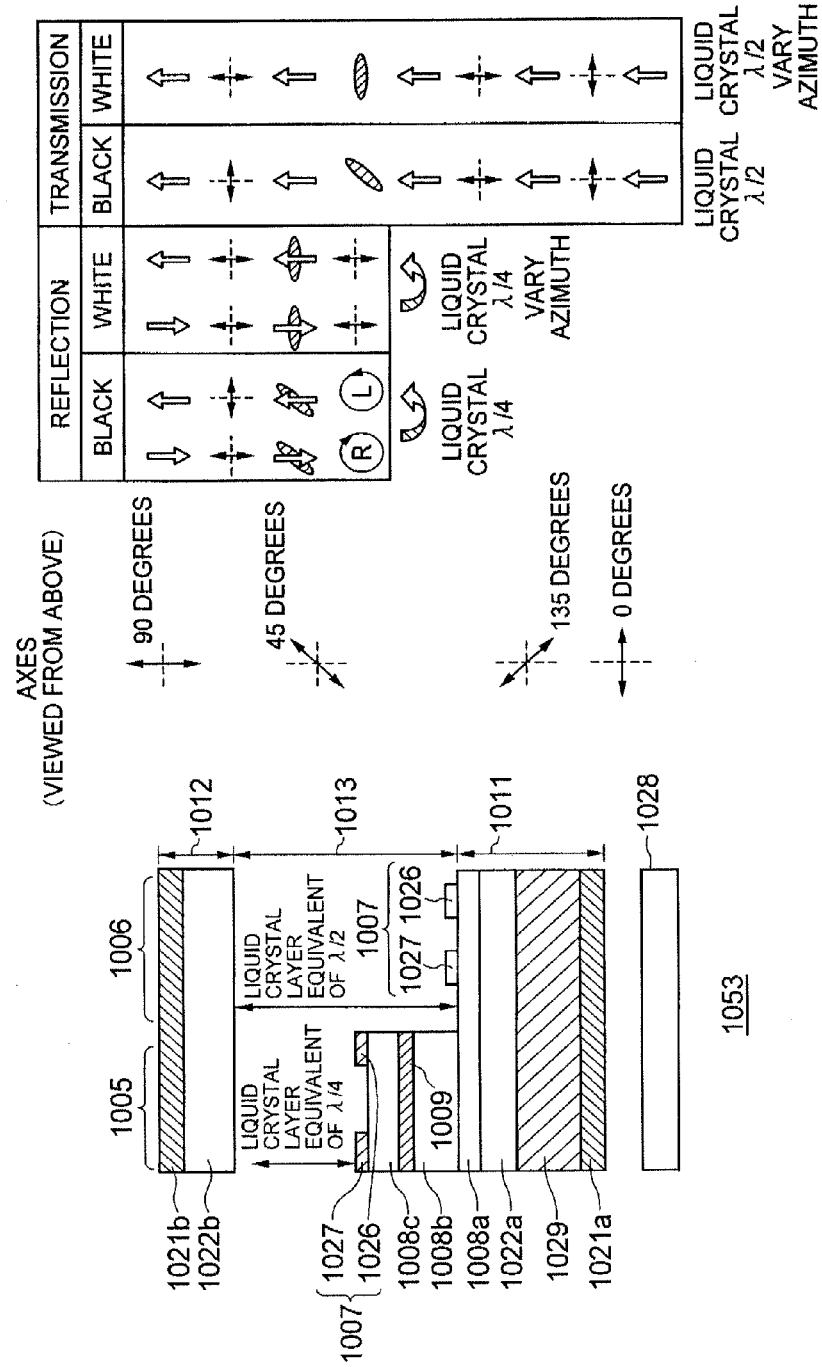
FIG. 36 is a view showing a frame format of an optical configuration, arranged angles, and operations of a semi-transmission type liquid crystal panel in a horizontal electric field mode used for a liquid crystal display device described in Patent Document 1.
Figure 37:
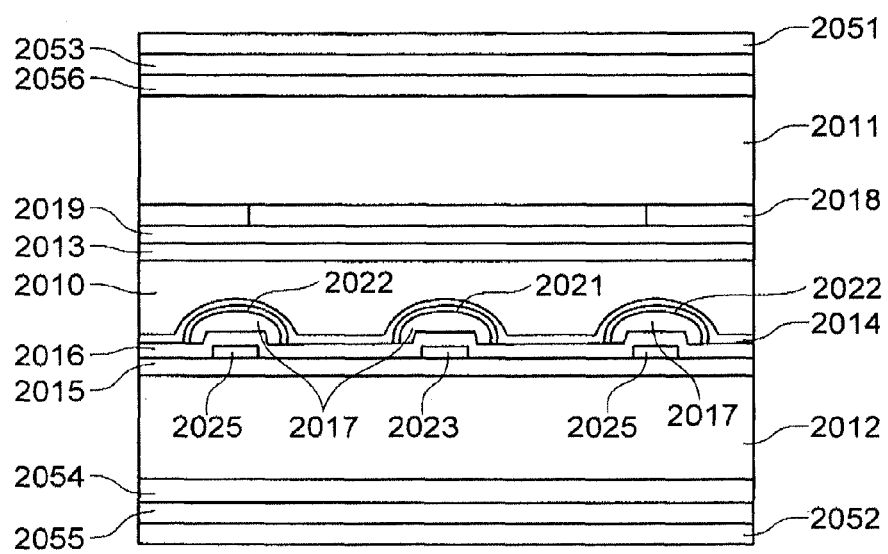
FIG. 37 is a cross-sectional view showing a semi-transmission type liquid crystal panel in a horizontal electric field mode used for a liquid crystal display device described in Patent Document 2.
Figure 38:
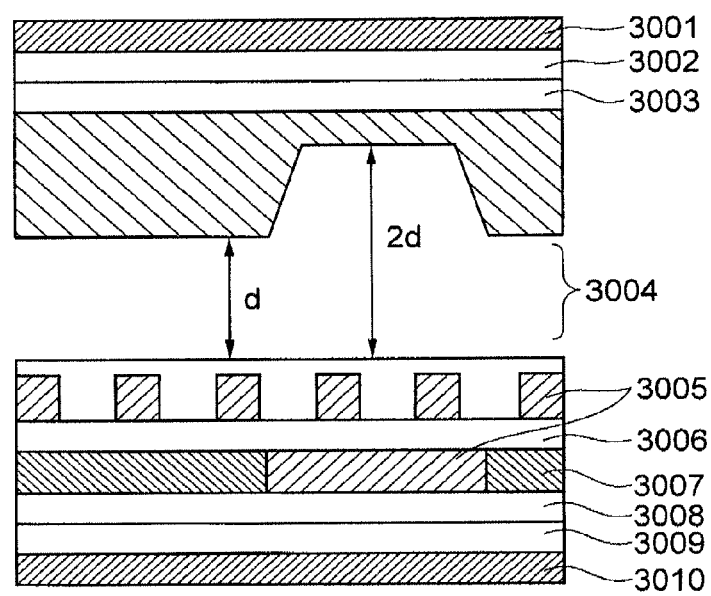
FIG. 38 is a cross-sectional view showing a semi-transmission type liquid crystal panel in a horizontal electric field mode used for a liquid crystal display device described in Non-Patent Document 1.
Figure 39:
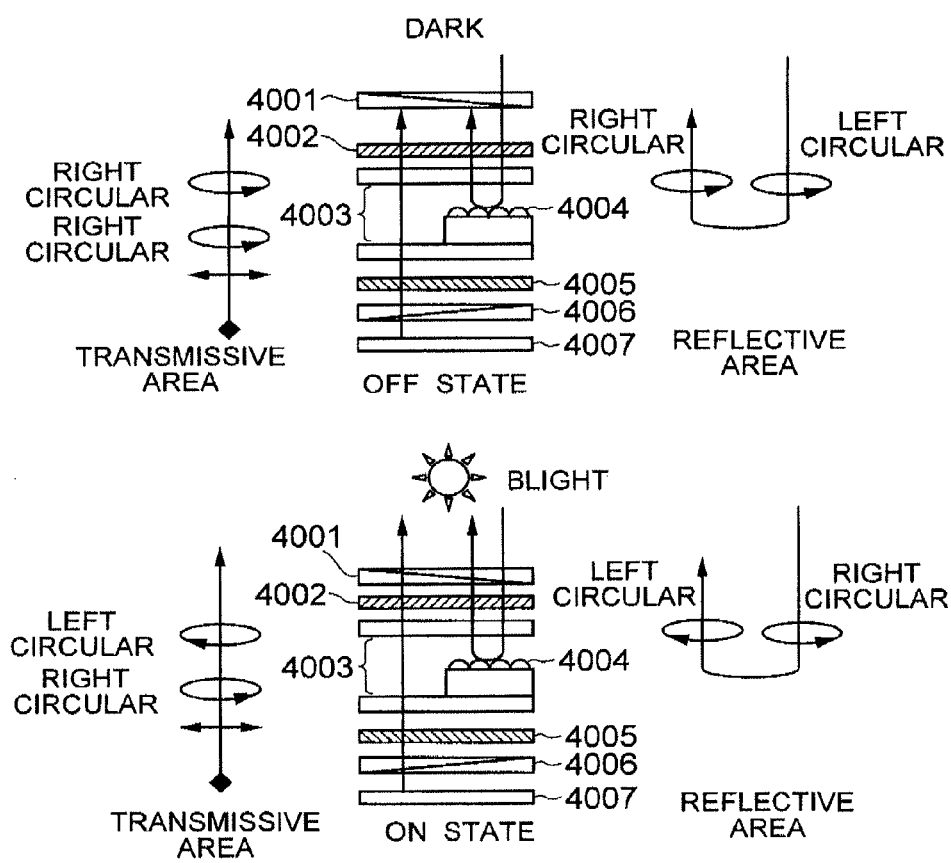
FIG. 39 is a cross-sectional view showing a semi-transmission type liquid crystal panel in a vertical alignment mode used for a liquid crystal display device described in Non-Patent Document 2.
Figure 40:
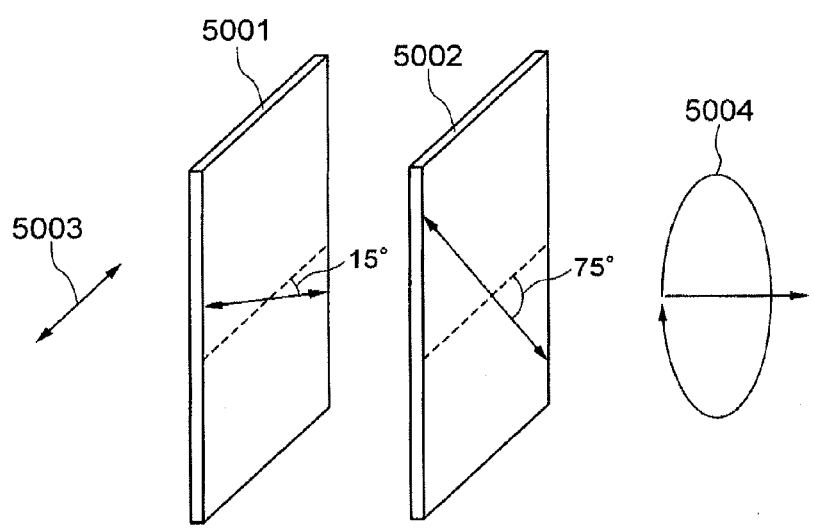
FIG. 40 is a view showing a frame format of a structure of a broadband quarter-wavelength plate used for a circular polarizing plate described in Non-Patent Document 3.

Further, as shown in FIG. 35, when the relationship of similarity is established between a triangle having the lens pitch L as the base and the focal distance f as the height and a triangle having the pixel pitch P as the base and f-H as the height, the following equation 19 applies. From this, the following equation 20 can be obtained.

$$L{:}f = P{:}f-H \quad [\text{EQ. 19}]$$

$$f \leq H \times L/(L-P) \quad [\text{EQ. 20}]$$

According to the equation 19 and the equation 20, the range of the preferable focal distance when the focal distance f is set larger than the distance H can be obtained from the following equation 21.

$$H \times L/(L-w-S) \leq f \leq H \times L/(L-P) \quad [\text{EQ. 21}]$$

That is, it is desirable for the focal distance f to satisfy either the equation 15 or the equation 21. Operation and effects of the sixteenth embodiment other than those described above are the same as the ones of the fifteenth embodiment described earlier.

Each of the above-described embodiments may be practiced alone, however, it is also possible to carry out those embodiments in combination as necessary.

Industrial Applicability

The present invention can be utilized suitably for display devices of a portable terminal device such as a portable telephone, a PDA (Personal Digital Assistant), a game machine, a digital camera, a camcorder, and a videoplayer, and of a terminal device such as a laptop computer, a cash dispenser, and a vending machine.

What is claimed is:

1. A liquid crystal panel comprising a backside substrate, a viewer-side substrate, and a liquid crystal layer in between those two substrates, where a pixel area is configured with a reflective display area in which a light from a viewer-side is reflected, and a transmissive display area in which a light from a backside is transmitted, and where a liquid crystal layer at least in a transmissive display area is driven by a horizontal electric field with an applied voltage parallel to a substrate surface, wherein
the liquid crystal layer is parallel-aligned, and the liquid crystal layer has a refractive index anisotropy in a display surface thereof,
the liquid crystal panel further comprising:
circular polarizing plates individually disposed outside of the backside substrate and the viewer-side substrate respectively; and
a negative A plate of retardation film disposed in at least either one of intervals between the circular polarizing plates and the liquid crystal layer for reducing the refractive index anisotropy of the liquid crystal layer, wherein
a direction of an extraordinary refractive index of the negative A plate is set in a direction in which refractive index anisotropy of the liquid crystal layer under no voltage application is maximum.

2. The liquid crystal panel, as claimed in claim 1, wherein intensity of an electric field for driving the liquid crystal layer is weaker in the reflective display area than in the transmissive display area.

3. The liquid crystal panel, as claimed in claim 1, wherein an interval between electrodes generating a horizontal electric field in the reflective display area is wider than an interval of electrodes generating a horizontal electric field in the transmissive display area.

4. A liquid crystal display device comprising the liquid crystal panel as claimed in claim 1, for a display unit.

5. A terminal device comprising the liquid crystal display device as claimed in claim 4.

6. The terminal device, as claimed in claim 5, is a portable telephone, a personal digital assistant, a game machine, a digital camera, a camcorder, a videoplayer, a laptop computer, a cash dispenser, or a vending machine.

* * * * *